(12) United States Patent
Kato et al.

(10) Patent No.: US 12,309,506 B2
(45) Date of Patent: May 20, 2025

(54) PROCESSING APPARATUS, METHOD, AND NON-TRANSITORY COMPUTER-READABLE RECORDING MEDIUM

(71) Applicant: Panasonic Intellectual Property Management Co., Ltd., Osaka (JP)

(72) Inventors: Yumiko Kato, Osaka (JP); Motoki Yako, Osaka (JP); Yoshifumi Kariatsumari, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 261 days.

(21) Appl. No.: 18/183,085

(22) Filed: Mar. 13, 2023

(65) Prior Publication Data

US 2023/0217121 A1 Jul. 6, 2023

Related U.S. Application Data

(63) Continuation of application No. PCT/JP2021/035122, filed on Sep. 24, 2021.

(30) Foreign Application Priority Data

Oct. 5, 2020 (JP) ................................. 2020-168513
Jul. 27, 2021 (JP) ................................. 2021-122653

(51) Int. Cl.
*H04N 23/95* (2023.01)
*G01J 3/28* (2006.01)
(Continued)

(52) U.S. Cl.
CPC ............ *H04N 23/95* (2023.01); *G01J 3/2823* (2013.01); *H04N 23/10* (2023.01); *H04N 25/13* (2023.01); *G01J 2003/2826* (2013.01)

(58) Field of Classification Search
CPC ........ H04N 23/95; H04N 23/10; H04N 25/13; G01J 3/2823; G01J 2003/2826;
(Continued)

(56) References Cited

U.S. PATENT DOCUMENTS 10,497,095 B2 * 12/2019 Xiong ....................... G06T 5/50
10,861,143 B2 * 12/2020 Kim ........................ G06T 5/60
(Continued)

FOREIGN PATENT DOCUMENTS

JP 2003-527594 9/2003
JP 2003-535330 11/2003
(Continued)

OTHER PUBLICATIONS

International Search Report of PCT application No. PCT/JP2021/035122 dated Dec. 14, 2021.

*Primary Examiner* — Yogesh K Aggarwal
(74) *Attorney, Agent, or Firm* — Wenderoth, Lind & Ponack, L.L.P.

(57) ABSTRACT

A processing apparatus is connected to one or more terminals including a hyperspectral sensor that generates compressed image data which is hyperspectral information of a target compressed as two-dimensional image information over a network. The processing apparatus includes a storage device that stores data sets of samples and a first reconstruction table for generating hyperspectral data from the compressed image data, the data set of each sample includes hyperspectral data of the sample and data indicative of a property value of the sample; and a processing circuit that generates a statistical model for estimating the property value from the hyperspectral data on the basis of the data sets of the samples and generates a second reconstruction table by editing the first reconstruction table in accordance with the statistical model thus generated.

16 Claims, 51 Drawing Sheets

(51) Int. Cl.
*H04N 23/10* (2023.01)
*H04N 25/13* (2023.01)

(58) Field of Classification Search
CPC ........... G01J 2003/283; G01J 2003/284; G01J 3/2846; G01J 3/36; G01N 21/27; G06T 7/00
See application file for complete search history.

(56) References Cited

U.S. PATENT DOCUMENTS

| | | |
|---|---|---|
| 2016/0138975 A1 | 5/2016 | Ando et al. |
| 2021/0140891 A1 | 5/2021 | Okuno et al. |

FOREIGN PATENT DOCUMENTS

| | | |
|---|---|---|
| WO | 2001/069191 | 9/2001 |
| WO | 2001/092859 | 12/2001 |
| WO | 2019/117177 | 6/2019 |

\* cited by examiner

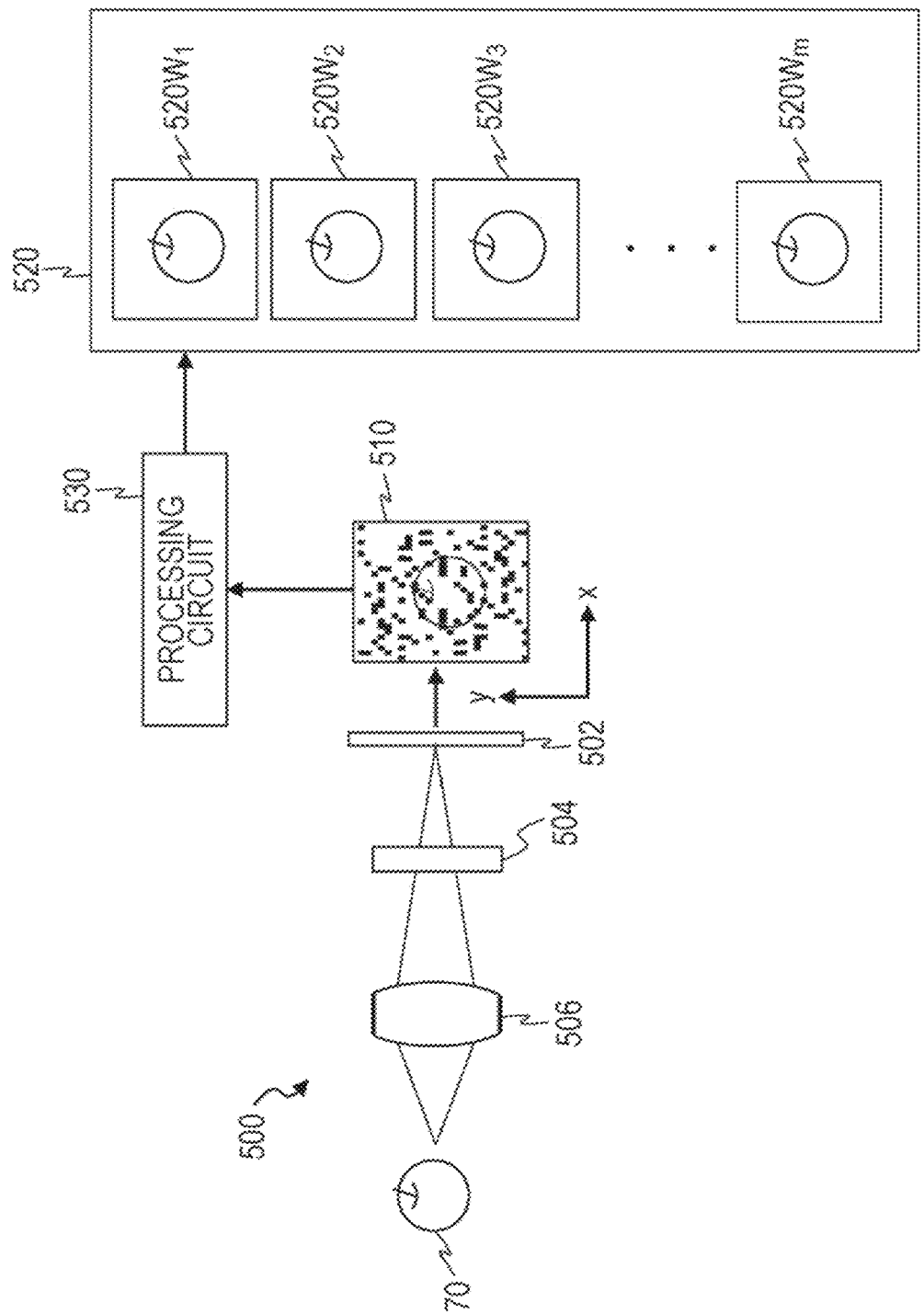

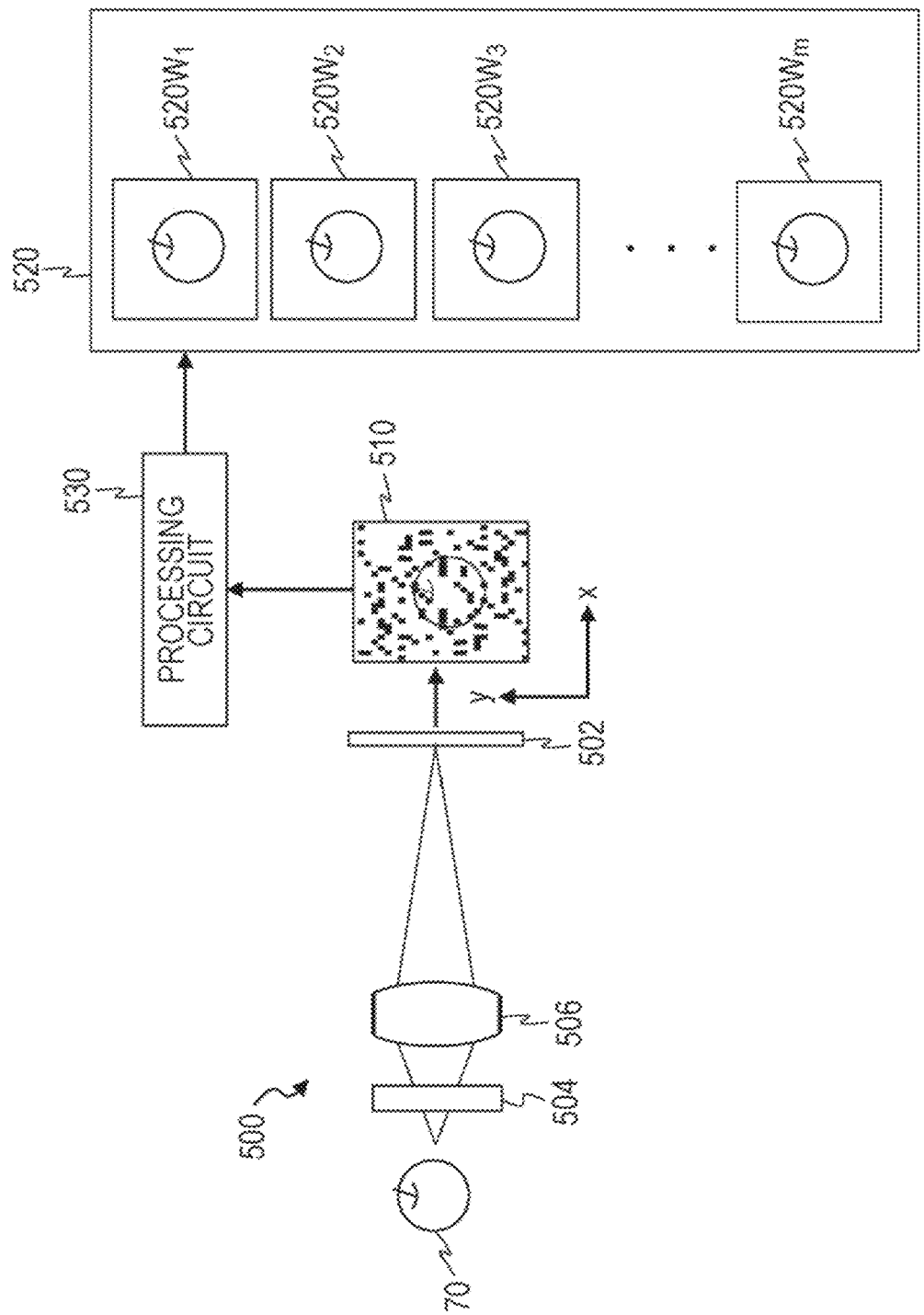

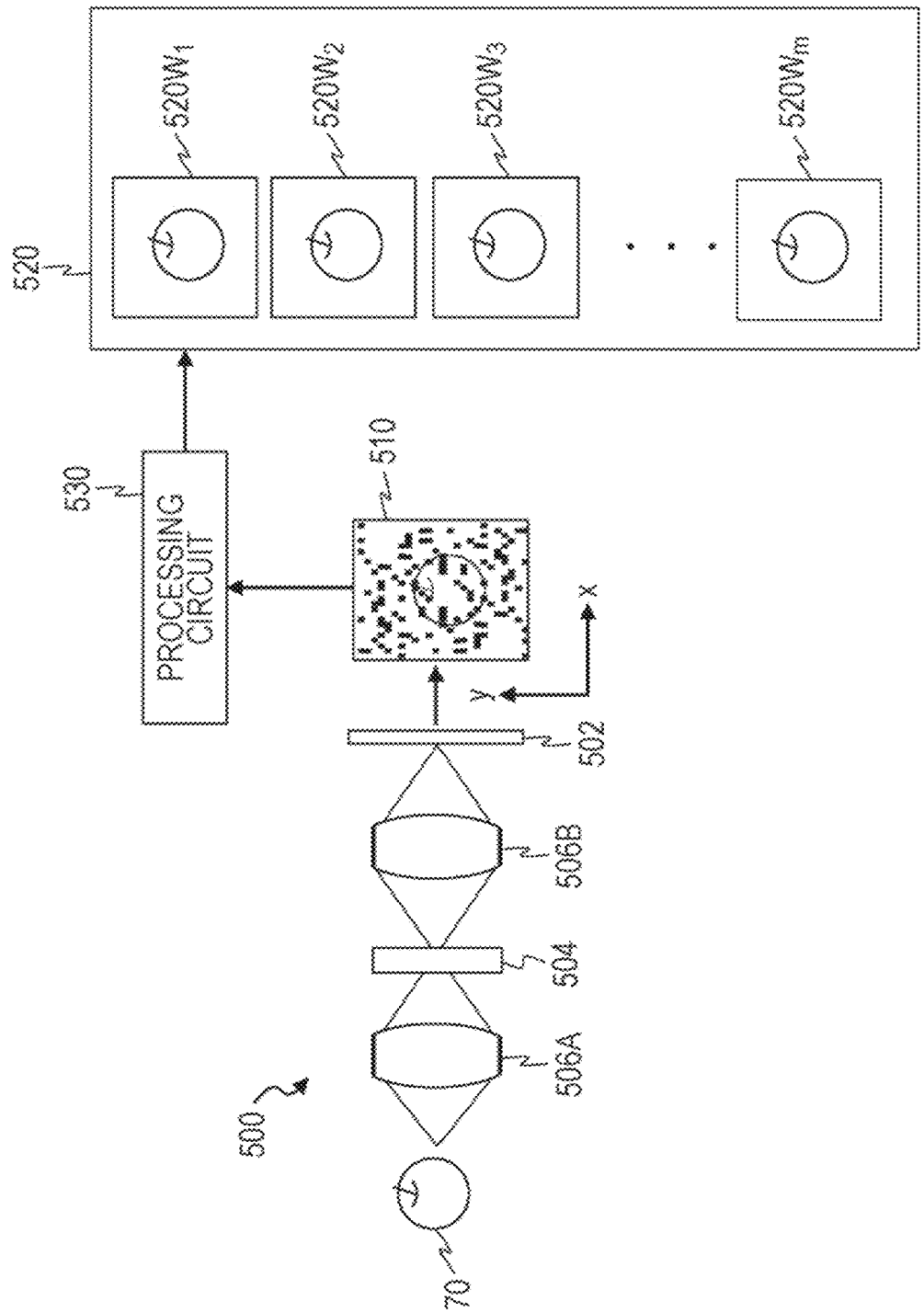

FIG. 6A $1 \leq i \leq n$
$1 \leq j \leq m$

| SUGAR CONTENT | LUMINANCE VALUE FOR EACH WAVELENGTH BAND (UNIT: nm) | | | | | | | | |
|---|---|---|---|---|---|---|---|---|---|
| | 451-455 | 456-460 | 461-465 | ***** | 936-940 | 941-945 | 946-950 | |
| g1 | s11 | s12 | s13 | s1j | s1 m-2 | s1 m-1 | s1 m | ****** |
| g2 | s21 | s22 | s23 | s2j | s2 m-2 | s2 m-1 | s2 m | ****** |
| ... | ... | ... | ... | ... | ... | ... | ... | |
| gi | si1 | si2 | si3 | sij | si m-2 | si m-1 | si m | ****** |
| ****** | ****** | ****** | ****** | ****** | ****** | ****** | ****** | |

FIG. 6B $1 \leq i_x \leq m'$

| LUMINANCE VALUE FOR EACH WAVELENGTH BAND (UNIT: nm) | | | | | | | | | |
|---|---|---|---|---|---|---|---|---|---|
| 451-500 | 501-590 | 591-595 | ***** | 631-635 | 636-665 | 666-670 | ***** | 845-850 | 851-900 | 901-950 |
| d11 | d12 | d13 | ***** | d1j₁ | d1j₂ | d1j₃ | ***** | d1j₄ | d1 m'-1 | d1 m' |
| d21 | d22 | d23 | ***** | d2j₁ | d2j₂ | d2j₃ | ***** | d2j₄ | d2 m'-1 | d2 m' |
| ***** | ***** | ***** | | ***** | ***** | ***** | | ***** | ***** | ***** |

| NUMBER OF PRINCIPAL COMPONENTS: k |
|---|
| DESIGNATED PRINCIPAL COMPONENT: l |
| C l1 |
| ⋮ |
| C lj |
| ⋮ |
| C lm' |

$1 \leq j \leq m'$
$1 \leq l \leq k$

ESTIMATED SUGAR CONTENT
= $\alpha \times$ PRINCIPAL COMPONENT SCORE + $\beta$

| DESIGNATED PRINCIPAL COMPONENT: FIRST PRINCIPAL COMPONENT | |
|---|---|
| PRINCIPAL COMPONENT SCORE RANGE | SUGAR CONTENT |
| < -0.15 | 12 |
| -0.15 ≤    < -0.1 | 10 |
| ⋮ | ⋮ |
| 0.1 ≤    < 0.15 | 4 |
| 0.15 ≤ | 2 |

FIG. 25A

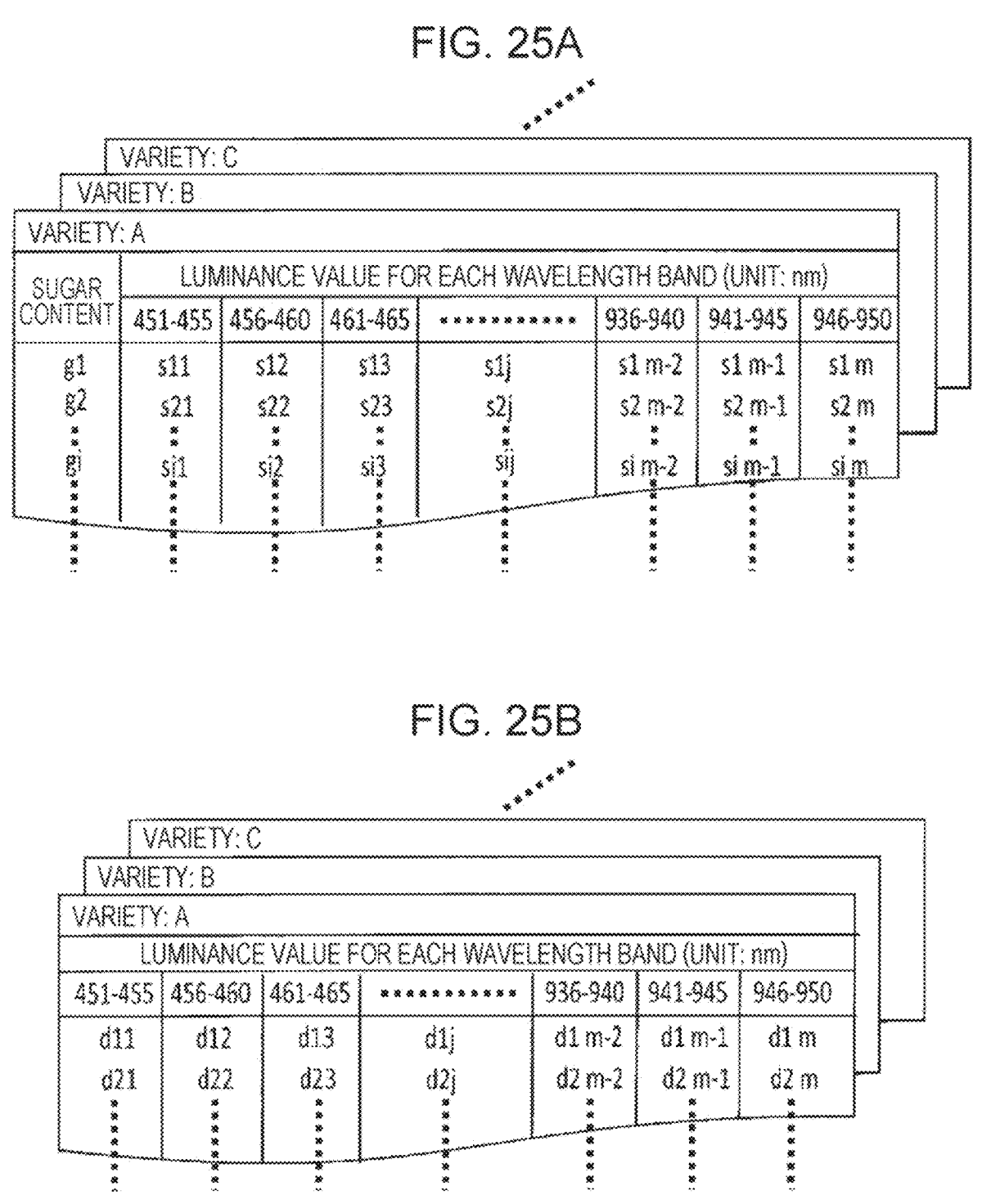

| VARIETY: C | | | | | | | |
| VARIETY: B | | | | | | | |
| VARIETY: A | | | | | | | |
| SUGAR CONTENT | LUMINANCE VALUE FOR EACH WAVELENGTH BAND (UNIT: nm) | | | | | | |
| | 451-455 | 456-460 | 461-465 | ············ | 936-940 | 941-945 | 946-950 |
| $g_1$ | $s_{11}$ | $s_{12}$ | $s_{13}$ | $s_{1j}$ | $s_{1\,m-2}$ | $s_{1\,m-1}$ | $s_{1\,m}$ |
| $g_2$ | $s_{21}$ | $s_{22}$ | $s_{23}$ | $s_{2j}$ | $s_{2\,m-2}$ | $s_{2\,m-1}$ | $s_{2\,m}$ |
| $g_i$ | $s_{i1}$ | $s_{i2}$ | $s_{i3}$ | $s_{ij}$ | $s_{i\,m-2}$ | $s_{i\,m-1}$ | $s_{i\,m}$ |

FIG. 25B

| VARIETY: C | | | | | | |
| VARIETY: B | | | | | | |
| VARIETY: A | | | | | | |
| LUMINANCE VALUE FOR EACH WAVELENGTH BAND (UNIT: nm) | | | | | | |
| 451-455 | 456-460 | 461-465 | ············ | 936-940 | 941-945 | 946-950 |
| $d_{11}$ | $d_{12}$ | $d_{13}$ | $d_{1j}$ | $d_{1\,m-2}$ | $d_{1\,m-1}$ | $d_{1\,m}$ |
| $d_{21}$ | $d_{22}$ | $d_{23}$ | $d_{2j}$ | $d_{2\,m-2}$ | $d_{2\,m-1}$ | $d_{2\,m}$ |

FIG. 26C

VARIETY ID  A

| α | ** |
| β | ** |

ESTIMATED SUGAR CONTENT
= α×PRINCIPAL COMPONENT SCORE +β

FIG. 26D

VARIETY ID  A

TARGET PRINCIPAL COMPONENT:
FIRST PRINCIPAL COMPONENT

| PRINCIPAL COMPONENT SCORE RANGE | SUGAR CONTENT RANGE |
|---|---|
| < −0.15 | 12 |
| −0.15 ≤      < −0.1 | 10 |
| ⋮ | ⋮ |
| 0.1 ≤      < 0.15 | 4 |
| 0.15 ≤ | 2 |

FIG. 36A

| TERMINAL ID 8 bit | IMAGE ID 8 bit | REGION ID 8 bit | SUGAR CONTENT 8 bit | REGION ID 8 bit | SUGAR CONTENT 8 bit | ⋯ | REGION ID 8 bit | SUGAR CONTENT 8 bit |

FIG. 36B

| TERMINAL ID 8 bit | IMAGE ID 8 bit | NUMBER OF REGIONS 8 bit | SUGAR CONTENT 8 bit | SUGAR CONTENT 8 bit | ⋯ | IMAGE ID 8 bit | NUMBER OF REGIONS 8 bit | SUGAR CONTENT 8 bit | SUGAR CONTENT 8 bit | ⋯ |

{ NUMBER OF REGIONS }

| | WEIGHT | | | |
|---|---|---|---|---|
| | 451-455 | 456-460 | •••••••••••••••• | 946-950 |
| FIRST IMAGE | $W_{11}$ | $W_{12}$ | •••••••••••••••• | $W_{1m}$ |
| SECOND IMAGE | $W_{21}$ | $W_{22}$ | •••••••••••••••• | $W_{2m}$ |
| ⋮ | ⋮ | ⋮ | | ⋮ |

PROCESSING APPARATUS, METHOD, AND NON-TRANSITORY COMPUTER-READABLE RECORDING MEDIUM

BACKGROUND

1. Technical Field

The present disclosure relates to a processing apparatus, a method, and a non-transitory computer-readable recording medium for estimating a property of an object.

2. Description of the Related Art

In recent years, efforts have been made to produce agricultural products that taste better, for example, fruits or vegetables having a high sugar content. A sugar content of an agricultural product depends not only on a variety, but also on growth environment and process. It is therefore a common practice to measure sugar contents of agricultural products and ship such agricultural products with guaranteed sugar contents. A sugar content can be measured not only by a method using a sugar refractometer, but also by a non-destructive method. For example, International Publication No. 01/069191 discloses a method for estimating a property such as a Brix value indicative of a sugar content of a fruit on the basis of absorptance of light of kinds of wavelengths including a wavelength of an infrared ray. The system of International Publication No. 01/069191 estimates a property of a sample from scattered light generated when the sample is irradiated with light of a specific spectrum by using a regression model showing a relationship between the property of the sample and scattered light from the sample. Meanwhile, International Publication No. 01/092859 discloses a method for classifying samples such as cells by using multivariate analysis. International Publication No. 2019/117177 discloses a method for discriminating kinds of cells by using principal component analysis.

Meanwhile, U.S. Pat. No. 9,599,511 discloses an example of a hyperspectral imaging apparatus using compressed sensing. This imaging apparatus includes an encoder, which is an array of optical filters that are different in wavelength dependence of light transmittance, an image sensor that detects light that has passed through the encoder, and a signal processing circuit. The encoder is disposed on an optical path connecting a subject and the image sensor. The image sensor concurrently detects, for each pixel, light in which components of wavelengths bands are superimposed and thereby acquires a single wavelength-multiplexed image. The signal processing circuit reconstructs image data for each of the wavelength bands by applying compressed sensing to the acquired wavelength-multiplexed image by using information on a spatial distribution of spectral transmittance of the encoder.

SUMMARY

One non-limiting and exemplary embodiment provides a technique for estimating a property of a target such as a sugar content of an agricultural product.

In one general aspect, the techniques disclosed here feature a processing apparatus connected to one or more terminals including a hyperspectral sensor that generates compressed image data which is hyperspectral information of a target compressed as two-dimensional image information over a network. The processing apparatus includes a storage device that stores data sets of samples and a first reconstruction table for generating hyperspectral data from the compressed image data, the data set of each sample includes hyperspectral data of the sample and data indicative of a property value of the sample; and a processing circuit that generates a statistical model for estimating the property value from the hyperspectral data on the basis of the data sets of the samples and generates a second reconstruction table by editing the first reconstruction table in accordance with the statistical model thus generated.

According to the aspect of the present disclosure, it is possible to improve accuracy of estimation of a property of a target such as a sugar content of an agricultural product.

It should be noted that general or specific embodiments of the present disclosure may be implemented as a system, an apparatus, a method, an integrated circuit, a computer program, a computer-readable storage medium such as a recording disc, or any selective combination thereof. The computer-readable storage medium may include a volatile storage medium or may include a non-volatile storage medium such as a compact disc-read only memory (CD-ROM). The apparatus may include one or more apparatuses. In a case where the apparatus includes two or more apparatuses, the two or more apparatuses may be disposed in one piece of equipment or may be separately disposed in two or more separate pieces of equipment. In the specification and claims, the "apparatus" can mean not only a single apparatus, but also a system including apparatuses.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3B schematically illustrates another example of the configuration of the hyperspectral camera;

FIG. 3C schematically illustrates still another example of the configuration of the hyperspectral camera;

FIG. 3D schematically illustrates still another example of the configuration of the hyperspectral camera;

FIG. 6A illustrates an example of training data stored in a first storage device;

FIG. 6B illustrates an example of spectral data transmitted from a sugar content estimation apparatus and stored in the first storage device;

FIG. 25A illustrates an example of model training data stored in a first storage device;

FIG. 25B illustrates an example of data based on spectral data transmitted from each terminal that is stored in the first storage device;

FIG. 26C illustrates an example of data of an estimation model stored in the third storage device;

FIG. 26D illustrates another example of data of the estimation model stored in the third storage device;

FIG. 36A illustrates an example of data transmitted by a statistical learning apparatus;

FIG. 36B illustrates another example of data transmitted by the statistical learning apparatus;

DETAILED DESCRIPTIONS

Figure 1:
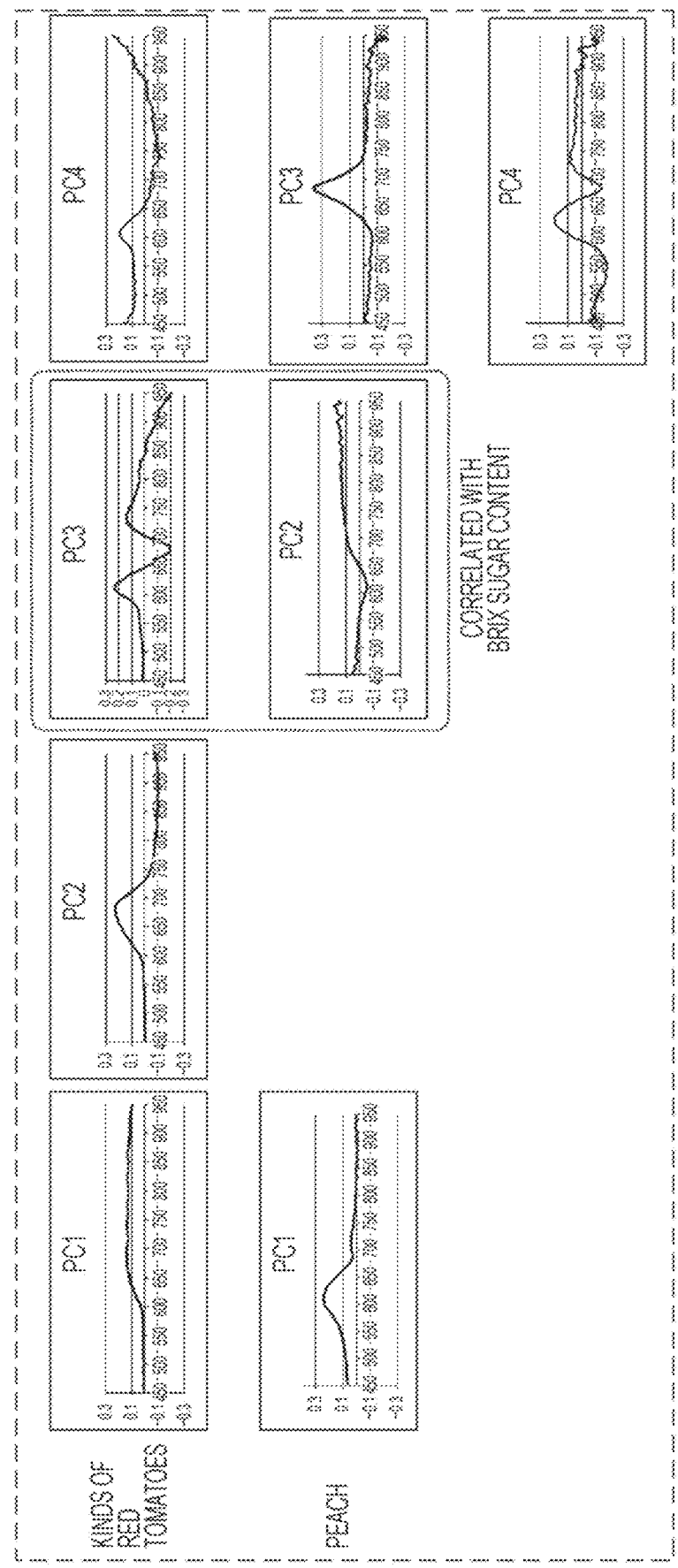
FIG. 1 illustrates an example of a result of principal component analysis on spectral data of an agricultural product.

In the present disclosure, all or a part of any of circuit, unit, device, part or portion, or any of functional blocks in the block diagrams may be, for example, implemented as one or more of electronic circuits including a semiconductor device, a semiconductor integrated circuit (IC) or a large scale integration (LSI). The LSI or IC can be integrated into one chip, or also can be a combination of chips. For example, functional blocks other than a memory may be integrated into one chip. The name used here is LSI or IC, but it may also be called system LSI, very large scale integration (VLSI), or ultra large scale integration (ULSI) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the circuit, unit, device, part or portion are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

Underlying Knowledge Forming Basis of the Present Disclosure

Underlying knowledge forming basis of the present disclosure will be described before embodiments of the present disclosure are described.

Many objects such as foods, living organisms, soap, and candles contain various chemical substances as components. As for objects that are not non-transparent and in which even slight scattering of light occurs unlike metals, a content or a concentration of a specific component contained in an object can be estimated by detecting light reflected by the object or light that has passed through the object. Some substances have a property of absorbing especially light of one or more specific wavelength bands. By using such a property, a property of an object can be estimated by irradiating the object with light and observing a spectrum of light scattered on the object or light that has passed through the object. For example, a property of an object can be estimated by using a regression model that defines a relationship between absorptance or reflectance at each wavelength and a content or a concentration of a target substance. Specifically, a content or a concentration of a target substance can be estimated by irradiating an object whose content or concentration of the target substance is unknown with light, extracting information on a necessary wavelength from a result of detection of light scattered on the object or light that has passed through the object, and applying the information to a regression model. The regression model is generated on the basis of an optical property of the target substance.

Accordingly, a change resulting from an object such as a food containing the target substance as a component is supposed to be small, but actually, a model varies depending on an object to be observed. In view of this, a method of statistically modeling, from actual data, a relationship between a spectrum of light scattered on an object to be actually observed or light that has passed through the object and a content or a concentration of a target substance irrespective of an optical property of the substance is also proposed. According to these methods using a regression model or a statistical model, in a case where an object different from an object observed when a model is generated is observed, it is sometimes impossible to correctly estimate a content or a concentration of a target substance because of incompatibility of the model with the object. For example, in a case where a sugar content of a fruit is estimated, it is sometimes impossible to accurately estimate a sugar content of a different variety although a sugar content of a variety used when a statistical model is created can be estimated.

The inventors of the present invention studied a method of conducting principal component analysis regarding data of a large number of samples indicative of a spectrum of light scattered on a surface of a fruit and estimating a sugar content on the basis of a model showing a relationship between a principal component score of an obtained specific principal component and a sugar content of a fruit to be observed. FIG. 1 illustrates a result of actually conducted principal component analysis. FIG. 1 illustrates an example of a result of principal component analysis conducted on spectral data of surfaces of kinds of red tomatoes and an example of a result of principal component analysis conducted on a spectral data of a surface of a peach. Principal components obtained as a result of the principal component analysis are given numbers in an order of a rate of contribution. In FIG. 1, PC1, PC2, PC3, and PC4 represent a first principal component, a second principal component, a third principal component, and a fourth principal component, respectively. In FIG. 1, the horizontal axis of each graph represents a wavelength, and the vertical axis of each graph represents principal component loading. Spectrum data of each sample in this example includes data of a light intensity of each of a large number of wavelengths included in a wavelength range from 450 nm to 950 nm. The spectral data of each sample was acquired by imaging a target fruit by a hyperspectral camera.

As illustrated in FIG. 1, a pattern of loading of each principal component concerning spectral data of the tomatoes and a pattern of loading of each principal component concerning spectral data of the peach are markedly different. However, in both of the tomatoes and the peach, a correlation between a principal component score of a certain principal component and a sugar content was confirmed. In the principal component analysis of the spectral data acquired by imaging the tomatoes, a correlation between a principal component score of the third principal component and a sugar content (a Brix value in this example) was confirmed. Meanwhile, in the principal component analysis of the spectral data acquired by imaging the peach, a correlation between a principal component score of the second principal component and a sugar content was confirmed. However, a pattern of loading of the third principal component of the tomatoes and a pattern of loading of the second principal component of the peach are markedly different. This shows that in a case where an amount or a concentration of a substance is estimated on the basis of absorbency of light by the substance, an estimation result varies depending on a condition of a target such as transmittance of a fruit skin or a state of the substance contained in the fruit. As described above, it is difficult to estimate a property such as a sugar content on the basis of only an optical property of a target substance.

Figure 2:
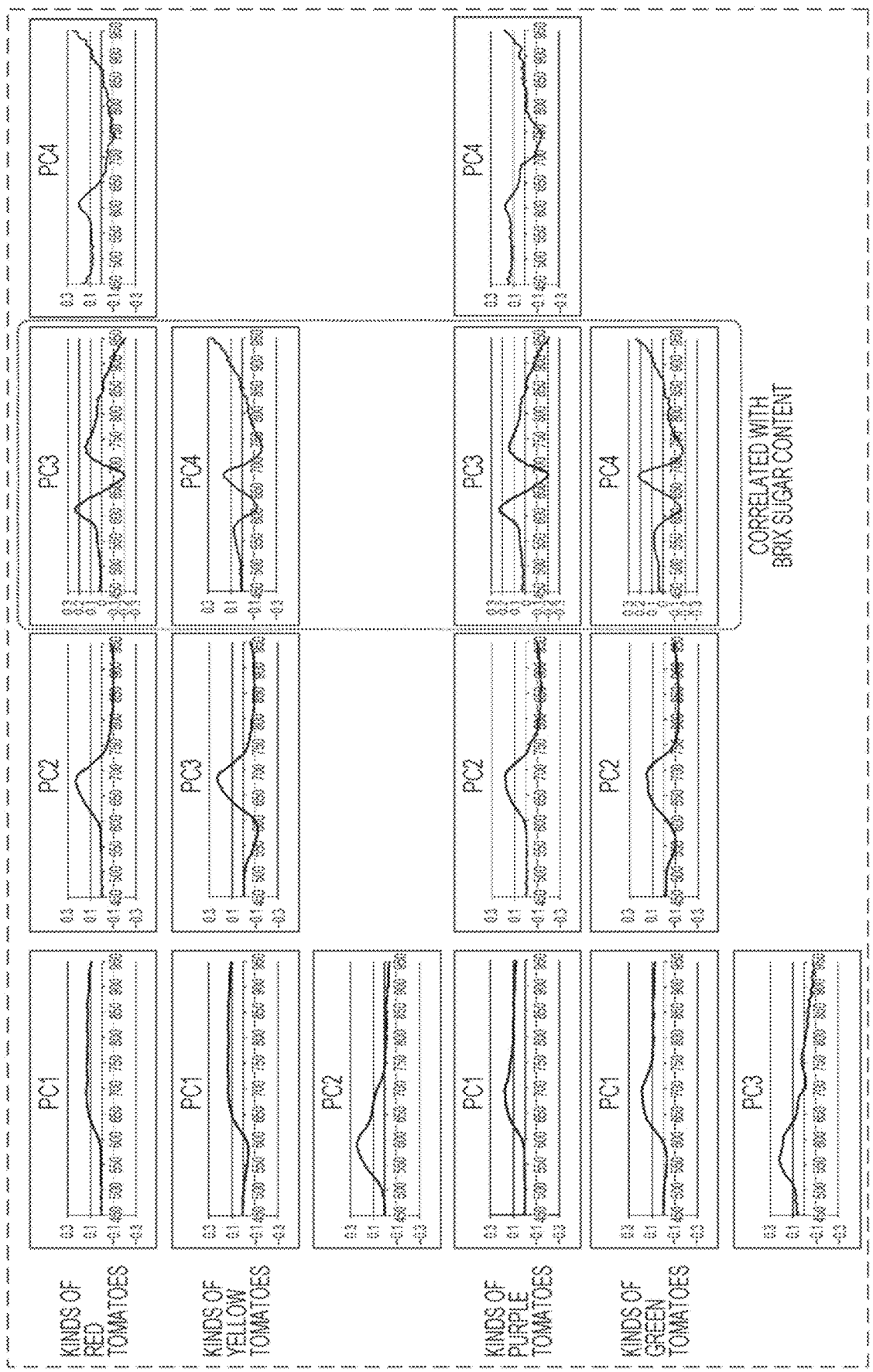
FIG. 2 shows that a result of principal component analysis of spectral data varies depending on a variety of a tomato.

Furthermore, the inventors of the present invention found that results of principal component analysis on crops of different varieties can be markedly different even if the crops are of the same kind. FIG. 2 shows that a result of principal component analysis of spectral data varies depending on a variety of tomato. The graphs illustrated in FIG. 2 illustrate an example of principal component loading of first to fourth principal components obtained by principal component analysis regarding four varieties of tomatoes. In the example of FIG. 2, principal component analysis based on spectral data of a large number of samples was conducted regarding a red tomato, a yellow tomato, a purple tomato, and a green tomato. It was confirmed that a principal component having a similar pattern of loading was obtained irrespective of a difference in variety although there is a difference in rate of contribution. However, a plus or minus sign of principal component loading is sometimes inversed depending on a variety in a process of extracting a principal component. As for spectral data of tomatoes, an example in which a plus or minus sign of loading of a principal component whose principal component score is correlated with a sugar content is inversed depending on a difference in combination of varieties used for analysis and a model for estimating a sugar content from a principal component score needs to be changed was confirmed.

New varieties of agricultural products are vigorously developed, and a variety that did not exist when a model was created is sometimes newly distributed on the market. In such a case, according to a method based on a conventional model, it is impossible to accurately estimate a sugar content of an agricultural product. This problem is not a problem unique to a sugar content, and can similarly occur even for any property value that depends on a content or a concentration of a specific substance contained in a target.

Based on the above consideration, the inventors of the present invention developed a technique for, in a case where spectral data of a target is markedly different from spectral data of samples used at a time of creation of a model, detecting the difference and prompting a change of a statistical model and disclosed the technique in Japanese Patent Application No. 2020-095864. Such a technique allows a user to know necessity of a change of a model early, thereby allowing the user to speedily create a statistical model that matches a new target.

In the technique, hyperspectral data of a target is acquired by a device that can acquire luminance information of a larger number of wavelength bands than a typical camera that acquires luminance information of three primary colors of red (R), green (G), and blue (B). Hereinafter, data including luminance information of at least four wavelength bands is referred to as "hyperspectral data". The hyperspectral data can be generated not only by a hyperspectral camera, but also by a device that can acquire spectrum information of one point of a target. Hereinafter, a device that can generate hyperspectral data or a device that generates data such as an image for generating hyperspectral data is referred to as a "hyperspectral sensor".

The hyperspectral data can be, for example, generated by using the technique of compressed sensing disclosed in U.S. Pat. No. 9,599,511. In the technique, an imaging apparatus that generates a hyperspectral image is used. The imaging apparatus includes an image sensor and a filter array called an encoder disposed on an optical path of light incident on the image sensor. Filters of the filter array have different transmission spectra. The imaging apparatus including such a filter array generates two-dimensional image data in which hyperspectral information is compressed. Hyperspectral data can be generated for each pixel by computation using the generated two-dimensional image data and data (hereinafter referred to as a "reconstruction table") of a matrix format reflecting a spatial distribution of the transmission spectra of the filter array.

An example of a configuration of an imaging apparatus (hereinafter referred to as a "hyperspectral camera") that generates hyperspectral data by using a compressed sensing technique is described below with reference to FIGS. 3A to 4B.

Figure 3A:
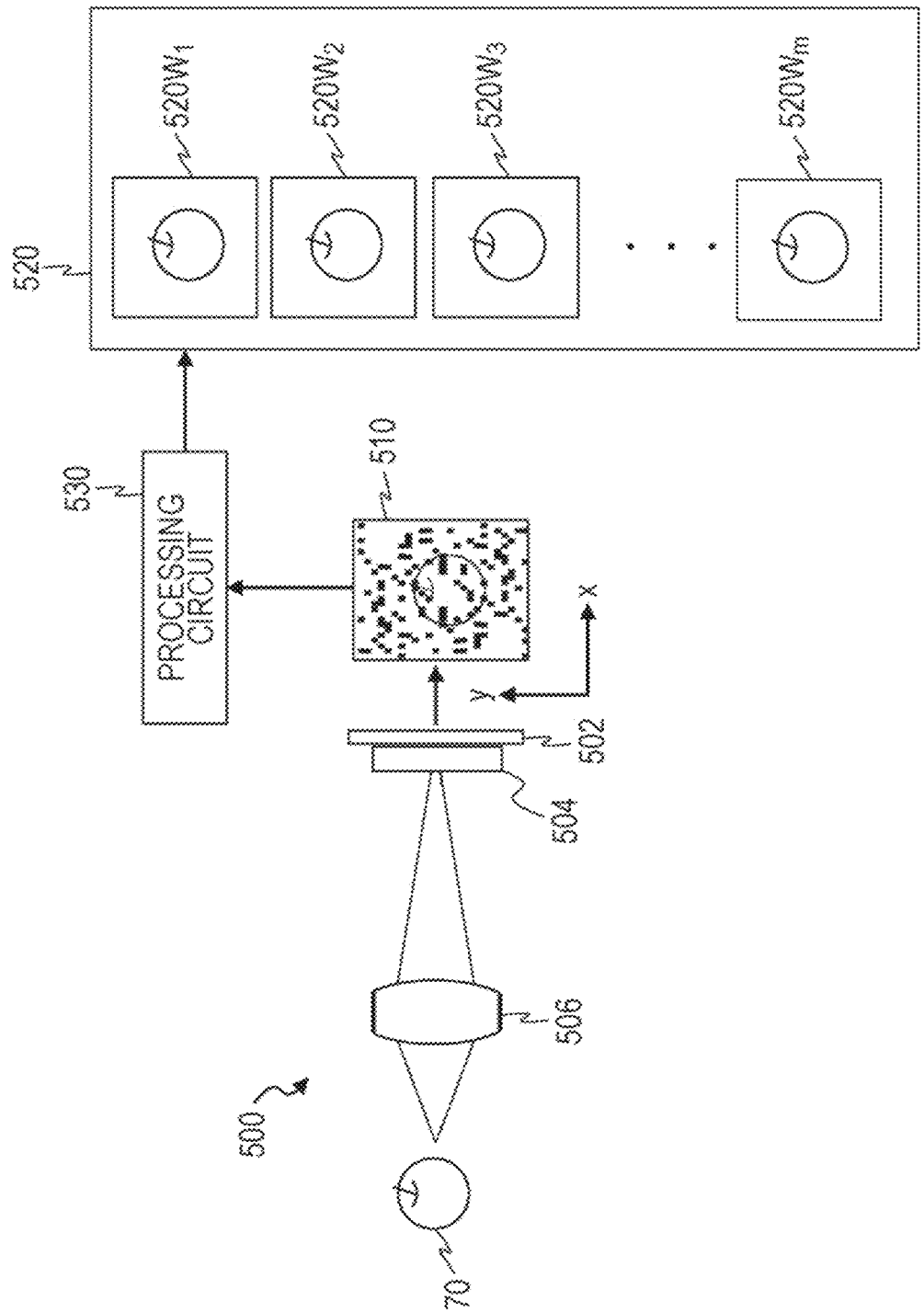
FIG. 3A schematically illustrates an example of a configuration of a hyperspectral camera.

FIG. 3A schematically illustrates an example of a configuration of a hyperspectral camera 500. The hyperspectral camera 500 includes an image sensor 502, a filter array 504, and an optical system 506. The filter array 504 has a structure and a function similar to the "encoder" disclosed in U.S. Pat. No. 9,599,511. The optical system 506 and the filter array 504 are disposed on an optical path of light incident from a target 70. The filter array 504 is disposed between the optical system 506 and the image sensor 502.

FIG. 3A illustrates an apple as an example of the target 70. The target 70 is not limited to an apple and may be any of other agricultural products. The image sensor 502 generates data of a compressed image 510, which is information on wavelength bands compressed as a two-dimensional monochromatic image. A processing circuit 530 generates image data concerning each of wavelength bands included in a preset target wavelength range on the basis of the data of the compressed image 510 generated by the image sensor 502. The image data of the wavelength bands thus generated is referred to as "hyperspectral image data". It is assumed here that the number of wavelength bands included in the target wavelength range is m (m is an integer of 4 or more). Hereinafter, image data of the wavelength bands thus generated are referred to as images $520W_1$, $520W_2$, ..., and $520W_m$, which are collectively referred to as hyperspectral images 520. Hereinafter, signals indicative of an image, that is, a set of signals indicative of pixel values of pixels are sometimes referred to simply as an "image". The wavelength bands may be W1, W2, ..., and Wm. The wavelength band W1 and the image $520W_1$ correspond to each other, the wavelength band W2 and the image $520W_2$ correspond to each other, ..., and the wavelength band Wm and the image $520W_m$ correspond to each other.

The filter array 504 is an array of light-transmitting filters arranged in rows and columns. The filters include kinds of filters that are different from each other in spectral transmittance, that is, wavelength dependence of light transmittance. The filter array 504 modulates and outputs an intensity of incident light for each wavelength. This process performed by the filter array 504 is hereinafter referred to as "encoding".

In the example illustrated in FIG. 3A, the filter array 504 is disposed in the vicinity of or directly above the image sensor 502. The "vicinity" as used herein means that the filter array 504 is close to such a degree that an image of light from the optical system 506 is formed on a surface of the filter array 504 with a certain degree of clarity. The "directly above" means that the filter array 504 and the image sensor 502 are close to such a degree that there is almost no gap therebetween. The filter array 504 and the image sensor 502 may be unified as a single member.

The optical system 506 includes at least one lens. Although the optical system 506 is illustrated as a single lens in FIG. 3A, the optical system 506 may be a combination of lenses. The optical system 506 forms an image on an imaging surface of the image sensor 502 through the filter array 504.

The filter array 504 may be disposed away from the image sensor 502. FIGS. 3B to 3D illustrate examples of the configuration of the hyperspectral camera 500 in which the filter array 504 is disposed away from the image sensor 502. In the example of FIG. 3B, the filter array 504 is disposed between the optical system 506 and the image sensor 502 and is disposed away from the image sensor 502. In the example of FIG. 3C, the filter array 504 is disposed between the target 70 and the optical system 506. In the example of FIG. 3D, the hyperspectral camera 500 includes two optical systems 506A and 506B, and the filter array 504 is disposed between the two optical systems 506A and 506B. As in these examples, an optical system including one or more lenses may be disposed between the filter array 504 and the image sensor 502.

The image sensor 502 is a monochromatic photodetector having photodetection elements (hereinafter also referred to as "pixels") arranged two-dimensionally. The image sensor 502 can be, for example, a charge-coupled device (CCD), a complementary metal oxide semiconductor (CMOS) sensor, or an infrared array sensor. Each of the photodetection elements includes, for example, a photodiode. The image sensor 502 need not necessarily be a monochromatic sensor. For example, a color-type sensor including R/G/B filters, R/G/B/IR filters, or R/G/B/W filters may be used. Use of a color-type sensor can increase an amount of information concerning a wavelength and can improve accuracy of reconstruction of the hyperspectral images 520. A wavelength range to be acquired may be any wavelength range, and is not limited to a visible wavelength range and may be a wavelength range such as an ultraviolet wavelength range, a near-infrared wavelength range, a mid-infrared wavelength range, or a far-infrared wavelength range.

The processing circuit 530 is, for example, an integrated circuit including a processor such as a CPU. The processing circuit 530 generates the images $520W_1$, $520W_2$, ..., and $520W_m$ including information on the wavelength bands, that is, the data of the hyperspectral images 520 on the basis of the compressed image 510 acquired by the image sensor 502 and a reconstruction table prepared in advance.

Figure 4A:
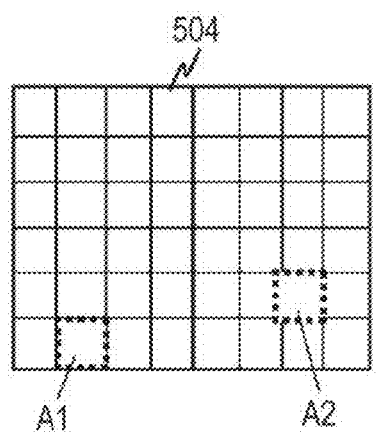
FIG. 4A schematically illustrates an example of a filter array.

FIG. 4A schematically illustrates an example of the filter array 504. The filter array 504 has regions arranged two-dimensionally. In each of the regions, an optical filter having individually set spectral transmittance is disposed. The spectral transmittance is expressed as a function $T(\lambda)$ where $\lambda$ is a wavelength of incident light. The spectral transmittance $T(\lambda)$ can take a value greater than or equal to 0 and less than or equal to 1.

In the example illustrated in FIG. 4A, the filter array 504 has 48 rectangular regions arranged in 6 rows and 8 columns. This is merely an example, and a larger number of regions can be provided in actual use. For example, the number of regions may be similar to the number of pixels of the image sensor 502. The number of filters included in the filter array 504 is, for example, decided within a range from tens of filters to tens of millions of filters.

Figure 4B:
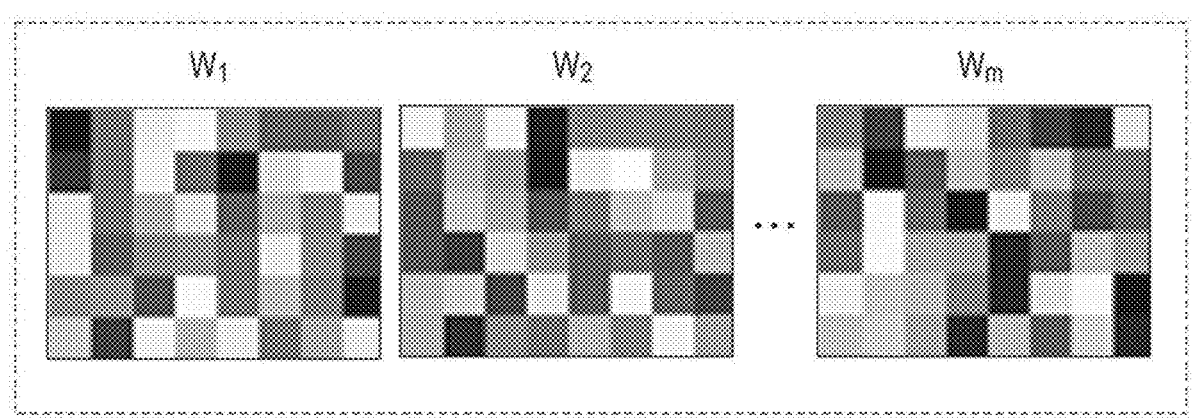
FIG. 4B illustrates an example of a spatial distribution of light transmittance of each of wavelength bands W1, W2, . . . , and Wm included in a target wavelength range.

FIG. 4B illustrates an example of a spatial distribution of transmittance of light of each of the wavelength bands $W_1$, $W_2$, ..., $W_m$ included in the target wavelength range. In the example illustrated in FIG. 4B, differences in density among regions represent differences in transmittance. A paler region has higher transmittance, and a deeper region has lower transmittance. As illustrated in FIG. 4B, a spatial distribution of light transmittance varies depending on a wavelength band.

In the example illustrated in FIG. 4B, a gray-scale transmittance distribution in which transmittance of each region can take any value greater than or equal to 0 and less than or equal to 1 is assumed. However, the transmittance distribution need not necessarily be a gray-scale transmittance distribution. For example, a binary-scale transmittance distribution in which transmittance of each region can take either almost 0 or almost 1 may be employed. In the binary-scale transmittance distribution, each region allows transmission of a large part of light of at least two wavelength ranges among wavelength ranges included in the target wavelength range and does not allow transmission of a large part of light of a remaining wavelength range. The "large part" refers to approximately 80% or more. A certain cell among all cells, for example, a half of all the cells may be replaced with a transparent region.

The processing circuit 530 reconstructs the hyperspectral images 520 including information on the wavelength bands on the basis of the compressed image 510 output from the image sensor 502 and a reconstruction table indicative of a transmittance spatial distribution characteristic for each wavelength band of the filter array 504. A method for reconstructing the hyperspectral images 520 is described below.

Data to be obtained is data of the hyperspectral images 520, which is expressed as hyperspectral data f. The hyperspectral data f is data including image data $f_1$, $f_2$, ..., and $f_m$ of the respective wavelength bands where m is the number of wavelength bands. The image $520W_1$ of the first wavelength band may correspond to the image data $f_1$, the image $520W_2$ of the second wavelength band may correspond to the image data $f_2$, ..., and the image $520W_m$ of an m-th wavelength band may correspond to the image data $f_m$. It is assumed here that a lateral direction of the image is an x direction and a longitudinal direction of the image is a y direction, as illustrated in FIG. 3A. Each of the image data $f_1$, $f_2$, ..., and $f_m$ is two-dimensional data of $n_x \times n_y$ where $n_x$ is the number of pixels of the image data to be obtained in the x direction and $n_y$ is the number of pixels of the image data to be obtained in the y direction. Accordingly, the data f is three-dimensional data that has $n_x \times n_y \times m$ elements. This three-dimensional data is sometimes referred to as "hyperspectral image data" or a "hyperspectral data cube". Meanwhile, the number of elements of data g of the compressed image 510 acquired by encoding and multiplexing by the filter array 504 is $n_x \times n_y$. The data g can be expressed by the following formula (1).

$$g = Hf = H \begin{bmatrix} f_1 \\ f_2 \\ \vdots \\ f_m \end{bmatrix} \quad (1)$$

In the formula (1), each of $f_1$, $f_2$, ..., and $f_m$ is data having $n_x \times n_y$ elements. Accordingly, a vector of a right side is strictly a one-dimensional vector of $n_x \times n_y \times m$ rows and 1 column. A vector g is converted into a one-dimensional vector of $n_x \times n_y$ rows and 1 column, and is calculated. A matrix H represents conversion of performing encoding and intensity modulation of components $f_1$, $f_2$, ..., and $f_m$ of the vector f by using different pieces of encoding information (also referred to as "mask information") for the respective wavelength bands and adding results thus obtained. Accordingly, H is a matrix of $n_x \times n_y$ rows and $n_x \times n_y \times m$ columns. Data indicative of this matrix H corresponds to the "reconstruction table" described above.

It seems that given the vector g and the matric H, the data f can be calculated by solving an inverse problem of the formula (1). However, since the number of elements $n_x \times n_y \times m$ of the data f to be obtained is larger than the number of elements $n_x \times n_y$ of the acquired data g, this problem is an ill-posed problem and cannot be solved. In view of this, the processing circuit 530 finds a solution by using a method of compressed sensing while utilizing redundancy of the images included in the data f. Specifically, the data f to be obtained is estimated by solving the following formula (2).

$$f' = \underset{f}{\mathrm{argmin}} \{\|g - Hf\|_{l_2} + \tau \Phi(f)\} \quad (2)$$

In the formula (2), f' represents the estimated data f. The first term in the parentheses in the above formula represents a difference amount between an estimation result Hf and the acquired data g, that is, a residual term. Although a sum of squares is a residual term in this formula, an absolute value, a square-root of sum of squares, or the like may be a residual term. The second term in the parentheses is a regularization term or a stabilization term. The formula (2) means that f that minimizes a sum of the first term and the second term is found. The processing circuit 530 can calculate the final solution f by convergence of solutions by recursive iterative operation.

The first term in the parentheses in the formula (2) means operation of finding a sum of squares of a difference between the acquired data g and Hf obtained by converting f in the estimation process by the matrix H. $1(f)$ in the second term is a constraint condition in regularization of f and is a function reflecting sparse information of the estimated data. This function brings an effect of smoothing or stabilizing the estimated data. The regularization term can be, for example, expressed by discrete cosine transform (DCT), wavelet transform, Fourier transform, total variation (TV), or the like of f. For example, in a case where total variation is used, stable estimated data with suppressed influence of noise of the observed data g can be acquired. Sparsity of the target 70 in the space of the regularization term varies depending on texture of the target 70. A regularization term that makes the texture of the target 70 more sparse in the space of the regularization term may be selected. Alternatively, regularization terms may be included in calculation. $\tau$ is a weight coefficient. As the weight coefficient $\tau$ becomes larger, an amount of reduction of redundant data becomes larger, and a compression rate increases. As the weight coefficient $\tau$ becomes smaller, convergence to a solution becomes weaker. The weight coefficient $\tau$ is set to such a proper value that f converges to a certain extent and is not excessively compressed.

Note that in the configurations of FIG. 3B and FIG. 3C, an image encoded by the filter array 504 is acquired in a blurred state on the imaging surface of the image sensor 502. Therefore, the hyperspectral images 520 can be reconstructed by holding the blur information in advance and reflecting the blur information in the matrix H. The blur information is expressed by a point spread function (PSF). The PSF is a function that defines a degree of spread of a point image to surrounding pixels. For example, in a case where a point image corresponding to 1 pixel on an image spreads to a region of k×k pixels around the pixel due to blurring, the PSF can be defined as a coefficient group, that is, as a matrix indicative of influence on luminance of each pixel within the region. The hyperspectral images 520 can be reconstructed by reflecting influence of blurring of an encoding pattern by the PSF in the matrix H. Although the filter array 504 can be disposed at any position, a position where the encoding pattern of the filter array 504 does not disappear due to excessive spread can be selected.

Through the above processing, the hyperspectral images 520 can be constructed from the compressed image 510 acquired by the image sensor 502. The processing circuit 530 may extract a region including an image of the target 70 from the hyperspectral images 520 of the respective wavelength bands and decide a single representative value for each wavelength band by processing such as averaging values of pixels within the region. Data in which representative values thus decided are arranged in an order of the wavelength bands may be used as the hyperspectral data.

The hyperspectral data generated by the above method includes information on a light intensity or a luminance value of each of the wavelength bands included in the preset target wavelength range. Each of the wavelength bands has a relatively narrow band width. Each of the wavelength bands can have, for example, a width of approximately 1 nm to 20 nm. For example, in a case where the target wavelength range is a range from 451 nm to 950 nm and a width of each wavelength band is 5 nm, the target wavelength range includes 100 wavelength bands. In a case where a luminance value of each of such many wavelength bands is calculated by the above calculation, an amount of calculation becomes large, and it sometimes takes a long time to generate hyperspectral data.

Meanwhile, in a case where a property value such as a sugar content of a target is estimated, not all wavelength bands included in the target wavelength range are equally important, and an important wavelength band can vary depending on an optical property of the target. The inventors of the present invention arrived at compressing a size of a reconstruction table by integrating information on some wavelength bands of relatively low importance among wavelength bands included in a target wavelength range and thereby reducing a calculation amount required for reconstruction calculation and arrived at the configurations of the embodiments of the present disclosure described below. The embodiments of the present disclosure are summarized as follows.

A processing apparatus according to an exemplary embodiment of the present disclosure is connected to one or more terminals including a hyperspectral sensor that generates compressed image data which is hyperspectral information of a target compressed as two-dimensional image information over a network. The processing apparatus includes a storage device and a processing circuit. The storage device stores therein data sets of samples and a first reconstruction table for generating hyperspectral data from the compressed image data. The data set of each of the samples includes hyperspectral data of the sample and data indicative of a property value of the sample. The processing circuit generates a statistical model for estimating the property value from the hyperspectral data on the basis of the data sets of the samples and generates a second reconstruction table by editing the first reconstruction table in accordance with the generated statistical model.

The hyperspectral data can include luminance information for each of wavelength bands included in a target wavelength range. The first reconstruction table can be data for generating the luminance information for each of the wavelength bands from the compressed image data. Hereinafter, the first reconstruction table is sometimes referred to as a "complete reconstruction table". The second reconstruction table can be data for generating the luminance information for each of new wavelength bands obtained by integrating some of the wavelength bands from the compressed image data. In this case, a data size of the second reconstruction table is smaller than a data size of the first reconstruction table. Hereinafter, the second reconstruction table is sometimes referred to as a "reduced reconstruction table".

According to the above configuration, the second reconstruction table of a smaller size can be generated from the first reconstruction table in accordance with the statistical model generated on the basis of the data sets of the samples. The second reconstruction table holds detailed information on a wavelength band of high importance in estimation of the property value of the target, whereas information on some wavelength bands of relatively low importance is integrated and a size thereof is compressed. Use of the second reconstruction table can reduce a calculation amount necessary for generation of hyperspectral data as compared with a case where the first reconstruction table is used.

The processing circuit can calculate principal component loading of a specific principal component relevant with the property value by principal component analysis based on the hyperspectral data of the samples and generate the second reconstruction table from the first reconstruction table on the basis of the principal component loading.

The processing circuit can generate the second reconstruction table by deciding principal component loading of a specific principal component relevant with the property value by principal component analysis based on the hyperspectral data of the samples, deciding some wavelength bands whose degrees of contribution to the principal component are relatively low from among the wavelength bands on the basis of the principal component loading, and integrating pieces of information concerning the some wavelength bands in the first reconstruction table.

The hyperspectral sensor can include a filter array including filters having different transmission spectra. The first reconstruction table can be data reflecting a spatial distribution of the transmission spectra of the filter array. The first reconstruction table can be, for example, data in a matrix format described above.

The processing circuit may transmit the statistical model and the second reconstruction table to the terminal. In this case, a processor included in the terminal can generate hyperspectral image data from compressed image data generated by the hyperspectral sensor by using the transmitted second reconstruction table. This hyperspectral image data has a data size smaller than hyperspectral image data generated by using the first reconstruction table. The processor of the terminal can generate hyperspectral data by extracting a region of the target from generated hyperspectral image data and performing, for each of the wavelength bands corresponding to the second reconstruction table, processing such as averaging values of pixels in the region. The processor can estimate a property value of the target from the hyperspectral data by using the statistical model transmitted from the processing apparatus.

The processing circuit may generate the statistical model, the first reconstruction table, and the second reconstruction table for each predetermined classification. For example, the processing circuit may generate the statistical model, the first reconstruction table, and the second reconstruction table for each classification such as a crop species, a crop variety, a place of production, a cultivation method, or a used fertilizer. In this case, the processing circuit may acquire data indicative of a specific classification for which estimation processing is to be performed from the terminal and generate the statistical model, the first reconstruction table, and the second reconstruction table on the basis of the acquired data.

The processing circuit may acquire partial compressed image data generated by extracting data of a region from the compressed image data by the terminal, generate hyperspectral data corresponding to the region from the partial compressed image data by using the second reconstruction table, estimate the property value of the target from the hyperspectral data by using the statistical model, and transmit data indicative of the estimated property value to the terminal. In this case, the terminal can acquire an estimation result of the property value and output the estimation result, for example, display the estimation result on a display device without performing generation of hyperspectral data and estimation of a property value. It is therefore possible to lower performance required for the processor of the terminal as compared with a case where the terminal performs generation of hyperspectral data and estimation of a property value.

The processing circuit may acquire the compressed image data from the terminal, generate hyperspectral data from the compressed image data by using the second reconstruction table, estimate the property value of the target from the hyperspectral data by using the statistical model, and transmit data indicative of the estimated property value to the terminal. In this case, the terminal can transmit the compressed image data to the processing apparatus as it is and receive the data indicative of the property value estimated by the processing apparatus. It is therefore possible to further lower performance required for the processor of the terminal.

The processing circuit may acquire hyperspectral data generated from the compressed image data on the basis of the second reconstruction table by the terminal, estimate the property value of the target from the hyperspectral data on the basis of the statistical model, and transmit data indicative of the property value to the terminal. In this case, the terminal generates hyperspectral data on the basis of the second reconstruction table and transmits the hyperspectral data, but does not estimate a property value. The terminal can receive data indicative of the property value estimated by the processing apparatus and output an estimation result.

In a case where it is determined that it is necessary to change the statistical model and the second reconstruction table on the basis of hyperspectral data generated from the compressed image data on the basis of the second reconstruction table and the hyperspectral data in the data sets of the samples, the processing circuit may generate the statistical model again on the basis of the data sets of new samples and update the second reconstruction table in accordance with the statistical model generated again. This makes it possible to re-create a statistical model for an agricultural product of a new variety or an agricultural product produced by a new cultivation method that does not match the statistical model created before and optimize the second reconstruction table in accordance with the statistical model thus re-created.

A system according to an embodiment of the present disclosure includes the processing apparatus according to any of the above aspects and one or more terminals according to any of the above aspects. In a case where the system includes terminals, the first reconstruction table and the second reconstruction table can be generated for each of the terminals.

The present disclosure includes a signal processing method performed by a processor (or a processing circuit) included in the processing apparatus or the terminal according to any of the above aspects and a computer program that defines the signal processing method.

A processing apparatus according to another embodiment of the present disclosure is connected to one or more apparatuses including a hyperspectral sensor that generates compressed image data which is hyperspectral information of a target compressed as two-dimensional image information. The processing apparatus includes a storage device and a processing circuit. The storage device stores therein data sets of samples and a first reconstruction table for generating hyperspectral data from the compressed image data. The data set of each of the samples includes hyperspectral data of the sample and data indicative of property value of the sample. The processing circuit generates a model for converting the hyperspectral data into spectral data relevant with the property value on the basis of the data sets of the samples and generates a second reconstruction table for generating spectral data relevant with the property value from the compressed image data on the basis of the model and the first reconstruction table.

According to the above configuration, it is possible to generate a second reconstruction table for generating spectral data relevant with the property value from the compressed image data. The "spectral data relevant with the property value" can be, for example, data of a luminance image in which a value of one or more wavelength bands relevant with the property value is emphasized. The second reconstruction table is transmitted to an apparatus (e.g., an imaging apparatus) that generates compressed image data. The apparatus can generate spectral data relevant with property value from the compressed image data by using the second reconstruction table. For example, the apparatus can generate, as the spectral data, luminance image data in which a pixel having a higher property value (e.g., sugar content) has higher luminance. By generating such spectral data, it becomes easy for a user to specify, for example, a distribution of a property value of a target.

The hyperspectral data can include luminance information for each of wavelength bands included in a target wavelength range. The first reconstruction table can be data for generating the luminance information for each of the wavelength bands from the compressed image data. The second reconstruction table can be data for generating luminance information obtained by weighted-addition of the pieces of luminance information of the wavelength bands from the compressed image data.

In the above configuration, the second reconstruction table can be data for generating, from compressed image data, luminance image data in which each pixel has a value obtained by weighted-addition of luminance values of the respective wavelength bands. A weight is set to a larger value for a wavelength band having higher correlation with a property value.

A data size of the second reconstruction table may be smaller than a data size of the first reconstruction table. For example, the processing apparatus can generate the second reconstruction table of a smaller size by integrating pieces of information concerning some wavelength bands in the first reconstruction table. The integrated wavelength bands can be, for example, bands whose weight is zero or close to zero. By such data compression, it is possible to reduce a load of reconstruction processing using the second reconstruction table.

The processing circuit may calculate weights corresponding to the respective wavelength bands relevant with the property value by machine learning of the hyperspectral data of the samples. The second reconstruction table may be generated from the first reconstruction table on the basis of the weights. The machine learning may be learning based on statistical processing such as principal component analysis described above or independent component analysis or may be learning using a neural network. By using such machine learning, weights corresponding to the wavelength bands relevant with the property value can be properly generated.

The hyperspectral data can include luminance information for each of the wavelength bands included in the target wavelength range. The first reconstruction table can be data for generating the luminance information for each of the wavelength bands from the compressed image data. The processing circuit may generate the second reconstruction table by deciding weights corresponding to the respective wavelength bands by machine learning based on the hyperspectral data of the samples, deciding some wavelength bands whose weights are relatively low among the wavelength bands on the basis of the weights, and integrating pieces of information concerning the some wavelength bands in the first reconstruction table. By such processing, it is possible to efficiently generate the second reconstruction table of a small data size.

The hyperspectral sensor can include a filter array including filters that have different transmission spectra. The first reconstruction table can be data reflecting a spatial distribution of the transmission spectra of the filter array.

The processing circuit may transmit the second reconstruction table to the apparatus. The apparatus can generate spectral data relevant with the property value from the compressed image data by using the second reconstruction table.

The processing circuit may generate the model, the first reconstruction table, and the second reconstruction table for each predetermined classification. This makes it possible to properly generate the model, the first reconstruction table, and the second reconstruction table in accordance with a classification (e.g., a variety) of a target.

The processing circuit may acquire partial compressed image data generated by extracting data of a region from the compressed image data by the apparatus, generate spectral data corresponding to the region from the partial compressed image data by using the second reconstruction table, and transmit the spectral data to the apparatus. In this case, the apparatus can acquire spectral data from the processing apparatus and output an image based on the spectral data, for example, display the image on a display device without performing generation of spectral data. It is therefore possible to lower performance required for a processor of the apparatus as compared with a case where the apparatus performs generation of spectral data.

The processing circuit may acquire the compressed image data from the apparatus, generate spectral data relevant with the property value from the compressed image data by using the second reconstruction table, and transmit the spectral data to the apparatus. In this case, the apparatus can transmit the compressed image data to the processing apparatus as it is and receive spectral data generated by the processing apparatus. It is therefore possible to further lower performance required for the processor of the apparatus.

In a case where it is determined that it is necessary to change the model and the second reconstruction table on the basis of spectral data generated from the compressed image data on the basis of the second reconstruction table and the hyperspectral data in the data sets of the samples, the processing circuit may generate the model again on the basis of the data sets of new samples and update the second reconstruction table in accordance with the model generated again. This makes it possible to re-create a model for an agricultural product of a new variety or an agricultural product produced by a new cultivation method that does not match the model created before and optimize the second reconstruction table in accordance with the model thus re-created.

A method according to another embodiment of the present disclosure is a method generated by a computer. The method includes acquiring a first reconstruction table for generating hyperspectral data from compressed image data which is hyperspectral information of a target compressed as two-dimensional image information, acquiring a model that is generated on the basis of a data set of a sample including hyperspectral data of the sample and data indicative of a property value of the sample and for converting the hyperspectral data into spectrum relevant with the property value, and generating a second reconstruction table for generating spectral data relevant with the property value from the compressed image data on the basis of the model and the first reconstruction table.

The hyperspectral data can include luminance information for each of wavelength bands included in a target wavelength range. The first reconstruction table can be data for generating the luminance information for each of the wavelength bands from the compressed image data. The second reconstruction table can be data for generating luminance information obtained by weighted-addition of the pieces of luminance information of the wavelength bands from the compressed image data.

A data size of the second reconstruction table may be smaller than a data size of the first reconstruction table.

The second reconstruction table can be generated by synthesizing pieces of information of some of the wavelength bands included in the first reconstruction table.

A computer program according to another embodiment of the present disclosure can be stored in a computer-readable non-transitory storage medium. The computer program causes a computer to execute a process including acquiring a first reconstruction table for generating hyperspectral data from compressed image data which is hyperspectral information of a target compressed as two-dimensional image information, acquiring a data set of a sample including hyperspectral data of the sample and data indicative of a property value of the sample, generating a model for converting the hyperspectral data into spectrum relevant with the property value on the basis of the data set, and generating a second reconstruction table for generating spectral data relevant with the property value from the compressed image data on the basis of the model and the first reconstruction table.

Exemplary embodiments of the present disclosure are more specifically described below. Each of the embodiments described below illustrates a general or specific example. Numerical values, shapes, constituent elements, the way in which the constituent elements are disposed and connected, steps, the order of steps, and the like illustrated in the embodiments below are examples and do not limit the present disclosure. Among constituent elements in the embodiments below, constituent elements that are not described in independent claims indicating highest concepts are described as optional constituent elements. Each drawing is a schematic view and is not necessarily strict illustration. Furthermore, in each drawing, substantially identical constituent elements are given identical reference signs, and repeated description thereof is sometimes omitted or simplified.

First Embodiment

A first exemplary embodiment of the present disclosure is described below.

A system according to the present embodiment includes a processing apparatus that generates a statistical model and one or more terminals that estimate a property value (e.g., a sugar content) that depends on a content or a concentration of a target substance from spectral data of light scattered on a target or light that has passed through the target on the basis of the statistical model. In the following description, the processing apparatus that generates a statistical model is also referred to as a "statistical learning apparatus", and the terminal that estimates a property value is also referred to as an "estimation apparatus". The statistical learning apparatus and the estimation apparatus are communicably connected to each other over a network. The estimation apparatus detects light scattered on the target or light that has passed through the target and generates hyperspectral data including information on a light intensity or luminance for each of wavelength bands included in a predetermined target wavelength range. In the following description, this hyperspectral data is sometimes referred to simply as "spectral data". The estimation apparatus acquires spectral data of light scattered on the target or light that has passed through the target by using a device including a hyperspectral sensor. The estimation apparatus acquires a statistical model from the statistical learning apparatus and estimates a property value such as a sugar content of the target from the spectral data on the basis of the statistical model. The statistical learning apparatus creates the statistical model by conducting principal component analysis on the basis of a large number of data sets stored in a storage device. Each data set includes spectral data and data of a corresponding property value such as a sugar content. The data sets are collected by a user (e.g., an administrator) using the system and are stored in the storage device. The estimation apparatus acquires spectral data of the target and transmits the spectral data to the statistical learning apparatus. The statistical learning apparatus determines whether or not it is necessary to change the statistical model on the basis of the spectral data acquired from the estimation apparatus and spectral data of a large number of samples used when the statistical model was created before. In a case where an agricultural product of a new variety or a new cultivation method that does not match the statistical model created before is detected, the statistical learning apparatus causes an output device to output information requesting spectral data and data of a property value such as a sugar content of the agricultural product of the new variety or the new cultivation method. The user collects a set of spectral data and data of a property value of an agricultural product of the same variety as this agricultural product and produced by the same cultivation method as this agricultural product on the basis of the information and causes the set to be stored in a storage medium. The statistical learning apparatus re-creates a model by adding the collected data set to existing data sets and performing principal component analysis and transmits the model to the estimation apparatus. The estimation apparatus estimates a property value such as a sugar content from the spectral data by using the newly created model. As described above, the estimation apparatus can estimate a property value such as a sugar content that depends on a content or a concentration of a component substance by replacing a model with a new model as needed even in a case where a state of a target to be observed changes.

The estimation apparatus according to the present embodiment generates hyperspectral data of a target by using a compressed sensing technology. More specifically, the estimation apparatus includes a hyperspectral sensor that generates compressed image data indicative of a two-dimensional image in which hyperspectral information is compressed. The "hyperspectral information" means luminance information concerning each of four or more wavelength bands included in a predetermined target wavelength range. The compressed image data can be, for example, acquired by imaging using a filter array including kinds of optical filters having different transmission spectra. In data of each pixel of the compressed image data, information concerning wavelength bands (e.g., four or more wavelength bands) can be superimposed. Depending on intended use, information concerning 10 or more or 100 or more wavelength bands may be superimposed in data of each pixel. The compressed image data may include information concerning wavelength bands that are spatially encoded.

The estimation apparatus generates hyperspectral data from the compressed image data by using a reconstruction table recorded in advance in a storage device. The reconstruction table can be data reflecting a spatial distribution of the transmission spectra of the filter array. The statistical learning apparatus updates the reconstruction table every time the statistical model is updated and distributes the reconstruction table to the estimation apparatus.

As the reconstruction table used in the present embodiment, a complete reconstruction table and a reduced reconstruction table are used. The complete reconstruction table is a reconstruction table that can generate luminance values of all bands each having a narrow bandwidth that are included in a preset target wavelength range from the compressed image data. The complete reconstruction table is created in advance for each terminal on the basis of a transmission characteristic of a filter array of the terminal and is recorded in a storage device of the statistical learning apparatus. On the other hand, the reduced reconstruction table is a table in which successive two or more bands among the bands each having a narrow bandwidth that are included in the target wavelength range are unified as a single band and whose size is compressed as a whole. The reduced reconstruction table is generated from the complete reconstruction table by the statistical learning apparatus and is distributed to each estimation apparatus. The statistical learning apparatus specifies some bands of a relatively low degree of contribution to estimation of a property value such as a sugar content among the bands included in the target wavelength range when creating the statistical model. Then, successive two or more bands among these bands are unified and processed as a single band. For example, by processing such as averaging values of two or more elements corresponding to the successive two or more bands in the complete reconstruction table, these elements are unified as a single element. By such processing, the reduced reconstruction table whose size is compressed as compared with the complete reconstruction table is generated. When the statistical learning apparatus generates a reduced reconstruction table, the statistical learning apparatus distributes the reduced reconstruction table to a corresponding estimation apparatus.

When the statistical learning apparatus updates a statistical model, the statistical learning apparatus also updates the reduced reconstruction table in accordance with the change of the statistical model and distributes the updated reduced reconstruction table to a corresponding estimation apparatus.

The statistical learning apparatus further converts complete hyperspectral data included in data sets of samples for learning into reduced hyperspectral data and performs principal component analysis again on the basis of the reduced hyperspectral data of the samples. In this way, a statistical model for estimating a property value such as a sugar content from the reduced hyperspectral data is newly created and is distributed to the estimation apparatus. This statistical model includes a principal component model for calculating a principal component score of a specific principal component correlated with a property value from the reduced hyperspectral data and an estimation model for estimating the property value from the principal component score. The principal component model is data indicative of a vector of principal component loading of a specific principal component relevant with the property value. The principal component score can be calculated by an inner product of the principal component loading vector indicated by the principal component model and the reduced hyperspectral data. The estimation model is data that defines a correspondence between a principal component score and a property value.

The estimation apparatus generates hyperspectral data from compressed image data by using the distributed reduced reconstruction table. The reduced reconstruction table has a smaller data size than the complete reconstruction table and therefore can generate hyperspectral data in a shorter time. The hyperspectral data thus generated corresponds to the reduced hyperspectral data, and holds information concerning a band of high importance in estimation of a property value at a high density and holds information concerning a band of low importance at a low density. The estimation apparatus estimates a property value of the target by applying the distributed statistical model to the generated reduced hyperspectral data.

The estimation apparatus transmits the generated reduced hyperspectral data to the statistical learning apparatus. The statistical learning apparatus determines whether or not it is necessary to change the statistical model on the basis of the reduced hyperspectral data acquired from the estimation apparatus and spectral data of a large number of samples used when the statistical model was created before. In a case where an agricultural product of a new variety or a new cultivation method that does not match the statistical model created before is detected, the statistical learning apparatus causes an output device to output information requesting spectral data and data of a property value such as a sugar content of the agricultural product of the new variety or the new cultivation method. The user collects a set of spectral data and data of a property value of an agricultural product of the same variety as this agricultural product and produced by the same cultivation method as this agricultural product on the basis of the information and causes the set to be stored in a storage medium. The statistical learning apparatus re-creates a model by adding the collected data set to existing data sets and performing principal component analysis. At this time, the reduced reconstruction table is also updated since a combination of wavelength bands of high importance also changes as a result of the change of the model. The statistical learning apparatus transmits the updated model and reduced reconstruction table to the estimation apparatus. The estimation apparatus estimates a property value such as a sugar content from compressed image data by using the newly created model and reduced reconstruction table.

According to the above configuration, a time required from imaging of a target to estimation of a property value is markedly reduced, and response can be improved. By replacing a model and a reduced reconstruction table with new ones as needed, a property value such as a sugar content can be estimated even in a case where a state of a target to be observed changes.

A configuration and operations of the present embodiment are described in more detail below. In the following description, it is assumed that the estimation apparatus estimates a sugar content of a target, and the estimation apparatus is sometimes referred to as a "sugar content estimation apparatus" or a "terminal".

1-1. Configuration

Figure 5:
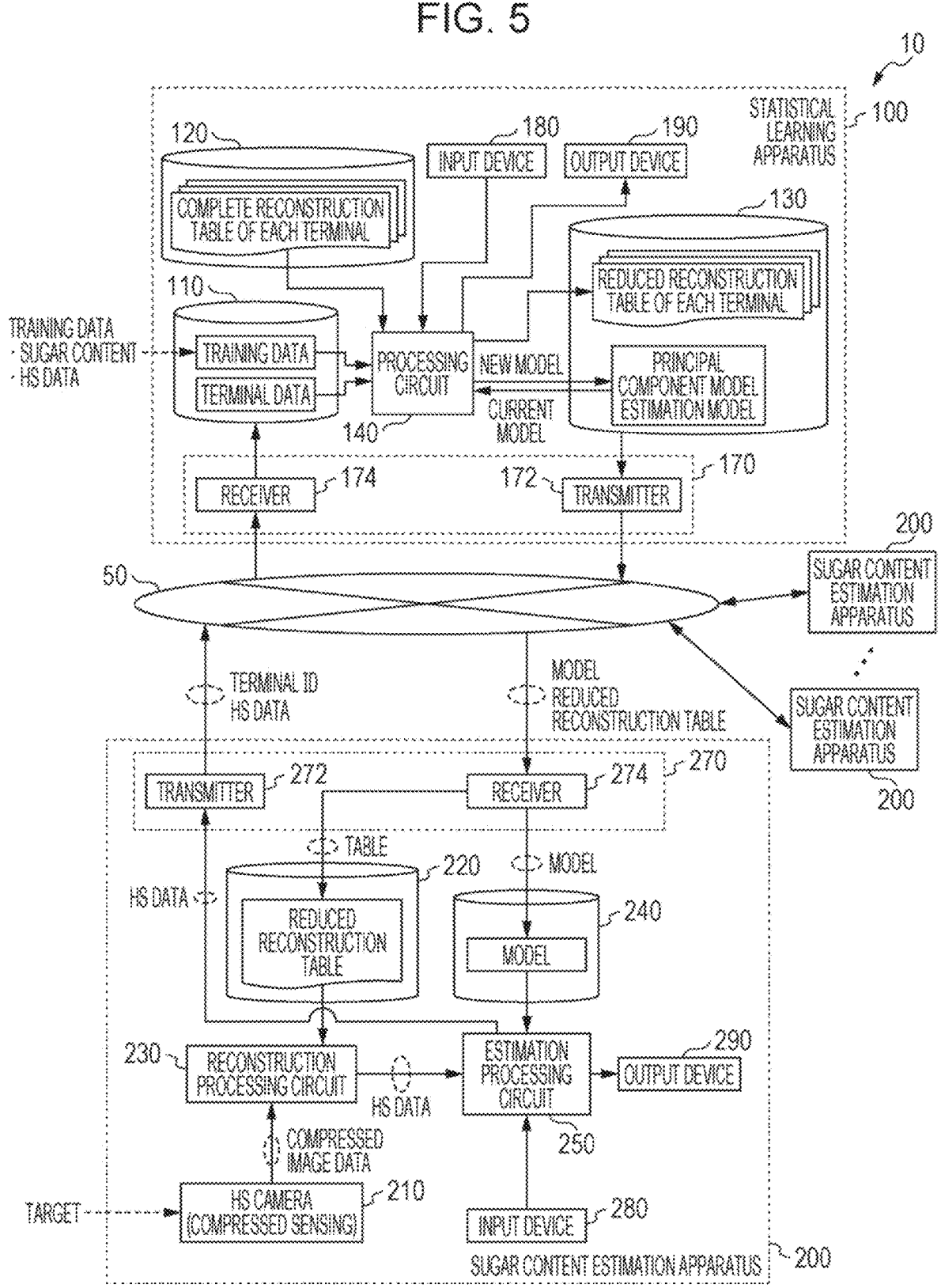
FIG. 5 is a block diagram illustrating a configuration of a sugar content estimation system according to a first embodiment.

FIG. 5 is a block diagram illustrating a configuration of a sugar content estimation system 10 according to the present embodiment. The sugar content estimation system 10 includes a statistical learning apparatus 100 and sugar content estimation apparatuses 200. The statistical learning apparatus 100 and the sugar content estimation apparatuses 200 are connected to one another over a communication network 50.

The statistical learning apparatus 100 is, for example, a server computer managed by a business operator who manages the sugar content estimation system 10. The statistical learning apparatus 100 includes a first storage device 110, a second storage device 120, a third storage device 130, a processing circuit 140, a communication circuit 170, an input device 180, and an output device 190. The communication circuit 170 includes a transmitter 172 and a receiver 174. Each of the sugar content estimation apparatuses 200 includes a hyperspectral (HS) camera 210, a fourth storage device 220, a reconstruction processing circuit 230, a fifth storage device 240, an estimation processing circuit 250, a communication circuit 270, an input device 280, and an output device 290. The communication circuit 270 includes a transmitter 272 and a receiver 274. Note that the input device 180 and the output device 190 may be elements outside the statistical learning apparatus 100. Similarly, the input device 280 and the output device 290 may be elements outside the sugar content estimation apparatus 200.

1-1-1. Statistical Learning Apparatus

First, a configuration of the statistical learning apparatus 100 is described.

Each of the first storage device 110, the second storage device 120, and the third storage device 130 is, for example, a device in which data is stored by any storage medium, such as a magnetic disc, a flash memory, or an optical disc. The first storage device 110 stores therein model training data for generating a statistical model used to estimate a sugar content from hyperspectral data and hyperspectral data received from each sugar content estimation apparatus 200. The second storage device 120 stores therein complete reconstruction tables corresponding to properties of the hyperspectral cameras 210 of the sugar content estimation apparatuses 200. The third storage device 130 stores therein reduced reconstruction tables corresponding to the properties of the hyperspectral cameras 210 of the sugar content estimation apparatuses 200 and a statistical model for estimating a sugar content from hyperspectral data. The statistical model includes a model that generates a base value for estimating a sugar content from hyperspectral data and a model that estimates a sugar content from the value generated by this model. Although the statistical learning apparatus 100 includes the three storage devices 110, 120, and 130 in the present embodiment, functions of these storage devices may be integrated in one or two storage devices. Alternatively, the functions of these storage devices may be distributed to four or more storage devices.

FIG. 6A illustrates an example of training data stored in the first storage device 110. The first storage device 110 stores therein correspondences between spectral data of samples acquired by a hyperspectral camera and sugar contents. The spectral data includes information on a luminance value of each of wavelength bands included in a preset target wavelength range (451 nm to 950 nm in the example of FIG. 6A). The "luminance value" can be a pixel value at one point expressing a color of a target well or an average of pixel values at points expressing the color of the target well in an image acquired by imaging the target by a hyperspectral camera. The "pixel expressing the color of the target well" means a pixel capturing light scattered on the target or light that has passed through the target, for example, a pixel on which mirror-reflected light is not incident. In the example of FIG. 6A, the wavelength range from 451 nm to 950 nm is divided into m (=100) wavelength bands each having a width of 5 nm. The width of each wavelength band is not limited to 5 nm and can be set to any value. The target wavelength range is not limited to the range from 451 nm to 950 nm and can be set to any of various ranges depending on intended use. The target wavelength range can be, for example, a visible light wavelength range from approximately 400 nm to approximately 700 nm, a near-infrared ray wavelength range from approximately 700 nm to approximately 2500 nm, or a near-ultraviolet ray wavelength range from approximately 10 nm to approximately 400 nm. In the present specification, not only visible light, but also non-visible light such as a near-ultraviolet ray and a near-infrared ray are also referred to as "light" for convenience of description.

A value of a sugar content can be, for example, a Brix value measured by a sugar refractometer. The training data of samples illustrated in FIG. 6A are collected before start of system operation and is stored in the first storage device 110. Note that in a system for estimating a content or a concentration of a substance (e.g., protein, lipid, or a nutrient such as carotene) other than sugar, a value according to a content or a concentration of the substance is recorded in association with spectral data instead of a sugar content.

FIG. 6B illustrates an example of spectral data transmitted from the sugar content estimation apparatus 200 and stored in the first storage device 110. The spectral data includes information on a spectrum and does not include information on a sugar content of a target, unlike the model training data. Furthermore, widths of bands included in the spectral data are not uniform, unlike the model training data. That is, in the spectral data received from the sugar content estimation apparatus 200, a portion having a value concerning a relatively wide wavelength band and a portion having a value concerning a relatively narrow wavelength band are mixed. This is because the spectral data generated by the sugar content estimation apparatus 200 is one generated by using the reduced reconstruction table. When the receiver 174 receives spectral data in which band widths are uneven from the sugar content estimation apparatus 200, the data is recorded in the first storage device 110. Every time the statistical learning apparatus 100 receives spectral data from the sugar content estimation apparatus 200, the statistical learning apparatus 100 additionally records the spectral data in the first storage device 110.

Figure 7:
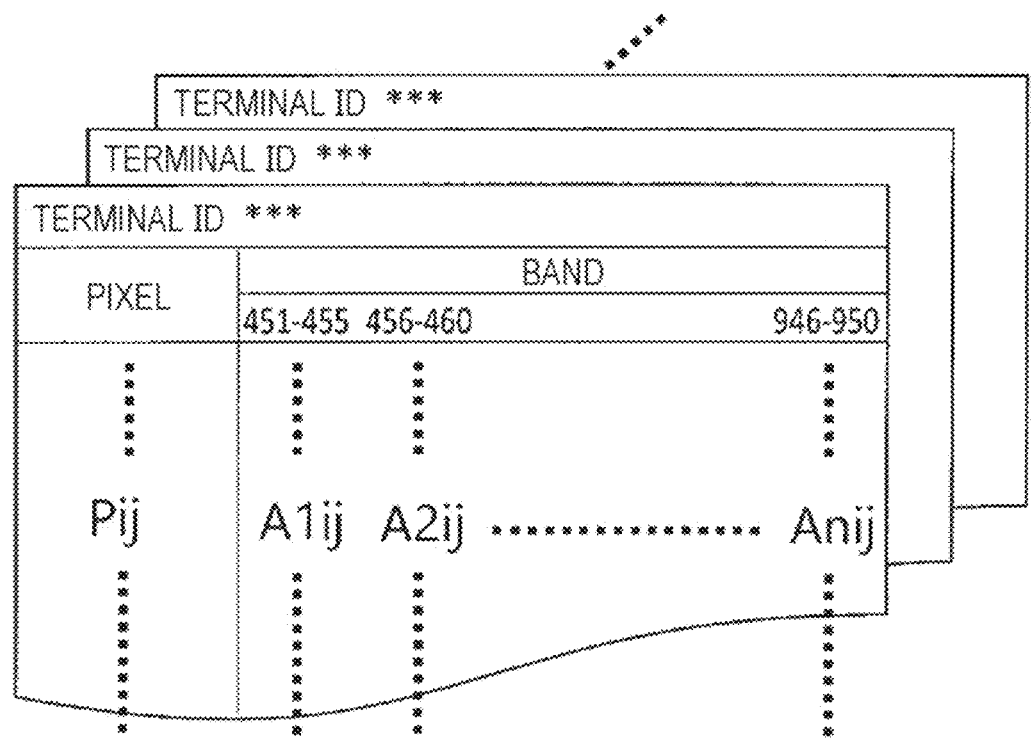
FIG. 7 illustrates an example of a complete reconstruction table for each sugar content estimation apparatus stored in a second storage device.

FIG. 7 illustrates an example of a complete reconstruction table for each sugar content estimation apparatus 200 stored in the second storage device 120. The complete reconstruction table is data for generating, for all pixels, information on all bands that can be generated from compressed image data acquired by imaging by the hyperspectral camera 210. The complete reconstruction table illustrated in FIG. 7 includes a terminal ID for identifying the sugar content estimation apparatus 200 and information on coefficients for respective bands of each of filters disposed corresponding to pixels. The bands in the complete reconstruction table correspond to the bands in the training data illustrated in FIG. 6A. The bands may be divided to such a degree that a variety can be discriminated by using a luminance value for each wavelength band.

Figure 8:
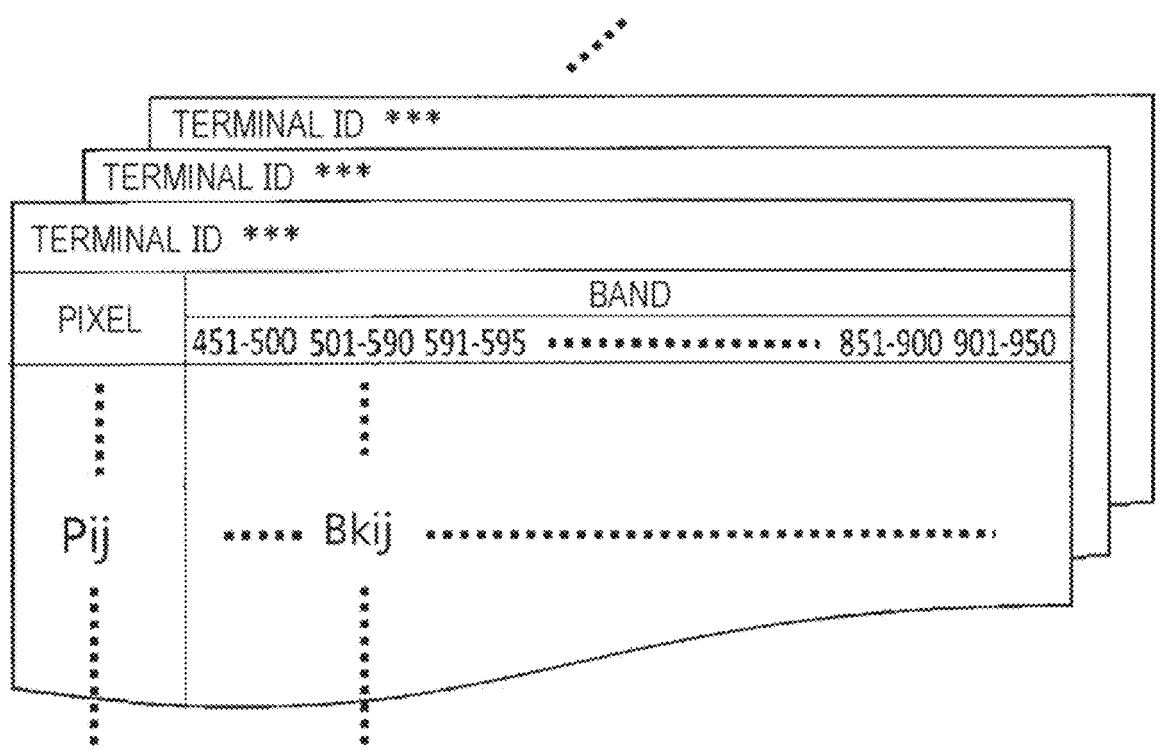
FIG. 8 illustrates an example of a reduced reconstruction table for each sugar content estimation apparatus stored in a third storage device.

FIG. 8 illustrates an example of a reduced reconstruction table for each sugar content estimation apparatus 200 stored in the third storage device 130. The reduced reconstruction table includes a terminal ID for identifying the sugar content estimation apparatus 200, a minimum wavelength and a maximum wavelength of each generated band, and information on coefficients of respective bands recorded for each pixel. The reduced reconstruction table varies not only depending on the sugar content estimation apparatus 200, but also depending on the statistical model. Band widths in the reduced reconstruction table are not uniform, unlike the complete reconstruction table stored in the second storage device 120. The reduced reconstruction table generates information on each band of a band width corresponding to the statistical model. The band widths in the reduced reconstruction table correspond to the band widths in the spectral data from each terminal illustrated in FIG. 6B. The reduced reconstruction table is updated every time the statistical model is updated.

Figures 9, 10A, 10B:
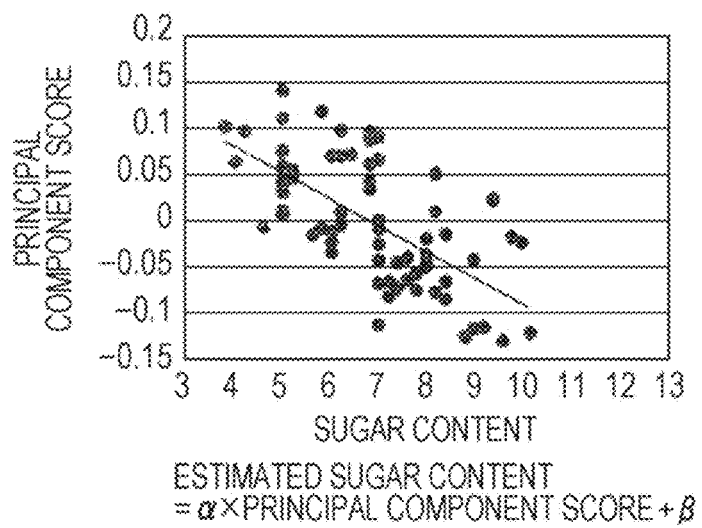
FIG. 9 illustrates an example of data of a model stored in the third storage device.
FIG. 10A is a scatter plot illustrating an example of a relationship between a principal component score of a specific principal component for which correlation with a sugar content has been confirmed and the sugar content.
FIG. 10B illustrates an example of a correspondence table stored in the third storage device.

FIG. 9 illustrates an example of data of a model stored in the third storage device 130. In this example, a statistical model is generated by principal component analysis. The number k of principal components extracted by principal component analysis based on data sets of samples, a number 1 of a principal component for which a significant correlation between a principal component score and a sugar content has been confirmed, and data of a loading vector indicative of loading for each wavelength band of the principal component are recorded. In FIG. 9, j indicates loading corresponding to a j-th wavelength band among m' wavelength bands illustrated in FIG. 6B.

FIG. 10A is a scatter plot illustrating an example of a relationship between a principal component score of a specific principal component for which a correlation with a sugar content has been confirmed obtained by principal component analysis of hyperspectral image data of a tomato, which is an example of a target, and a sugar content. The straight line in FIG. 10A is a regression line obtained from data points in FIG. 10A. Estimation of a sugar content can be performed on the basis of this regression line. For example, a sugar content can be estimated by the following formula:

estimated sugar content=α×principal component score+β

The processing circuit 140 decides an inclination α and an intercept β of the regression line from data of a principal component score and a sugar content of each sample and records values of α and β in the third storage device 130. The values of α and β are transmitted to the sugar content estimation apparatus 200 by the transmitter 172 and is used for estimation of a sugar content by the estimation processing circuit 250 of the sugar content estimation apparatus 200.

As described above, the third storage device 130 stores therein the loading vector illustrated in FIG. 9 and the inclination α and the intercept β of the regression line illustrated in FIG. 10A. Each component of the loading vector is used as a model parameter for calculating a principal component score from spectral data. The inclination α and the intercept β of the regression line are used as model parameters for estimating a sugar content from a principal component score.

A correspondence table illustrating a relationship between a principal component score and a sugar content may be recorded in the third storage device 130 instead of the inclination α and the intercept β of the regression line. FIG. 10B illustrates an example of the correspondence table stored in the third storage device 130. This table defines a correspondence between a range of a principal component score and a sugar content. Data of such a table may be transmitted from the transmitter 172 to the receiver 274 of the sugar content estimation apparatus 200 instead of data of the inclination α and the intercept β of the regression line.

The processing circuit 140 is, for example, an integrated circuit including a processor such as a CPU. The processing circuit 140 generates a statistical model for estimating a sugar content from spectral data by statistically processing the training data recorded in the first storage device 110. The processing circuit 140 generates and updates a statistical model and generates and updates a reduced reconstruction table corresponding to the statistical model. In the present embodiment, the processing circuit 140 generates a statistical model by conducting principal component analysis based on spectral data of the samples stored in the first storage device 110, that is, data of a luminance value for each wavelength band. In the example of FIG. 6A, the spectral data of each sample is expressed as an m-dimensional vector, and spectral data of all samples (the number of samples: n) is expressed as a matrix of m rows and n columns. The processing circuit 140 decides principal components from spectral data of the n samples by conducting principal component analysis and calculate, for each of the principal components, a principal component score of each sample. The processing circuit 140 calculates a correlation coefficient between the calculated principal component score and a sugar content and extracts a principal component for which a significant correlation is observed. The processing circuit 140 generates a loading vector representing principal component loading for each wavelength band of the extracted principal component. The loading vector is used as a principal component model for calculating a principal component score. The principal component score is calculated by an inner product of an m-dimensional vector indicated by spectral data and the loading vector. The processing circuit 140 causes the number of principal components calculated in the principal component analysis, information indicating a number of the extracted principal component, and data of the loading vector to be recorded in the third storage device 130, as illustrated in FIG. 9. Furthermore, the processing circuit 140 generates an estimation model that defines a relationship between a principal component score of the extracted principal component and a sugar content. For example, the processing circuit 140 generates, as the estimation model, data indicative of the inclination α and the intercept β of the regression line illustrated in FIG. 10A or data of the table illustrated in FIG. 10B and causes the data to be stored in the third storage device 130.

When the processing circuit 140 according to the present embodiment receives spectral data of a target from the sugar content estimation apparatus 200, the processing circuit 140 conducts principal component analysis after adding the spectral data to training data already stored in the first storage device 110 and determines whether or not there is a change in statistical model. Alternatively, in a case where the number of accumulated pieces of spectral data transmitted from the sugar content estimation apparatus 200 becomes equal to or larger than a predetermined number that can be statistically processed, principal component analysis is conducted on spectral data transmitted from one or more sugar content estimation apparatuses 200, and it is determined whether or not there is a difference from a statistical model created on the basis of the model training data. In a case where the target is one of a different variety from the existing samples or one produced by a different cultivation method from the existing samples, it can be determined that there is a change in model. In a case where it is determined that there is a change in model, the processing circuit 140 causes the output device 190 to output information requesting addition of sample data corresponding to the target. For example, in a case where the output device 190 is a display, the output device 190 displays a text or an image prompting addition of the sample data. Based on the output, a user (e.g., a person who manages the system 10) collects samples of the same variety as the target, and acquires spectral data and measures a sugar content for each of the samples. The spectral data can be, for example, acquired by using a measurement device similar to the hyperspectral camera 210 of the sugar content estimation apparatus 200. The sugar content can be, for example, measured by using a commercially available sugar refractometer. The user records sets of the spectral data and sugar content data of the newly collected samples in the first storage device 110. The processing circuit 140 conducts principal component analysis as described above on sample data including the added sample data, modifies a principal component model for calculating a principal component score and a sugar content estimation model for estimating a sugar content, causes the transmitter 172 to transmit these models. The principal component model and the sugar content estimation model are collectively referred to as a "statistical model".

When the processing circuit 140 generates the statistical model, the processing circuit 140 generates, for each sugar content estimation apparatus 200, a reduced reconstruction table from a complete reconstruction table corresponding to the sugar content estimation apparatus 200 stored in the second storage device 120 in accordance with the statistical model. The generated reduced reconstruction table is recorded in the third storage device 130. Furthermore, when the statistical model is updated, the processing circuit 140 updates the reduced reconstruction table recorded for each sugar content estimation apparatus 200 in accordance with a combination of bands necessary for a new statistical model. Details of operation of generating and updating a reduced reconstruction table will be described later.

The communication circuit 170 transmits and receives a signal to and from the communication circuit 270 of the sugar content estimation apparatus 200 in response to a command from the processing circuit 140. The communication circuit 170 includes the transmitter 172 and the receiver 174.

The transmitter 172 transmits a parameter of a model for estimating a principal component score and a parameter of a model for estimating a sugar content from a principal component score or data of a correspondence table that are stored in the third storage device 130. Furthermore, the transmitter 172 transmits data of a reduced reconstruction table for each sugar content estimation apparatus 200 stored in the third storage device 130.

Figure 11A:
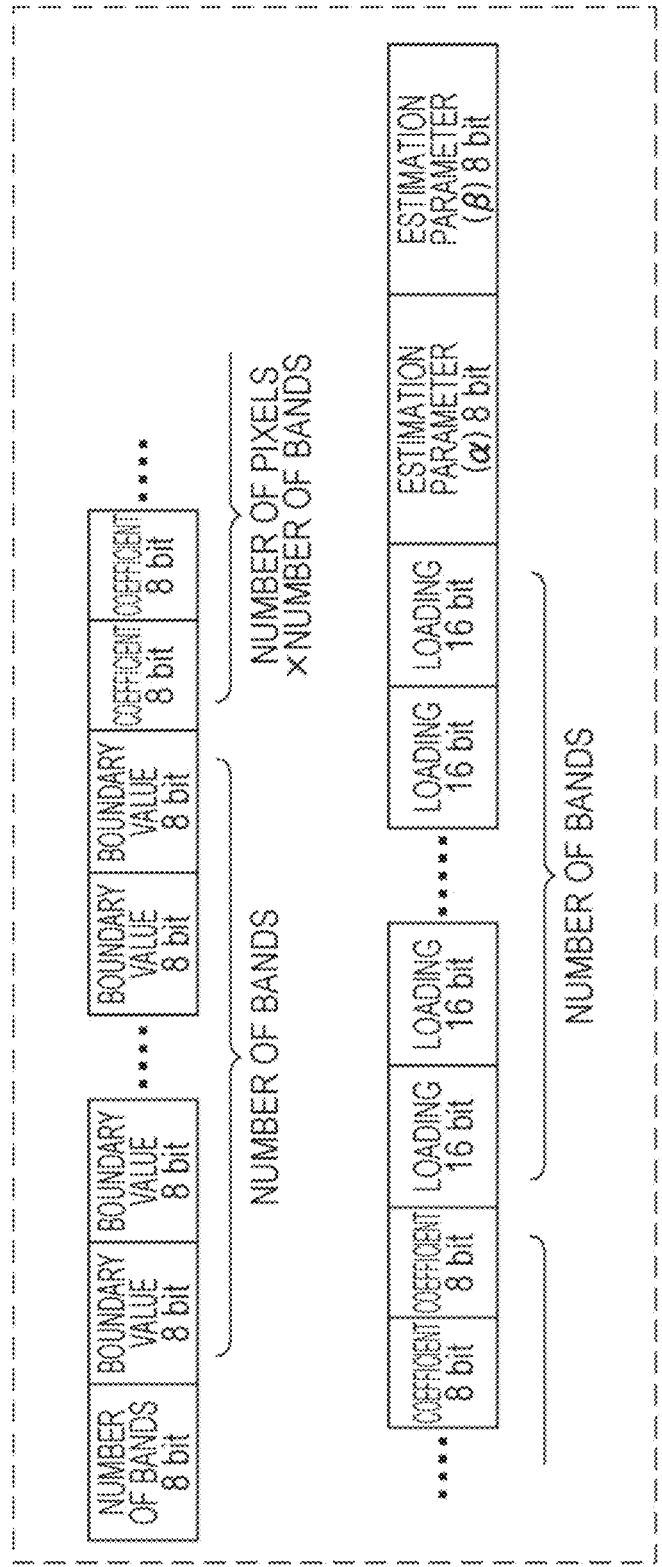
FIG. 11A illustrates an example of a format of data transmitted by a statistical learning apparatus.
Figure 11B:
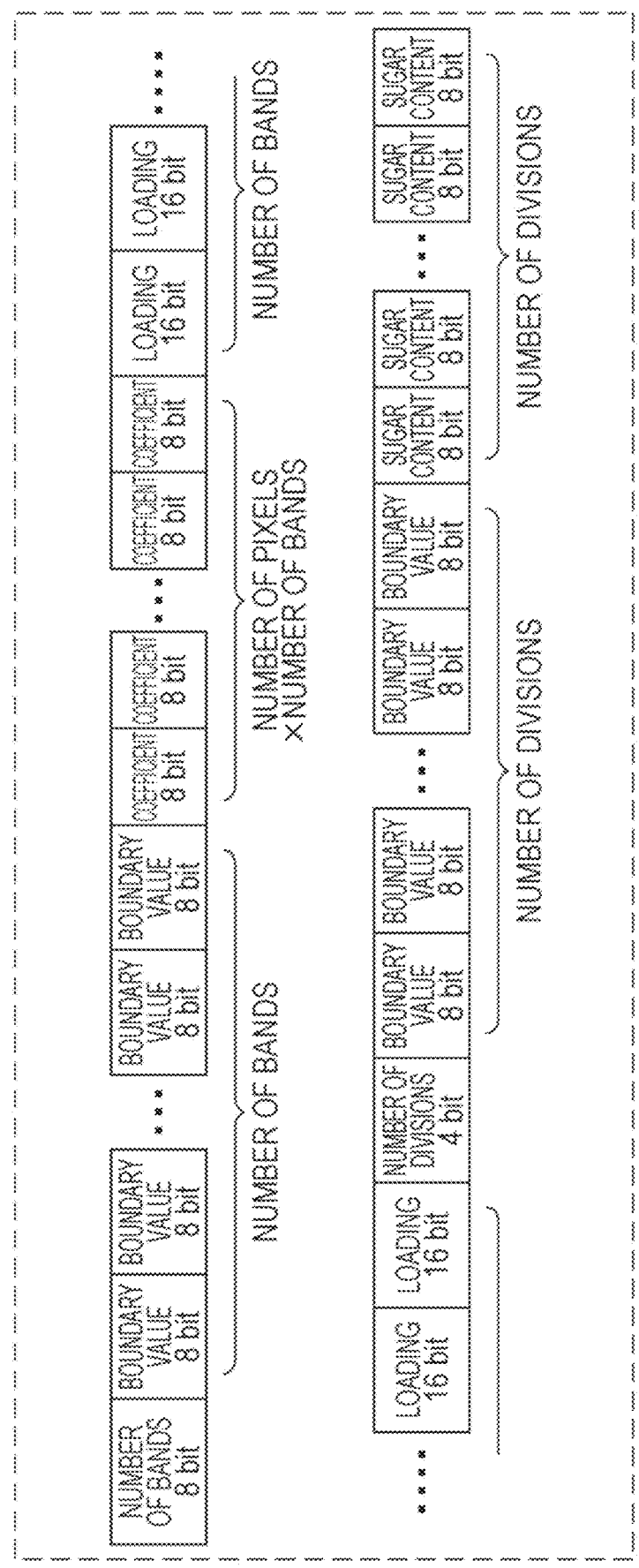
FIG. 11B illustrates another example of a format of the data transmitted by the statistical learning apparatus.

FIGS. 11A and 11B illustrate an example of a format of data transmitted by the transmitter 172.

FIG. 11A illustrates an example of transmitted data in a case where the sugar content estimation apparatus 200 estimates a sugar content from a principal component score on the basis of a regression model. In this example, the number of bands, a boundary wavelength between the bands, data of a reduced reconstruction table, and data of a statistical model are transmitted. The data of the reduced reconstruction table includes data of a coefficient sequence set for the bands for each pixel. The coefficients are arranged in a predetermined order of pixels and bands. The data of the statistical model includes data of principal component loading for each band and parameters of a regression line, that is, data of the inclination $\alpha$ and the intercept $\beta$. In the example of FIG. 11A, the number of bands is transmitted as 8-bit data, the boundary wavelength between the bands is transmitted as 8-bit data, each coefficient of the reduced reconstruction table is transmitted as 8-bit data, principal component loading of each wavelength band is transmitted as 16-bit data, and each of the parameters, that is, the inclination $\alpha$ and the intercept $\beta$ of the regression line is transmitted as 8-bit data.

FIG. 11B illustrates an example of transmitted data in a case where the sugar content estimation apparatus 200 estimates a sugar content from a principal component score by referring to a correspondence table. In this example, the number of bands, a boundary wavelength, each coefficient of a reduced reconstruction table, and principal component loading of each band are transmitted in a similar format to the example illustrated in FIG. 11A. Subsequently, data of a correspondence table between a principal component score and a sugar content is transmitted. Data of the number of divisions indicating how many ranges principal component scores are divided into in the correspondence table is transmitted as 4-bit data, and a value of a boundary between the ranges of the principal component scores is transmitted as 8-bit data for each of the divided ranges. Furthermore, a value of a sugar content corresponding to each of the ranges of principal component scores is transmitted as 8-bit data for each of the divided ranges.

The receiver 174 receives spectral data transmitted by one or more sugar content estimation apparatuses 200. The received spectral data is recorded in the first storage device 110.

The input device 180 is a device used to instruct the processing circuit 140 to operate. The input device 180 can include, for example, a keyboard, a pointing device, a touch panel, a microphone for voice input, a spatial position sensor for action input, or the like. Use of the input device 180 allows a user to give an instruction to record data and start and end an operation to the processing circuit 140.

The output device 190 is a device used to output information requesting addition of sample data in a case where the processing circuit 140 determines that it is necessary to update the statistical model. The output device 190 can be, for example, a display that displays a request for sample data as a text or the like. The output device 190 may be a speaker that outputs the request for sample data as voice or may be a printer that prints a text.

1-1-2. Sugar Content Estimation Apparatus

Next, a configuration of the sugar content estimation apparatus 200 is described.

The hyperspectral camera 210 includes a filter array including kinds of optical filters that are different from one another in wavelength dependence of light transmittance and an image sensor that acquires an image formed by light that has passed through the filter array. The configuration of the hyperspectral camera 210 is similar to the configuration of the hyperspectral camera 500 illustrated in any one of FIGS. 3A to 3D. However, the reconstruction processing circuit 230 according to the present embodiment generates reduced hyperspectral data from compressed image data by using not a complete reconstruction table but a reduced reconstruction table. It is therefore possible to reduce a calculation amount as compared with a case where a complete reconstruction table is used.

Figure 12:
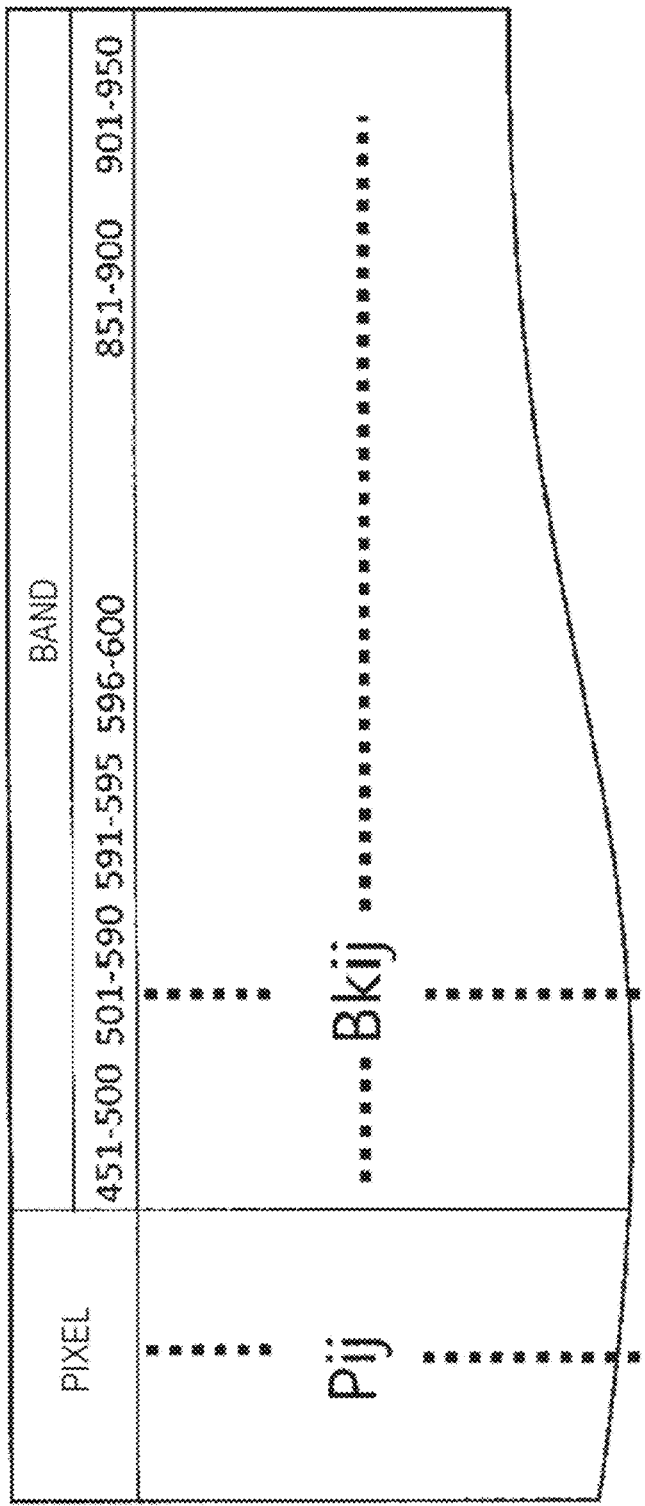
FIG. 12 illustrates an example of a reduced reconstruction table stored in a fourth storage device.

FIG. 12 illustrates an example of a reduced reconstruction table stored in the fourth storage device 220. The reduced reconstruction table is a reconstruction model created in accordance with a property of the filter array of the hyperspectral camera 210. Data indicative of a property of a filter array in each terminal is stored as a complete reconstruction table in the second storage device 120 of the statistical learning apparatus 100. The reduced reconstruction table is generated from a complete reconstruction table by the processing circuit 140 of the statistical learning apparatus 100 and is transmitted to the estimation apparatus 200. The reduced reconstruction table can generate spectrum information in detail as for only a wavelength band of high important specified on the basis of the statistical model generated by the statistical learning apparatus 100. In the example of FIG. 12, a boundary wavelength of each band of a spectrum and coefficients for the bands for each pixel are stored.

The reconstruction processing circuit 230 generates hyperspectral data after performing image processing on a compressed image generated by the hyperspectral camera 210 by referring to the reduced reconstruction table recorded in the fourth storage device 220. For example, a partial region representing a target is extracted from the compressed image, and a hyperspectral image of each band is generated for the extracted region by using the reduced reconstruction table.

The fifth storage device 240 stores therein a statistical model transmitted from the statistical learning apparatus 100, that is, a principal component model for calculating a principal component score and an estimation model for estimating a sugar content from a principal component score. The model recorded in the fifth storage device 240 is similar to the model recorded in the third storage device 130 of the statistical learning apparatus 100.

The estimation processing circuit 250 is, for example, an integrated circuit including a processor such as a CPU. The estimation processing circuit 250 estimates a sugar content of a target on the basis of hyperspectral data generated by the reconstruction processing circuit 230 and the statistical model stored in the fifth storage device 240. Details of an operation of estimating a sugar content will be described later.

The input device 280 is a device used to instruct the processor of the sugar content estimation apparatus 200 to operate. The input device 280 can, for example, include a keyboard, a pointing device, a touch panel, a microphone for voice input, a spatial position sensor for action input, or the like. Use of the input device 280 allows the user to give an instruction to record data and start and end an operation.

The output device 290 is a device that outputs information on a sugar content estimated by the estimation processing circuit 250. The output device 290 can, for example, include a display that displays a sugar content as a text or the like. The output device 290 may include a speaker that outputs a sugar content as voice or may include a printer that prints a text. Furthermore, the output device 290 may be a device that transmits data to another apparatus that operates on the basis of data of a sugar content. The apparatus that operates on the basis of data of a sugar content can be, for example, a fruit sorting apparatus that sorts fruits (e.g., tomatoes) according to sugar contents and stores fruits of different sugar contents in different containers. Alternatively, the apparatus that operates on the basis of data of a sugar content may be a display device that determines whether or not to pick a fruit on the basis of a sugar content and shows a fruit that can be picked. The apparatus that operates on the basis of data of a sugar content may be a robot that determines whether or not to pick a fruit and picks a fruit. The apparatus that operates on the basis of data of a sugar content may be an apparatus that manages quality of fruits during a course of distribution. For example, the apparatus that operates on the basis of data of a sugar content may be an apparatus that gives warning using an image, light, sound, or the like or attaches a rejection label to a container in a case where a fruit whose sugar content is lower than a sugar content displayed on the container is detected in the container. In a case where a fruit whose sugar content is lower is detected in the container, the apparatus that manages quality may perform processing such as moving a fruit whose sugar content is lower to a storage place different from a container in which only fruits that have no problem in quality are stored.

The communication circuit 270 transmits and receives data in accordance with a command from the estimation processing circuit 250. The communication circuit 270 is connected to the communication circuit 170 of the statistical learning apparatus 100 over a network 50. Connection to the network 50 may be wired or may be wireless. The communication circuit 270 includes the transmitter 272 and the receiver 274.

The transmitter 272 is a data transmitter connected to a network. The transmitter 272 acquires spectral data generated by the estimation processing circuit 250 and transmits the spectral data to the statistical learning apparatus 100.

Figure 13:
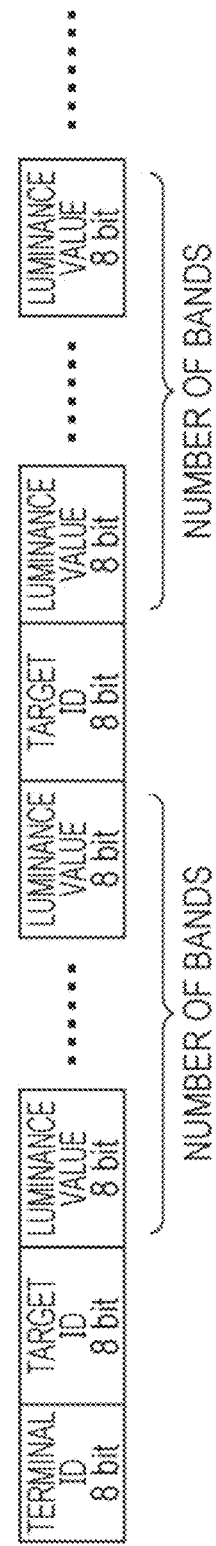
FIG. 13 illustrates an example of data transmitted to the statistical learning apparatus.

FIG. 13 illustrates an example of data transmitted to the statistical learning apparatus 100 by the transmitter 272. The transmitted data illustrated in FIG. 13 includes a terminal ID for identifying the sugar content estimation apparatus 200, a target ID, and data of a luminance value for each band generated by using the reduced reconstruction table. The number of bands is set when the statistical learning apparatus 100 generates a statistical model and is therefore shared between the statistical learning apparatus 100 and the sugar content estimation apparatus 200. Since the number of bands is a fixed value in the example of FIG. 13, as many pieces of spectral data as the number of targets for which a sugar content has been estimated by the sugar content estimation apparatus 200 are successively transmitted. Note that the transmitted data may include information indicative of the number of bands or a boundary wavelength between bands. The target ID may be omitted.

The receiver 274 is a data receiver connected to the network 50. The receiver 274 receives data of a reduced reconstruction table and a statistical model transmitted from the statistical learning apparatus 100. The data of the statistical model includes, for example, a principal component model for calculating a principal component score from spectral data and an estimation model for estimating a sugar content from a principal component score. The data of the estimation model can include, for example, data of parameters such as the inclination $\alpha$ and the intercept $\beta$ of the regression line described above or a table for estimating a sugar content.

Although the reconstruction processing circuit 230 and the estimation processing circuit 250 are separate circuits in the present embodiment, a single processing circuit may perform both of reconstruction processing and estimation processing. Functions of the fourth storage device 220 and the fifth storage device 240 may be realized by a single storage device.

1-2. Operation

Next, an operation of the sugar content estimation system 10 is described.

1-2-1. Outline of Operation of Sugar Content Estimation System 10

The statistical learning apparatus 100 generates data of a reduced reconstruction table and a statistical model necessary for generation of hyperspectral data and estimation of a sugar content performed by the sugar content estimation apparatus 200 and transmits the data to the sugar content estimation apparatus 200. The reduced reconstruction table is generated from a complete reconstruction table on the basis of principal component analysis using training data stored in the first storage device 110. The statistical model generated by the statistical learning apparatus 100 according to the present embodiment includes a principal component model for calculating a principal component score of a specific principal component from spectral data and a sugar content estimation model for estimating a sugar content from a principal component score. The principal component model can be, for example, defined by data of principal component loading such as the one illustrated in FIG. 9. The sugar content estimation model can be, for example, defined by the parameters $\alpha$ and $\beta$ of the regression line such as the ones illustrated in FIG. 10A or data of a correspondence table such as the one illustrated in FIG. 10B.

The sugar content estimation apparatus 200 acquires compressed image data of a target by the hyperspectral camera 210 and generates hyperspectral data from the compressed image data by using the reduced reconstruction table acquired from the statistical learning apparatus 100 when estimating a sugar content of the target. The sugar content estimation apparatus 200 transmits the generated hyperspectral data to the statistical learning apparatus 100. The sugar content estimation apparatus 200 further estimates the sugar content of the target from the hyperspectral data on the basis of the principal component model and the sugar content estimation model received from the statistical learning apparatus 100.

When the statistical learning apparatus 100 acquires latest spectral data from the sugar content estimation apparatus 200, the statistical learning apparatus 100 updates the statistical model by using new sample data as needed. A reduced reconstruction table corresponding to each sugar content estimation apparatus 200 is also updated in accordance with the update of the statistical model. The statistical learning apparatus 100 transmits data of parameters, a correspondence table, or the like that defines the updated statistical model and data of the updated reduced reconstruction table to the sugar content estimation apparatus 200. The sugar content estimation apparatus 200 receives the data of the parameters or the correspondence table of the latest statistical model and the data of the latest reduced reconstruction table from the statistical learning apparatus 100 and always estimates a sugar content of a target on the basis of the latest statistical model and reconstruction table.

Figure 14:
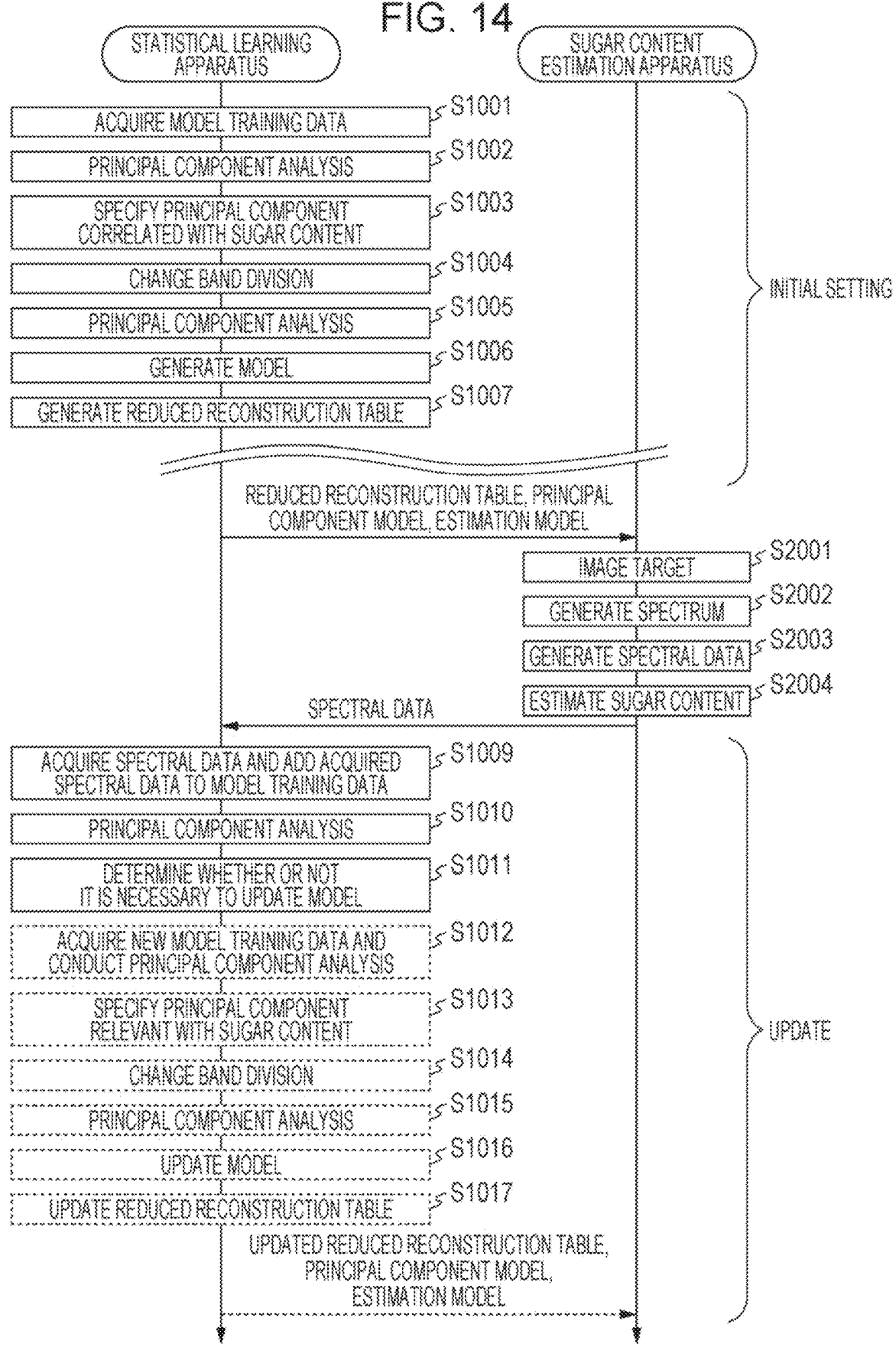
FIG. 14 illustrates an outline of communication between the statistical learning apparatus and the sugar content estimation apparatus and processing performed by the statistical learning apparatus and the sugar content estimation apparatus.

FIG. 14 illustrates an outline of communication between the statistical learning apparatus 100 and the sugar content estimation apparatus 200 and processing performed by the statistical learning apparatus 100 and the sugar content estimation apparatus 200. FIG. 14 illustrates processing of generating a statistical model and a reconstruction table performed as initial setting by the statistical learning apparatus 100, processing of generating spectral data and processing of estimating a sugar content performed subsequently by the sugar content estimation apparatus 200, and processing of updating the model and the reconstruction table performed by the statistical learning apparatus 100.

The initial setting includes operations in steps S1001 to S1007 illustrated in FIG. 14. In step S1001, the processing circuit 140 of the statistical learning apparatus 100 acquires spectral data and data of sugar contents of latest model learning samples (see FIG. 6A) from the first storage device 110. In step S1002, the processing circuit 140 decides principal components by conducting principal component analysis on the acquired spectral data. The principal component analysis can be, for example, conducted by using a known principal component analysis algorithm. In step S1003, the processing circuit 140 extracts a principal component that has a significant correlation between a principal component score and a sugar content among the decided principal components. In step S1004, the processing circuit 140 specifies a wavelength band for which an absolute value of principal component loading of the principal component extracted in S1003 is larger than a threshold value, that is, a band important for the principal component. The processing circuit 140 decreases the number of divisions of a spectrum by unifying successive bands among bands other than the specified important band into a single band.

Figure 15:
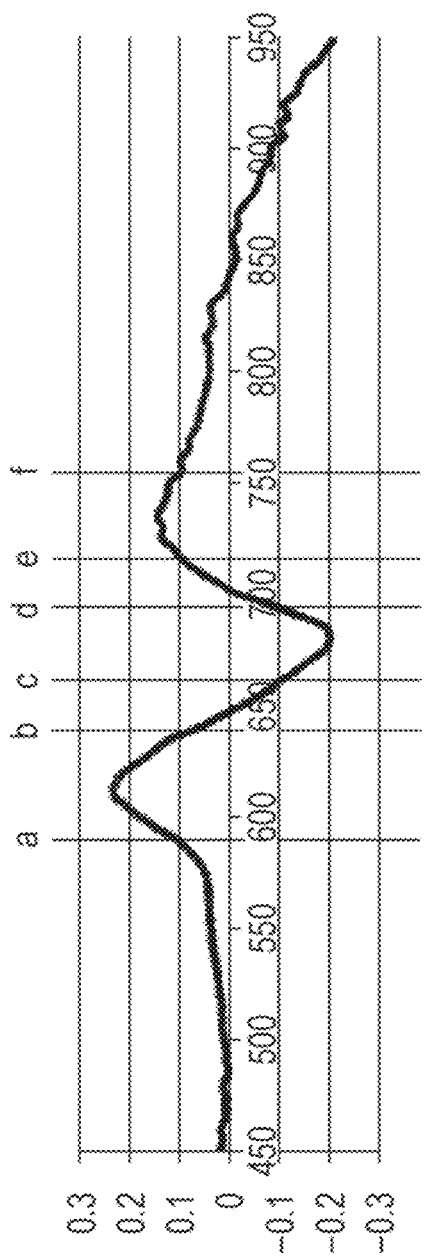
FIG. 15 is a graph illustrating an example of principal component loading for each wavelength of a principal component having a correlation between sugar content and a principal component score.

A specific example of processing of decreasing the number of divisions of the spectrum is described with reference to FIG. 15. FIG. 15 is a graph illustrating principal component loading for each wavelength of a principal component that has a correlation between a sugar content of a tomato and a principal component score among principal components obtained by principal component analysis based on spectral data of the tomato. The vertical axis represents principal component loading, and the horizontal axis represents a wavelength. For example, it is determined that a wavelength for which an absolute value of principal component loading is larger than a predetermined threshold value (e.g., 0.1) is a wavelength important for the principal component. In the example of FIG. 15, it is determined that a wavelength range from a to b, a wavelength range from c to d, and a wavelength range from e to f are important wavelength ranges, and bands included in these wavelength ranges are kept the same as those in the model training data. For example, in a case where the model training data holds spectral data for each 5 nm, the bands included in the wavelength range from a to b, the wavelength range from c to d, and the wavelength range from e to f are processed as having a band width of 5 nm as in the model training data. On the other hand, bands of wavelengths shorter than the wavelength a are, for example, divided every 50 nm. Bands included in each of the wavelength ranges from b to c and from d to e are unified into a single band. Bands of wavelengths longer than the wavelength f are, for example, divided every 50 nm.

As described above, the processing circuit 140 changes a mode of division of bands of spectral data in training data from a uniformly detailed mode to a mode in which a detailed range and a rough range are mixed. In next step S1005, the processing circuit 140 conducts principal component analysis on spectral data whose mode of division of bands has been changed. In this way, principal components are decided. Furthermore, in step S1006, the processing circuit 140 extracts a principal component correlated with a sugar content among these principal components and generates a principal component model for calculating a principal component score of the principal component and a sugar content estimation model for estimating a sugar content from the principal component score. In next step S1007, the processing circuit 140 generates a reduced reconstruction table for each sugar content estimation apparatus 200 from a complete reconstruction table corresponding to the hyperspectral camera 210 of the sugar content estimation apparatus 200. Details of a method for generating the reduced reconstruction table will be described later. The transmitter 172 transmits the generated reduced reconstruction table and statistical model (that is, the principal component model and the estimation model) to each sugar content estimation apparatus 200. Upon receipt of the reduced reconstruction table and the statistical model transmitted from the statistical learning apparatus 100, each sugar content estimation apparatus 200 records the reduced reconstruction table and the statistical model in the storage device 240. Through the above operations, setting of an initial state of the sugar content estimation apparatus 200 is completed. In this way, the sugar content estimation apparatus 200 can estimate a sugar content.

Estimation of a sugar content by the sugar content estimation apparatus 200 includes operations in steps S2001 to S2004. In step S2001, the sugar content estimation apparatus 200 images a target by the hyperspectral camera 210. In step S2001, the hyperspectral camera 210 of the sugar content estimation apparatus 200 generates compressed image data by performing hyperspectral imaging of the target in response to a user's operation. The reconstruction processing circuit 230 extracts one or more regions where the target exists on the basis of the generated compressed image data. In next step S2002, the reconstruction processing circuit 230 generates, for each extracted region, hyperspectral image information for each band by referring to the reduced reconstruction table. In step S2003, the estimation processing circuit 250 generates hyperspectral data of the target from the hyperspectral image information generated for each region in step S2002. Details of processing of extracting the target and processing of generating hyperspectral data from the hyperspectral image information will be described later. Furthermore, in step S2004, the estimation processing circuit 250 finds a principal component score in accordance with the generated hyperspectral data of the target and the principal component model and estimates a sugar content from the principal component score thus found in accordance with the estimation model. An estimation result can be displayed by using the output device 290. The transmitter 272 transmits the hyperspectral data generated in step S2003 to the statistical learning apparatus 100.

When the sugar content estimation apparatus 200 transmits the spectral data to the statistical learning apparatus 100, the statistical learning apparatus 100 performs processing (steps S1009 to S1017) concerning update of the statistical model.

In step S1009, the receiver 174 of the statistical learning apparatus 100 receives the spectral data transmitted by the sugar content estimation apparatus 200. The processing circuit 140 adds the received spectral data to model training data. In step S1010, the processing circuit 140 conducts principal component analysis on a combination of the received spectral data and spectral data whose band widths have been converted from the spectral data of the training data in accordance with the model. In next step S1011, the processing circuit 140 determines whether or not it is necessary to update the model. Specifically, the processing circuit 140 compares a principal component model obtained by the principal component analysis in step S1010 and the principal component model obtained in step S1005, and in a case where a difference between the new and old models exceeds a threshold value, determines that it is necessary to update the model. The difference between the new and old models can be, for example, calculated by a sum of squares of a difference between a component of a loading vector indicated by the principal component model created last time and a component of a loading vector indicated by the principal component model created this time. In a case where update is necessary, the statistical learning apparatus 100 may give an alert to the sugar content estimation apparatus 200. Upon receipt of the alert, the sugar content estimation apparatus 200 may display information indicating that there is a possibility that a result of the sugar content estimation in step S2004 is inaccurate or information indicating that it is necessary to change the statistical model.

In a case where it is necessary to update the model, the processing circuit 140 may cause the output device 190 to output information requesting addition of new training sample data. This allows a user of the statistical learning apparatus 100 to know that it is necessary to update the model. The user collects as many samples of the same variety as the target for which the spectral data has been acquired as possible, and performs acquisition of spectral data and measurement of a sugar content for each of these samples. For example, the user newly collects as many pieces of training data of samples as or more than pieces of spectral data received from the sugar content estimation apparatus 200 and recorded during a period from a time of previous creation of the principal component model to a time of determination that update is necessary. The user causes the acquired spectral data of the samples and sugar content data to be recorded in association with each other in the first storage device 110 of the statistical learning apparatus 100.

When addition of the training data is completed, the processing circuit 140 acquires new model training data including the added data and performs principal component analysis in step S1012. The spectral data used in this principal component analysis includes spectrum information in which widths of all bands are uniform and detailed. In next step S1013, the processing circuit 140 specifies a principal component that has a correlation between a principal component score and a sugar content among principal components obtained by the principal component analysis. In step S1014, the processing circuit 140 changes a band division configuration of the spectral data in a similar manner to step S1004 on the basis of loading for each band of the principal component specified in step S1013. Furthermore, in step S1015, the processing circuit 140 conducts principal component analysis by using the spectral data whose band division configuration has been changed in S1014. In next step S1016, a principal component model indicative of a loading vector of a principal component having a correlation between a principal component score and a sugar content and a sugar content estimation model indicative of parameters of a primary expression or a table indicative of a relationship between a principal component score and a sugar content are updated. Furthermore, in step S1017, the processing circuit 140 re-creates the reduced reconstruction table in accordance with the band division configuration changed in step S1014 and thus updates the reduced reconstruction table. The transmitter 172 transmits the updated reduced reconstruction table, principal component model, and estimation model to the sugar content estimation apparatus 200.

As described above, in the present embodiment, the following operations are repeated:
- generation or update of the statistical model by the statistical learning apparatus 100
- update of the reconstruction table according to band width setting of the statistical model by the statistical learning apparatus 100
- acquisition of new spectral data and estimation of a sugar content by the sugar content estimation apparatus 200
- determination as to whether or not it is necessary to change the model by addition of new spectral data by the statistical learning apparatus 100
- addition of new model training data
- update of the statistical model and the reconstruction table based on the new model training data and distribution of the updated statistical model and reconstruction table to the sugar content estimation apparatus 200 by the statistical learning apparatus 100

Through such operations, even in a case where a variety, a cultivation method, or the like of a target such as a fruit changes, a model that supports the target can be speedily generated, and a decrease in accuracy of estimation of a sugar content resulting from the change of the target can be kept small.

1-2-2. Operation of Statistical Learning Apparatus 100

Next, a specific example of the operation of the statistical learning apparatus 100 according to the present embodiment is described.

Figure 16:
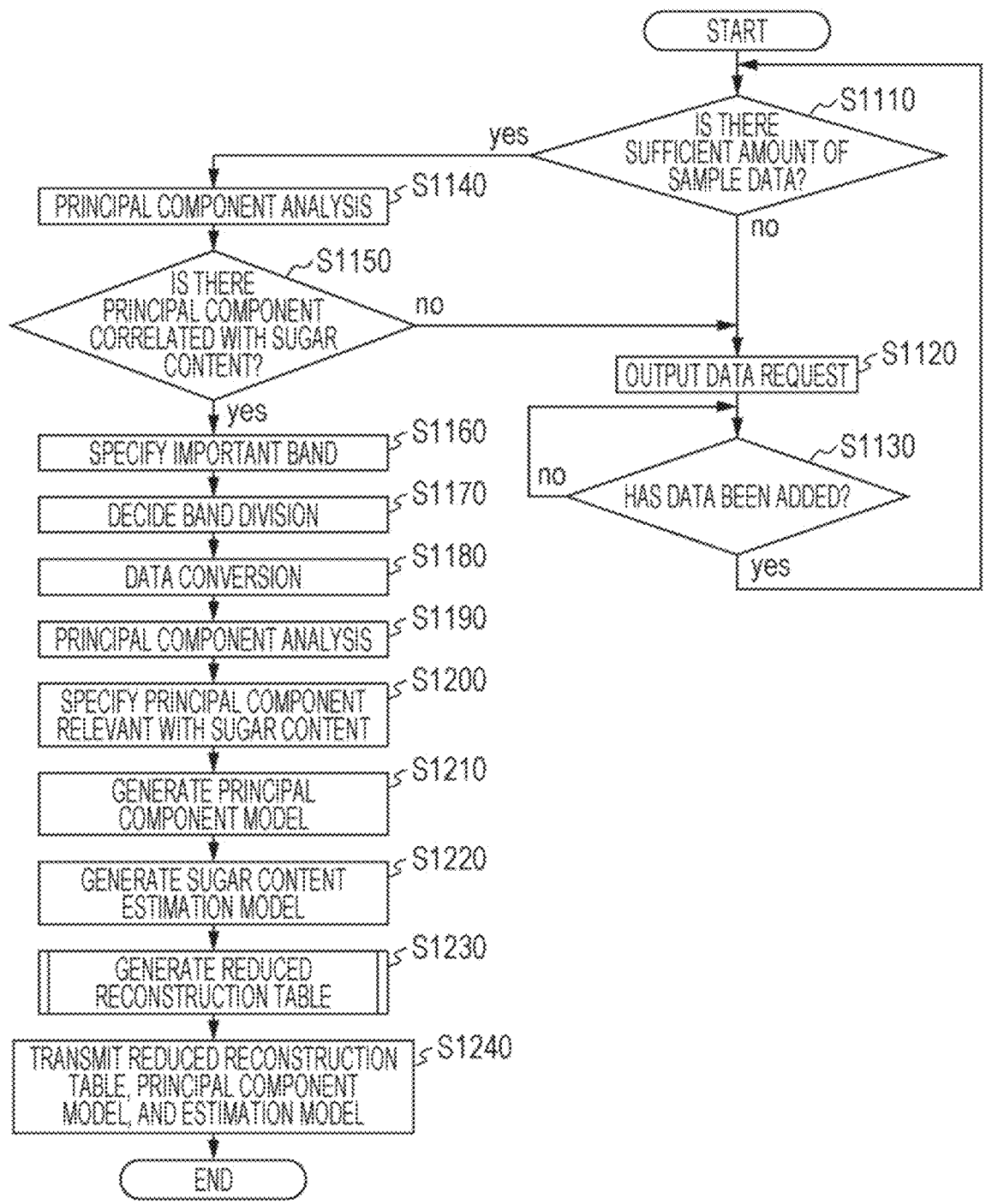
FIG. 16 is a flowchart illustrating a specific example of operations in steps S1001 to S1007 illustrated in FIG. 14.

FIG. 16 is a flowchart illustrating a specific example of the operations in steps S1001 to S1007 illustrated in FIG. 14. In an initial state, the statistical learning apparatus 100 has not generated a principal component model and an estimation model yet, and the storage device 240 of the sugar content estimation apparatus 200 has not store therein the principal component model and the estimation model. Accordingly, the sugar content estimation apparatus 200 cannot estimate a sugar content of a target such as a fruit with high accuracy. Therefore, the statistical learning apparatus 100 generates initial principal component model and estimation model and transmits these models to the sugar content estimation apparatus 200. The operation illustrated in FIG. 16 is started by a start input unit such as the input device 180. The following describes an operation in each step.

Step S1110

The processing circuit 140 determines whether or not a sufficient amount of sample data necessary for learning is stored in the first storage device 110. The sufficient amount necessary for learning is, for example, a preset number such as the number of pieces of data that is ten times as large as the number of spectrum bands. In a case where a sufficient amount of sample data is stored, step S1140 is performed. In a case where the amount of sample data is insufficient, step S1120 is performed.

Step S1120

In a case where the amount of sample data is insufficient, the processing circuit 140 causes the output device 190 to output a request to add training sample data. In a case where the output device 190 includes, for example, a display, output contents can be a character string or a warning image. In a case where the output device 190 includes a speaker, the output contents can be voice or warning sound. After step S1120, step S1130 is performed.

Step S1130

The processing circuit 140 determines whether or not sample data has been added. The sample data is, for example, collected by an administrator of the estimation system 10. The administrator gives a recording instruction to the processing circuit 140 by operating the input device 180, and thereby sample data is recorded in the first storage device 110. When the sample data is added, the processing circuit 140 returns to step S1110, in which the processing circuit 140 determines again whether or not the amount of sample data is sufficient.

Step S1140

In a case where it is determined in step S1110 that there is a sufficient amount of sample data, the processing circuit 140 conducts principal component analysis on the basis of spectral data of training sample data stored in the first storage device 110. The processing circuit 140 decides principal components by the principal component analysis and calculates, for each of the principal components, loading for each wavelength band. The processing circuit 140 calculates a principal component score of each of the principal components for each sample.

Step S1150

The processing circuit 140 calculates a correlation between a principal component score of each of the principal components calculated for each sample in step S1140 and a sugar content in the training sample data recorded in the first storage device 110 and determines whether or not there is a principal component having a significant correlation between a principal component score and a sugar content. In a case where there is a principal component having a significant correlation between a principal component score and a sugar content, step S1160 is performed. In a case where there is no principal component having a significant correlation between a principal component score and a sugar content, step S1120 is performed again, in which addition of data is requested.

Step S1160

The processing circuit 140 decides a band for which detailed spectrum information is to be maintained and a band for which information is to be compressed on the basis of loading for each band of the principal component determined as having a correlation with a sugar content. The processing circuit 140 extracts a principal component having a highest correlation among principal components having a significant correlation between a principal component score and a sugar content specified in step S1150. Then, the processing circuit 140 arranges loading of the extracted principal component in a manner corresponding to bands of a corresponding spectrum and classifies the bands into bands in which an absolute value of the loading is larger than a predetermined threshold value and bands in which an absolute value of the loading is equal to or smaller than the threshold value. Band widths of the bands in which an absolute value of the loading is larger than the threshold value are kept the same as those of the spectrum of the model training data in order to maintain detailed spectrum information.

Step S1170

The processing circuit 140 decides a configuration of band unification as for the bands in which information is to be compressed specified in step S1160. As for the bands in which the absolute value of the loading is equal to or smaller than the threshold value, an information amount is reduced by widening widths of the bands of the spectrum. For example, in the example of FIG. 15, assume that the threshold value is 0.1, a small band width such as 5 nm is maintained and a value is recorded for each band having this band width as in the example of FIG. 6A as for bands included in each of the wavelength range from a to b, the wavelength range from c to d, and the wavelength range from e to f. On the other hand, as for wavelengths shorter than a and wavelengths longer than f, a band width is enlarged, for example, to 50 nm. Bands in each of the wavelength range from b to c and the wavelength range from d to e are unified as a single band.

Step S1180

The processing circuit 140 converts the model training data stored in the first storage device 110 in accordance with the band width configuration decided in step S1170. As for the bands in which detailed information is to be maintained decided in step S1160, original data is maintained without being converted. On the other hand, as for the bands decided as bands to be unified into a single band in step S1170, an average of values of bands to be unified is set as a value of the unified bands. For example, in the example of FIG. 15, as for the wavelengths shorter than a and the wavelengths longer than f, the band width can be, for example, set to 50 nm. As a pixel value of a unified band having a band width of 50 nm, an average of pixel values of bands originally included in the unified band is set. The bands in each of the wavelength range from b to c and the wavelength range from d to e are processed as a single band. An average of pixel values of bands included in each of these wavelength ranges is set as a pixel value of a new band. As a result, spectral data in which bands have different widths is generated as in the example of FIG. 6B.

Step S1190

The processing circuit 140 executes principal component analysis on the spectral data converted in step S1180. The processing circuit 140 decides principal components by the principal component analysis and calculates, for each of the principal components, loading for each band. The processing circuit 140 calculates a principal component score of each of the principal components for each sample.

Step S1200

The processing circuit 140 calculates a correlation between the principal component score of each of the principal components decided in step S1190 and a sugar content included in the training data stored in the first storage device 110 and specifies a principal component having a highest correlation between a principal component score and a sugar content.

Step S1210

The processing circuit 140 generates a loading vector of the principal component specified in step S1200 as a principal component model. The processing circuit 140 outputs the number of principal components decided in step S1190, a number of the specified principal component, that is, a position in an order of a degree of contribution among the principal components, and the principal component model to the third storage device 130. The third storage device 130 stores therein the number of principal components, the number of the extracted principal component, and the principal component model.

Step S1220

The processing circuit 140 generates an estimation model for estimating a sugar content from a principal component score on the basis of data of the sugar contents stored in the first storage device 110 and the principal component score of the principal component specified in step S1200 of each sample and transmits the estimation model to the third storage device 130. The third storage device 130 stores therein the estimation model. The estimation model is, for example, a regression model, and the third storage device 130 stores therein, for example, the parameters of the regression expression illustrated in FIG. 10A as the regression model. Alternatively, the estimation model may be, for example, data of a correspondence table format describing a sugar content corresponding to a range of a principal component score such as the one illustrated in FIG. 10B.

Step S1230

The processing circuit 140 generates a reduced reconstruction table corresponding to each sugar content estimation apparatus 200 in accordance with the spectrum band division configuration decided in step S1170. Details of the processing in step S1230 will be described later.

Step S1240

The processing circuit 140 converts the generated principal component model, estimation model, and reduced reconstruction table into transmission data and causes the transmitter 172 to transmit the transmission data. For example, the data in the format illustrated in FIG. 11A or 11B is transmitted to each sugar content estimation apparatus 200. Each sugar content estimation apparatus 200 records the received data in the storage device.

Through the above operations, the sugar content estimation apparatus 200 becomes able to estimate a sugar content of a target by using the hyperspectral camera 210.

Next, the processing of generating a reduced reconstruction table in step S1230 is described in more detail.

Figure 17:
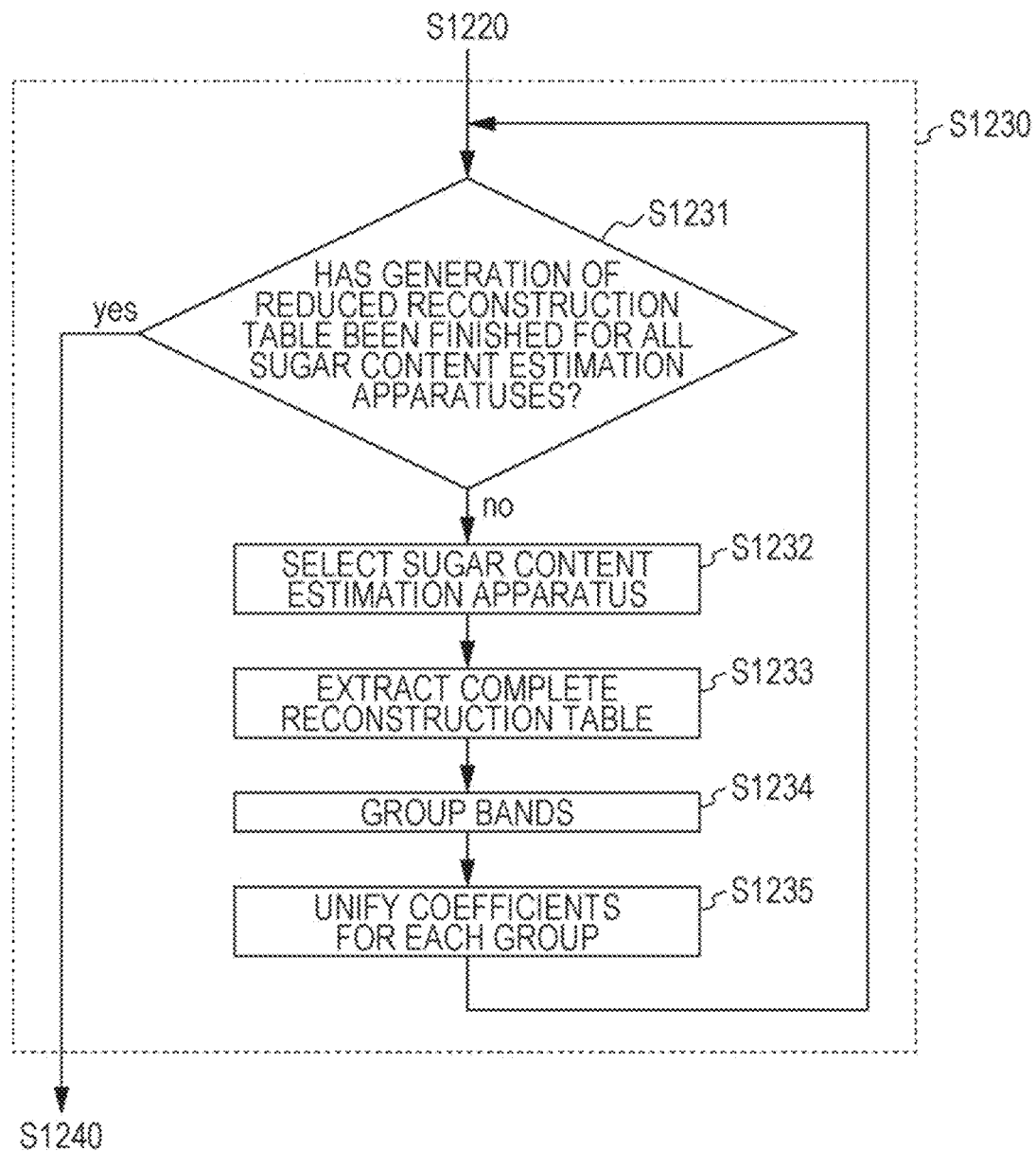
FIG. 17 is a flowchart illustrating details of processing for generating a reduced reconstruction table.

FIG. 17 is a flowchart illustrating details of the processing of generating a reduced reconstruction table in step S1230. Step S1230 includes steps S1231 to S1235 illustrated in FIG. 17. The following describes processing in each step.

Step S1231

The processing circuit 140 determines whether or not reduced reconstruction tables corresponding to all sugar content estimation apparatuses 200 have been generated. In a case where generation of the reduced reconstruction tables corresponding to all sugar content estimation apparatuses 200 is finished, step S1240 is performed. In a case where there is a sugar content estimation apparatus 200 for which a corresponding reduced reconstruction table has not been generated, step S1232 is performed.

Step S1232

The processing circuit 140 selects one of sugar content estimation apparatuses for which a reduced reconstruction table has not been generated yet.

Step S1233

The processing circuit 140 extracts a complete reconstruction table corresponding to the sugar content estimation apparatus 200 selected in step S1232 from among complete reconstruction tables stored in the second storage device 120. Note that the hyperspectral camera 210 of the sugar content estimation apparatus 200 includes filters having different transmission characteristics for respective pixels, and a characteristic of a filter corresponding to a same pixel position differs from one camera to another. Accordingly, a reconstruction table for generating luminance images for respective bands from a compressed image acquired by the hyperspectral camera 210 also differs from one camera to another. The second storage device 120 stores therein a complete reconstruction table for each sugar content estimation apparatus 200. The reduced reconstruction table is generated on the basis of the complete reconstruction table.
Step S1234

The processing circuit 140 groups bands in the complete reconstruction table in accordance with the band division configuration decided in steps S1160 and S1170. In a new band division configuration, each of bands for which a narrow band width same as that in the complete reconstruction table is maintained is set as a single group. In the new band division configuration, in a case where two or more bands in the complete reconstruction table are included in a single band, the two or more bands are grouped into a single group.
Step S1235

The processing circuit 140 adds up coefficients of bands that are grouped in step S1234. A sum of coefficients of bands included in a group is set as a coefficient of a broad band unifying the group. Note that coefficients of bands included in a group may be averaged instead of adding up the coefficients.

After the operation in step S1235, step S1231 is performed again.

By repeating steps S1231 to S1235, a corresponding reduced reconstruction table can be generated for all sugar content estimation apparatuses 200.

Assuming that H included in the formula (1) is a complete reconstruction table, a wavelength band in which a first wavelength band and a second wavelength band are unified is a first unified wavelength band, and Hr is a reduced reconstruction table, H and Hr are exemplified as follows.

The data g expressed by the formula (1) is expressed as $g=Hr[f_{12}f_3 \ldots f_m]^T$ by using Hr. An image of the first unified wavelength band corresponds to image data $f_{12}$.

When $n_x \times n_y = p$, H is a matrix of $n_x \times n_y$ rows and $n_x \times n_y \times m$ columns, that is, a matrix of p rows and p×m columns, and Hr is a matrix of p rows and p×(m−1) columns and can be expressed as follows.

$$H = \begin{pmatrix} a_{11} & \ldots & a_{1p}a_{1(p+1)} & \ldots & a_{12p}a_{1(2p+1)} & \ldots & a_{13p} & \ldots \\ a_{21} & \ldots & a_{2p}a_{2(p+1)} & \ldots & a_{22p}a_{2(2p+1)} & \ldots & a_{23p} & \ldots \\ \vdots & & & & & & & \\ a_{p1} & \ldots & a_{pp}a_{p(p+1)} & \ldots & a_{p2p}a_{p(2p+1)} & \ldots & a_{p3p} & \ldots \end{pmatrix}$$

$$Hr = \begin{pmatrix} b_{11} & \ldots & b_{1p}a_{1(2p+1)} & \ldots & a_{13p} & \ldots \\ b_{21} & \ldots & b_{2p}a_{2(2p+1)} & \ldots & a_{23p} & \ldots \\ \vdots & & & & & \\ b_{p1} & \ldots & b_{pp}a_{p(2p+1)} & \ldots & a_{p3p} & \ldots \end{pmatrix}$$

In this case, $b_{11}=a_{11}+a_{1(p+1)}, \ldots, b_{pp}=a_{pp}+a_{p(p+1)}$ may be established or $b_{11}=(a_{11}+a_{1(p+1)})/2, \ldots, b_{pp}=(a_{pp}+a_{p(p+1)})/2$ may be established. The description of step S1235 and step S1234 may be interpreted by taking the above exemplification into consideration. A coefficient may be interpreted as a component of a matrix.

Figure 18:
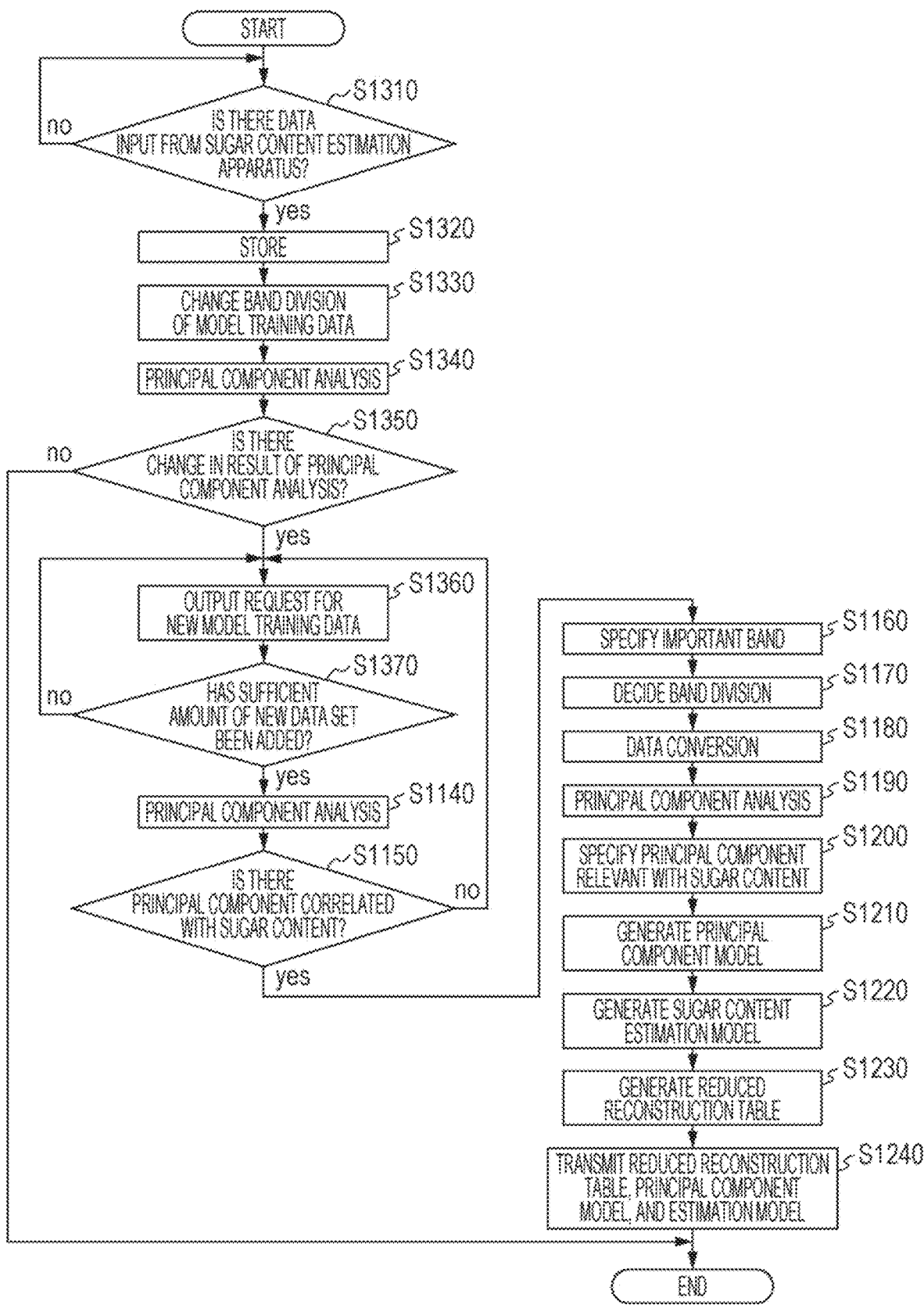
FIG. 18 is a flowchart illustrating an example of operation of the statistical learning apparatus in a state where a sugar content can be estimated.

FIG. 18 is a flowchart illustrating an example of operation of the statistical learning apparatus 100 in a state where a reduced reconstruction table, a principal component model, and an estimation model are recorded in the storage devices 220 and 240 of the sugar content estimation apparatus 200 and a sugar content can be estimated by using the hyperspectral camera 210. The following describes an operation in which the statistical learning apparatus 100 updates the reduced reconstruction table, the principal component model, and the estimation model and transmits the updated table and models to the sugar content estimation apparatus 200 with reference to FIG. 18. The operation is started by a start input unit such as the input device 180. The operation may be automatically started on the basis of a predetermined standard, for example, every certain period.
Step S1310

The processing circuit 140 determines whether or not data transmitted from the sugar content estimation apparatus 200 has been received by the receiver 160. In a case where the data has been received, step S1320 is performed. In a case where the data has not been received, step S1310 is performed again.
Step S1320

The processing circuit 140 outputs the data received in step S1310 to the first storage device 110. The first storage device 110 stores therein the received data. The received data is spectral data generated by a reduced reconstruction table. A band division configuration of this spectral data is identical to the band division configuration of the reduced reconstruction table and the principal component model recorded in the third storage device 130. The spectral data does not include data of a sugar content.
Step S1330

The processing circuit 140 converts spectrum information of model training data recorded in the first storage device 110 in accordance with the band division configuration of the reduced reconstruction table and the statistical model recorded in the third storage device 130. This conversion processing is similar to the processing in step S1180.
Step S1340

The processing circuit 140 conducts principal component analysis by using the model training data whose spectrum information has been converted in step S1330 and the spectral data transmitted from the sugar content estimation apparatus 200.
Step S1350

The processing circuit 140 determines whether or not there is a difference between a result of the principal component analysis conducted in step S1340 and a result of principal component analysis conducted before. First, the processing circuit 140 extracts a principal component of a number identical to a number of a designated principal component stored in the third storage device 130, that is, a principal component extracted as a principal component used to generate a model from among principal components decided by the principal component analysis conducted in step S1340. In a case where, for example, the data illustrated in FIG. 9 is stored in the third storage device 130, a loading vector of a first principal component is extracted. The processing circuit 140 compares a loading vector of the first principal component stored in the third storage device 130 and a loading vector of the first principal component among the principal components decided in step S1340 and calculates a difference therebetween. The difference between these two loading vectors can be, for example, a value obtained by adding up squares or absolute values of differences in loading of a corresponding component for all components (i.e., wavelength bands). In a case where a difference between the loading vectors thus calculated exceeds a predetermined value, the processing circuit 140 determines that there is a change in result of principal component analysis. In a case where the difference between the new and old loading vectors exceeds the predetermined value, step S1360 is performed. In a case where the difference between the new and old loading vectors does not exceed the predetermined value, the operation is finished.
Step S1360

The processing circuit 140 causes the output device 190 to output a request for new training sample data, as in step S1120 illustrated in FIG. 16. In a case where the output device 190 includes a display, output contents can be a character string or a warning image. In a case where the output device 190 includes a speaker, the output contents can be voice or warning sound. The new training sample data can be, for example, a set of spectral data and sugar content data corresponding to the spectral data of a fruit of a variety that was not cultivated at a time of generation of the statistical model stored in the third storage device 130.

Step S1370

The processing circuit 140 determines whether or not a sufficient amount of new model training data has been added to the first storage device 110. When the request for a new data set is output, the administrator of the statistical learning apparatus 100 collects the data set for as many varieties as possible and records the data set in the first storage device 110. The administrator performs an operation of recording the data set in the first storage device 110, for example, by using the input device 180. When this operation is performed, the processing circuit 140 performs the determining process in step S1370. It is determined whether or not an amount of model training data is sufficient, for example, on the basis of whether or not a difference between a result of principal component analysis using spectral data of all pieces of training data including the new model training data and a result of the principal component analysis conducted in step S1340 is equal to or lower than a predetermined value. More specifically, in a case where a difference between the loading vector of the designated principal component calculated in step S1340 and a loading vector of a designated principal component calculated on the basis of all pieces of training sample data including the new training sample data is equal to or lower than a predetermined value, it can be determined that a sufficient amount of new training sample data has been added. In a case where the amount of new training sample data is sufficient, step S1140 is performed. In a case where the amount of new training sample data is insufficient, step S1360 is performed again.

Subsequently, operations identical to those in steps S1140 to S1240 illustrated in FIG. 16 are performed. In this way, the principal component model, the estimation model, and the reduced reconstruction table are updated and transmitted to the sugar content estimation apparatus 200. The sugar content estimation apparatus 200 can accurately estimate a sugar content of a target by using the updated principal component model, estimation model, and reduced reconstruction table.

1-2-3. Operation of Sugar Content Estimation Apparatus 200

Next, a specific example of the operation of the sugar content estimation apparatus 200 is described.

Figure 19:
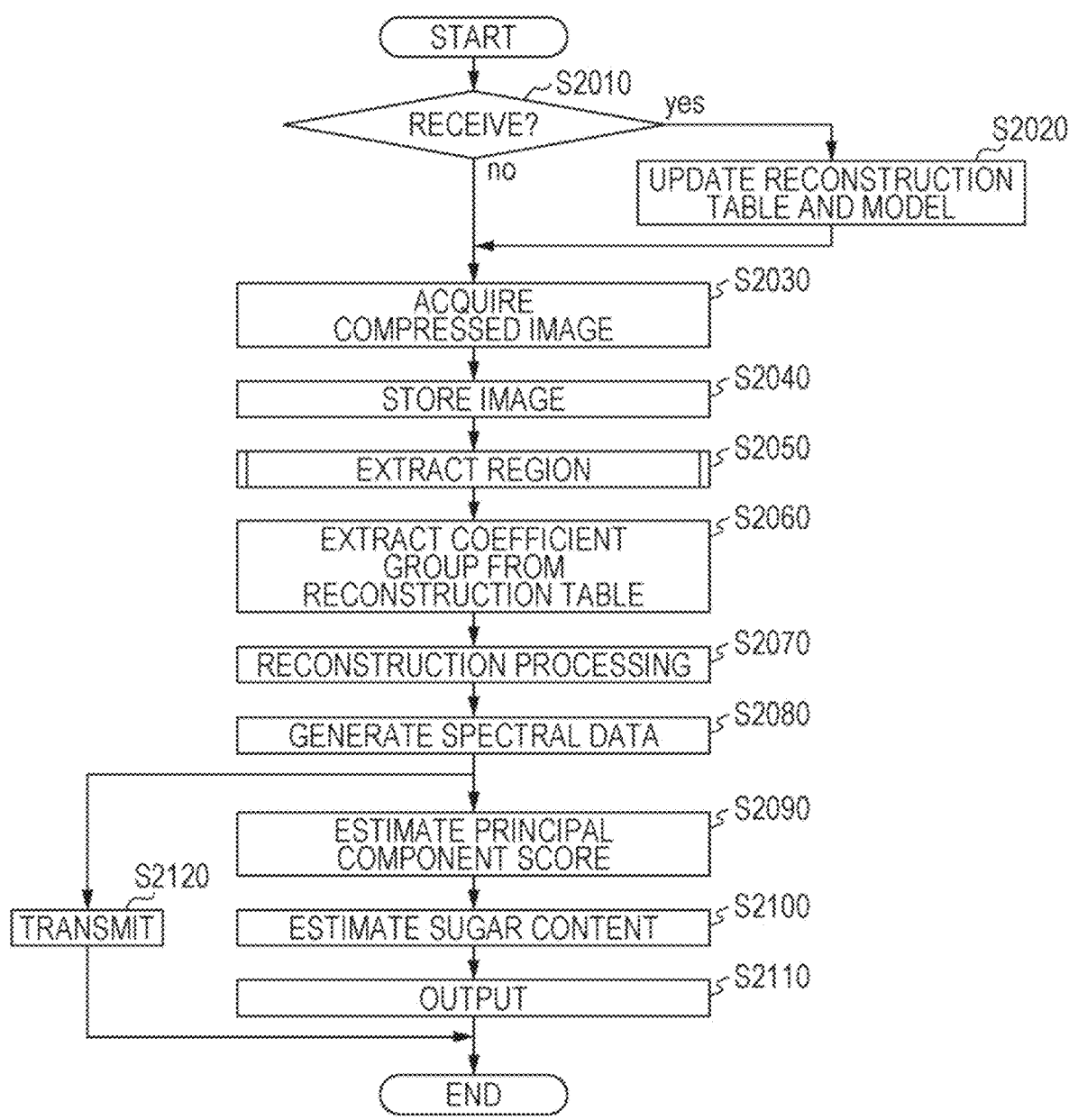
FIG. 19 is a flowchart illustrating an example of sugar content estimation performed by the sugar content estimation apparatus and communication with the statistical learning apparatus.

FIG. 19 is a flowchart illustrating an example of operation of sugar content estimation and communication with the statistical learning apparatus 100 performed by the sugar content estimation apparatus 200. The operation illustrated in FIG. 19 is performed in a state where the fourth storage device 220 stores therein a reduced reconstruction table, the fifth storage device 240 stores therein a principal component model and a sugar content estimation model, and a sugar content of a target can be estimated. The sugar content estimation apparatus 200 performs operations in steps S2010 to S2120 illustrated in FIG. 19 in response to a user's instruction. The following describes an operation in each step illustrated in FIG. 19.

Step S2010

The receiver 260 determines whether or not new model and reduced reconstruction table have been received from the statistical learning apparatus 100. In a case where the receiver 260 has received new model and reduced reconstruction table, step S2020 is performed. In a case where the receiver 260 has not received new model and reduced reconstruction table, step S2030 is performed.

Step S2020

The receiver 274 receives a signal output from the statistical learning apparatus 100 and thus acquires a reduced reconstruction table, a principal component model, and an estimation model. The receiver 274 transmits data of the acquired reduced reconstruction table to the fourth storage device 220 and updates the reduced reconstruction table already recorded in the fourth storage device 220 to the newly received reduced reconstruction table. Furthermore, the receiver 274 transmits data of the acquired principal component model and estimation model to the fifth storage device 240, and updates the principal component model and estimation model already recorded in the fifth storage device 240 to the newly received principal component model and estimation model. After step S2020, step S2030 is performed.

Step S2030

The hyperspectral camera 210 acquires a compressed image by imaging a target. The compressed image is image data from which spectral data of a detailed band configuration similar to model training data such as the one illustrated in FIG. 6A is obtained if complete reconstruction processing is performed by using a complete reconstruction table.

Step S2040

The hyperspectral camera 210 outputs the compressed image acquired by the imaging to the reconstruction processing circuit 230. The reconstruction processing circuit 230 stores the compressed image.

Step S2050

The reconstruction processing circuit 230 extracts, from the compressed image, a pixel region used for sugar content estimation, that is, one or more small regions in a region where the target is captured. The compressed image is a monochromatic image in which an intensity of light that has passed through a filter array having different transmission characteristics for different filters is recorded as a pixel value for each pixel. The reconstruction processing circuit 230 extracts a small region used for calculation from a pixel region of the compressed image where the target is captured and a light beam mirror-reflected by the target is not received. A specific example of the extracting operation will be described later.

Step S2060

The reconstruction processing circuit 230 extracts a coefficient group corresponding to each region extracted from the compressed image in step S2050 from the reduced reconstruction table stored in the fourth storage device 220.

Step S2070

The reconstruction processing circuit 230 applies, for each region extracted from the compressed image, a coefficient matrix corresponding to the region extracted from the reduced reconstruction table and thus generates, for each region, luminance images, that is, hyperspectral images of respective bands. The bands of the generated spectrum correspond to bands of elements of a loading vector indicated by the principal component model recorded in the fifth storage device 240. The reconstruction processing is performed by calculation based on the formulas (1) and (2).

Step S2080

The reconstruction processing circuit 230 generates spectral data on the basis of the hyperspectral images generated for each region of the target in step S2070. The reconstruction processing circuit 230 acquires, for each pixel within the region, data corresponding to the respective wavelength bands. Specifically, the reconstruction processing circuit 230 acquires, for each of pixels within each region, data of luminance values of the respective wavelength bands and finds, for each band, a representative value (e.g., an average or a median) of luminance values of the pixels. For example, the reconstruction processing circuit 230 may perform the following processing. The reconstruction processing circuit 230 acquires a luminance value$_{11}$ of a pixel$_{11}$ included in an image $520W_1$ of the first wavelength band to a luminance value$_{n1}$ of a pixel$_{n1}$ included in the image $520W_1$ of the first wavelength band, . . . , a luminance value$_{1m}$ of a pixel$_{1m}$ included in an image $520W_m$ of an m-th wavelength band to a luminance value$_{nm}$ of a pixel$_{nm}$ included in the image $520W_m$ of the m-th wavelength band. The reconstruction processing circuit 230 decides a representative value of the luminance values of the first wavelength band on the basis of the luminance value$_{11}$ to the luminance value$_{n1}$ . . . decides a representative value of the luminance values of the m-th wavelength band on the basis of the luminance value$_{1m}$ to the luminance value$_{nm}$. The representative value of the luminance values of the first wavelength band may be an average of the luminance value$_{11}$ to the luminance value$_{n1}$, . . . the representative value of the luminance values of the m-th wavelength band may be an average of the luminance value$_{1m}$ to the luminance value$_{nm}$. Data in which the representative values thus found are arranged in an order of the wavelength bands can be generated as hyperspectral data. After the operation in step S2080 is executed, step S2090 and step S2120 are performed.

Step S2090

The estimation processing circuit 250 finds a principal component score by applying the principal component model stored in the fifth storage device 240 to the spectral data generated in step S2080. The principal component score is, for example, found by calculating an inner product of a principal component loading vector exemplified in FIG. 9 and a vector that is a data sequence of the representative luminance values within the region for the respective wavelength bands indicated by the spectral data.

Step S2100

The estimation processing circuit 250 estimates a sugar content of the target from the principal component score calculated in step S2090 on the basis of the estimation model stored in the fifth storage device 240. The estimation model is, for example, data that defines a regression expression exemplified in FIG. 10A or a correspondence table exemplified in FIG. 10B.

Step S2110

The estimation processing circuit 250 causes the output device 190 to output information indicative of the sugar content estimated in step S2100. The information indicative of the sugar content can be output in any format. For example, the information indicative of the sugar content can be output as a text on a display or a printer or as voice from a speaker. Alternatively, the information indicative of the sugar content may be output as a signal to a sorting machine, a fruit picking device, or a quality management device for an agricultural product such as a fruit or a vegetable. The information indicative of the sugar content may be displayed or presented as warning using light or sound.

Figure 20A:
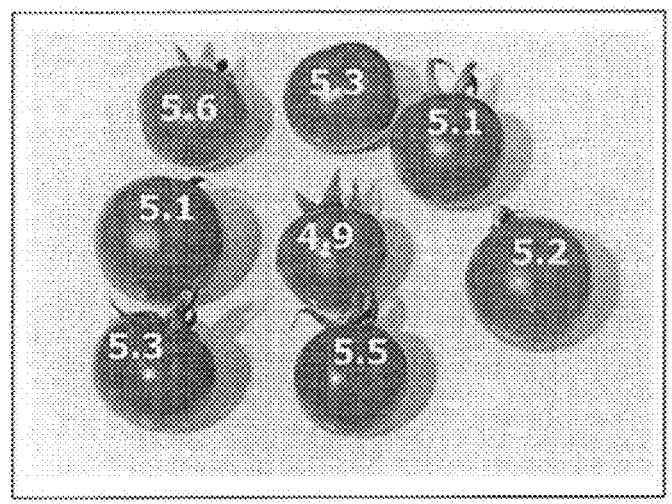
FIG. 20A illustrates an example of information output from an output device.
Figure 20B:
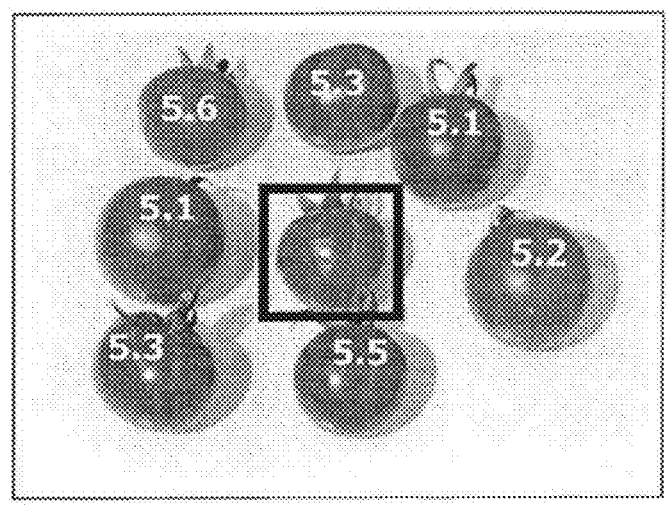
FIG. 20B illustrates an example of error display.

FIG. 20A illustrates an example of the information output from the output device 190 in step S2110. In this example, the output device 190 includes a display, and displays an image in which a value of a sugar content is superimposed on an image of a target. FIG. 20B illustrates an example of error display output from the output device 190. In this example, the output device 190 displays an image in which a target whose sugar content has not been accurately estimated among imaged targets is emphasized by a frame or the like. Such display allows a user to easily grasp a sugar content estimation result or an error state.

Step S2120

The reconstruction processing circuit 230 instructs the transmitter 272 to transmit the spectral data of the target generated in step S2080 to the statistical learning apparatus 100. The transmitted data can be, for example, a terminal ID for specifying the sugar content estimation apparatus 200, a target ID, and spectral data for each target, as illustrated in FIG. 13. The spectral data for each target can be a data sequence of representative values of luminance for respective bands of pixels included in a region expressing the target. The band division configuration in this spectral data is decided by the reduced reconstruction table transmitted in advance from the statistical learning apparatus 100. The number of bands is shared by the statistical learning apparatus 100 and the sugar content estimation apparatus 200. The transmitter 272 transmits the spectral data of the target region as a data sequence describing representative luminance values of a predetermined number of bands in a predetermined data amount (e.g., 16 bits).

Note that the operation in step S2120 may be performed in parallel with the operations in steps S2090 to S2110 or may be performed before or after the operations in steps S2090 to S2110.

After the operations in steps S2110 and S2120, the sugar content estimation apparatus 200 finishes the operation.

By the operations in steps S2010 to S2110 and step S2120, the sugar content estimation apparatus 200 can not only estimate a sugar content of the target on the basis of the model, but also transmit spectral data of the target to the statistical learning apparatus 100. By transmission of the new spectral data from the sugar content estimation apparatus 200 to the statistical learning apparatus 100, the statistical learning apparatus 100 can determine whether or not to update the model and the reduced reconstruction table on the basis of the new spectral data. In a case where the statistical learning apparatus 100 updates the model and the reduced reconstruction table, the sugar content estimation apparatus 200 receives the updated latest model and reduced reconstruction table. This allows the sugar content estimation apparatus 200 to always generate hyperspectral data on the basis of the latest reduced reconstruction table and estimate a sugar content on the basis of the latest model.

Figure 21:
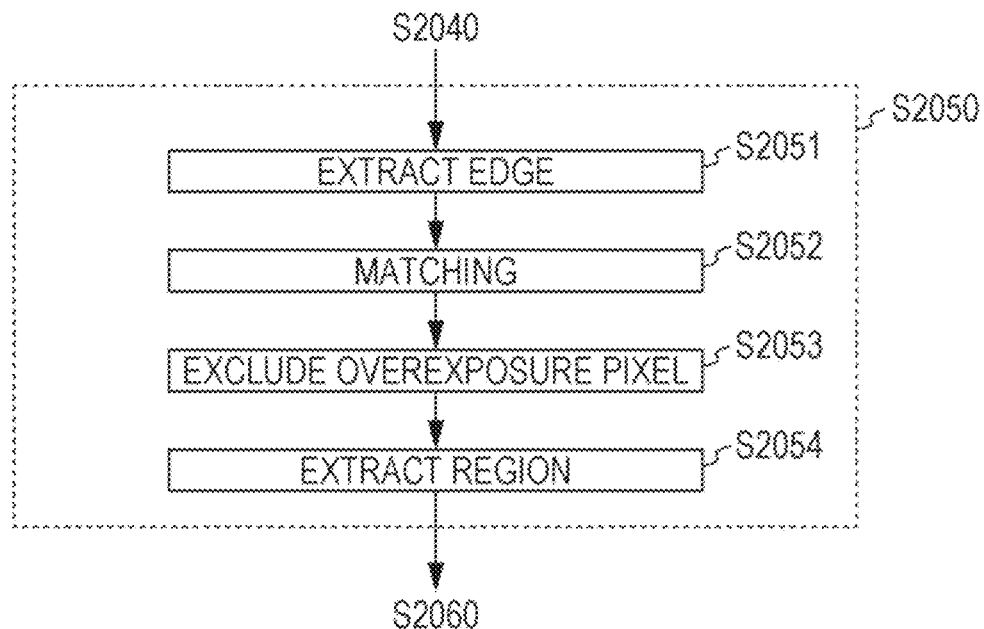
FIG. 21 is a flowchart illustrating an example of operation of specifying a region of a target from a compressed image and extracting a pixel region for which spectral data is to be generated.

Next, a specific example of the region extracting operation in step S2050 is described. FIG. 21 is a flowchart illustrating an example of an operation of specifying a region of a target from a compressed image acquired by imaging by the hyperspectral camera 210 and extracting a pixel region for which spectral data is to be generated. In the example of FIG. 21, step S2050 includes operations in steps S2051 to S2054. The following describes an operation in each step.

Step S2051

The reconstruction processing circuit 230 performs image processing on the compressed image acquired in step S2030 as a monochromatic image. The reconstruction processing circuit 230 performs processing for extracting an edge from the compressed image.

Step S2052

The reconstruction processing circuit 230 performs matching processing on the extracted edge while using a shape of the target as a template and thereby extracts a region indicative of the target.

Step S2053

The reconstruction processing circuit 230 exclude, from the extracted region indicative of the target, an overexposure pixel, which is a pixel whose pixel value exceeds a predetermined value that is close to a maximum value, within the extracted region.

Step S2054

The reconstruction processing circuit 230 extracts, as a region for which spectral data is to be calculated, a certain number of successive pixels excluding the pixel excluded in step S2053 within the region extracted in step S2052. The successive pixels can be, for example, five or more pixels in the longitudinal and lateral directions but are not limited to this. More than one pixel region may be extracted.

Although the reconstruction processing circuit 230 extracts a region indicative of the target from the compressed image and generates hyperspectral images only for the region in the above example, the present disclosure is not limited to such an operation. For example, processing illustrated in FIGS. 22 and 23 may be performed.

Figure 22:
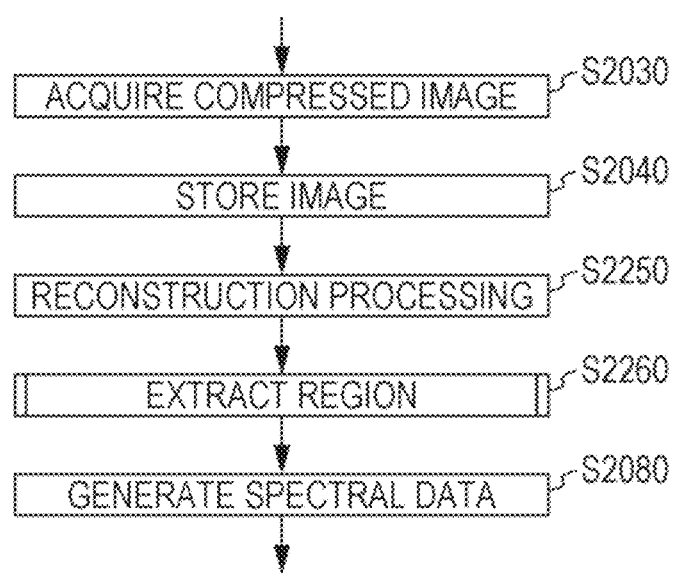
FIG. 22 is a flowchart illustrating a modification of operations in steps S2030 to S2080 illustrated in FIG. 19.
Figure 23:
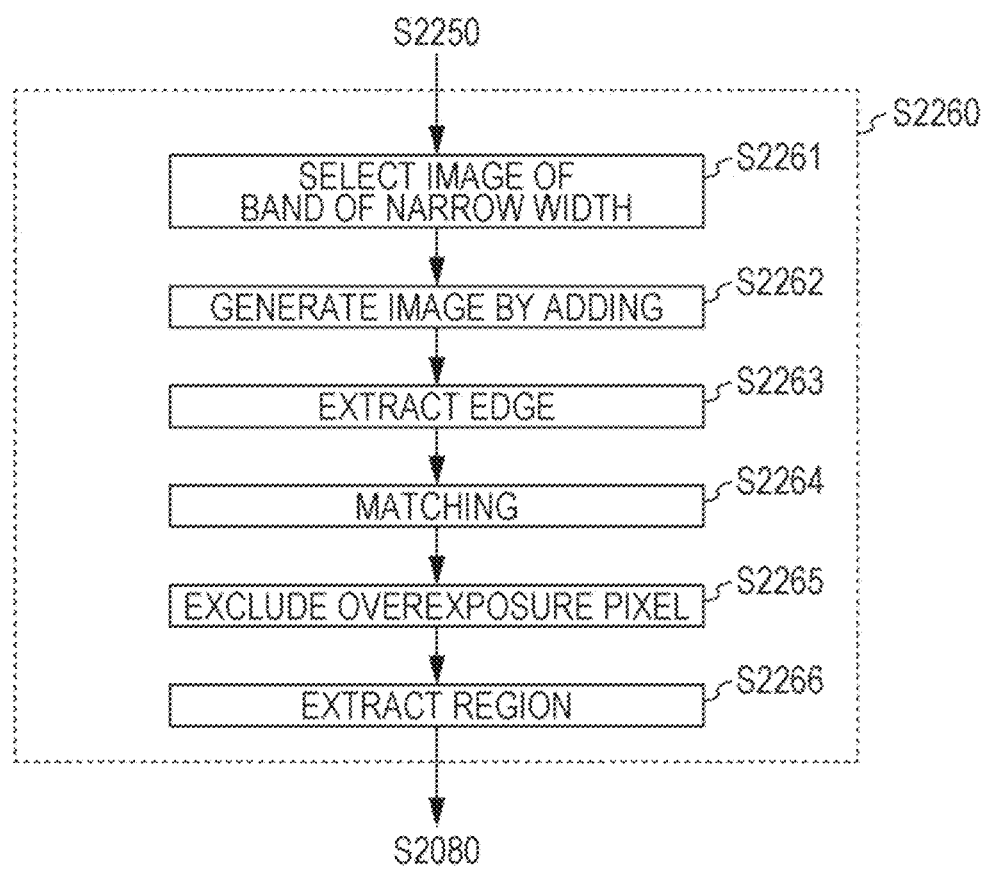
FIG. 23 is a flowchart illustrating details of the operation in step S2260 in FIG. 22.

FIG. 22 is a flowchart illustrating a modification of the operations in steps S2030 to S2080 illustrated in FIG. 19. FIG. 23 is a flowchart illustrating details of the operation in step S2260 in FIG. 22. In this example, the reconstruction processing circuit 230 generates hyperspectral images by using a reduced reconstruction table without extracting a region from the compressed image acquired in step S2030 (step S2250). The reconstruction processing is performed by calculation based on the formulas (1) and (2) described above. In this way, hyperspectral images including information on all pixels are generated. The reconstruction processing circuit 230 extracts one or more regions indicative of a target from the generated hyperspectral images including information on all pixels by a method similar to step S2050 described above (step S2260). The reconstruction processing circuit 230 generates, for each of the extracted regions, data in which representative values of luminance are arranged for respective bands as hyperspectral data (step S2080).

A specific example of the region extracting processing in step S2260 is described with reference to FIG. 23. In this example, first, the reconstruction processing circuit 230 selects one or more images of a band having a relatively narrow band among the hyperspectral images including information on all pixels generated in step S2250 (step S2261). The band having a narrow width means a band for which detailed spectrum information is needed and is considered to be a band in which the target is easily detected. The reconstruction processing circuit 230 generates a synthetic image by adding the one or more band images selected in step S2261 (step S2262). The estimation processing circuit 250 performs edge extraction on the image synthesized in step S2263 (step S2263). The edge extraction processing is similar to the processing performed in step S2051 described above. The reconstruction processing circuit 230 further extracts one or more regions indicative of the target by performing matching of the extracted edge with the template of the target (step S2264). The reconstruction processing circuit 230 extracts an overexposure pixel from the extracted region (step S2265). Then, a pixel region for spectral data generation is extracted from the region indicative of the target (step S2266). The processing in steps S2263 to S2266 is similar to the processing in steps S2051 to S2054 described above.

1-3. Effects and Others

As described above, according to the present embodiment, the statistical learning apparatus 100 conducts principal component analysis by using model training data including hyperspectral data and sugar content data of samples. The statistical learning apparatus 100 decides a wavelength band of relatively high importance and a wavelength band of relatively low importance in estimation of a sugar content of a target on the basis of a result of the analysis. By integrating successive wavelength bands of relatively low importance, a wavelength band division configuration is optimized. The statistical learning apparatus 100 generates, for each sample, hyperspectral data of a reduced data size in accordance with the optimized wavelength band division configuration. A statistical model is generated by conducting principal component analysis by using the hyperspectral data. The statistical model includes a principal component model for calculating a principal component of a specific principal component correlated with a sugar content from the hyperspectral data of the target and a sugar content estimation model for estimating a sugar content from the principal component score. Meanwhile, the statistical learning apparatus 100 generates a reduced reconstruction table by reconfiguring a reconstruction table for generating hyperspectral images from a compressed image acquired by the hyperspectral camera 210 of the sugar content estimation apparatus 200 in accordance with the optimized band division configuration. The statistical learning apparatus 100 transmits the generated principal component model, sugar content estimation model, and reduced reconstruction table to the sugar content estimation apparatus 200. The sugar content estimation apparatus 200 can generate hyperspectral data of the target from the compressed image by using the reduced reconstruction table and estimate the sugar content from the hyperspectral data by using the principal component model and the sugar content estimation model.

Furthermore, the sugar content estimation apparatus 200 transmits the hyperspectral data generated for estimation of a sugar content to the statistical learning apparatus 100. The statistical learning apparatus 100 determines whether or not the new hyperspectral data transmitted from the sugar content estimation apparatus 200 is deviated from hyperspectral data of existing samples, in other words, whether or not it is necessary to re-create a model. In a case where the transmitted hyperspectral data is deviated from the hyperspectral data of the existing samples and an existing model cannot be applied, the statistical learning apparatus 100 requests addition of training sample data to generate a new model. When a sufficient amount of sample data necessary for re-learning, the statistical learning apparatus 100 performs learning again on the basis of the added sample data and the existing sample data and generates a new statistical model and a reduced reconstruction table according to a band division configuration corresponding to the new statistical model. By such an operation, even in a case where a target whose sugar content cannot be estimated by the existing model appears, for example, due to development of a new variety or a new cultivation method, the statistical learning apparatus 100 can speedily generate a new model and a reduced reconstruction table corresponding to the model. When the new model and the reduced reconstruction table are generated, the statistical learning apparatus 100 transmits data of the new model and reduced reconstruction table to the sugar content estimation apparatus 200. In this way, the estimation apparatus 200 can always generate hyperspectral data on the basis of the new reduced reconstruction table and estimate a sugar content of a target on the basis of the new model. It is therefore possible to more accurately estimate even a sugar content of a target of a new variety, a target produced by a new cultivation method, or the like.

In the present embodiment, a reduced reconstruction table that generates detailed spectral data with a narrow band width as for a band important in calculation of a principal component score of a principal component correlated with a sugar content and generates spectral data with a wide narrow band width as for a band that is not important is used. It is therefore possible to reduce a calculation amount of the reconstruction processing performed by the sugar content estimation apparatus 200 and estimate a sugar content in a shorter time.

Although a sugar content is estimated as a property that depends on a concentration of a specific substance included in a target in the present embodiment, the technique of the present embodiment may be applied to a system for estimating a property other than a sugar content. For example, the technique of the present embodiment may be applied to a system for estimating a concentration or a content of a nutrient component other than sugar. The same applies to the subsequent embodiments.

Second Embodiment

Next, a second embodiment is described. In the present embodiment, a statistical learning apparatus 100 classifies and stores model training data on the basis of a variety, a cultivation method, or the like and creates a principal component model, an estimation model, and a reduced reconstruction table for each classification. A sugar content estimation apparatus 200 transmits spectral data of a target to which classification information is added. The statistical learning apparatus 100 determines, for each classification, necessity of re-learning of a model. By holding training data for each classification and generating a model and a reconstruction table for each classification, dispersion of spectral data can be made smaller, and accuracy of estimation of a principal component score can be increased. As a result, accuracy of estimation of a sugar content can be increased. The classification can be performed on the basis of an item that gives certain influence on a state of a crop such as a kind of the crop, a variety of the crop, a place of production, a cultivation method, or used fertilizer. The following mainly describes differences from the first embodiment. Constituent elements identical to or similar to those in the first embodiment are given identical reference signs, and repeated description thereof is omitted.

2-1. Configuration

Figure 24:
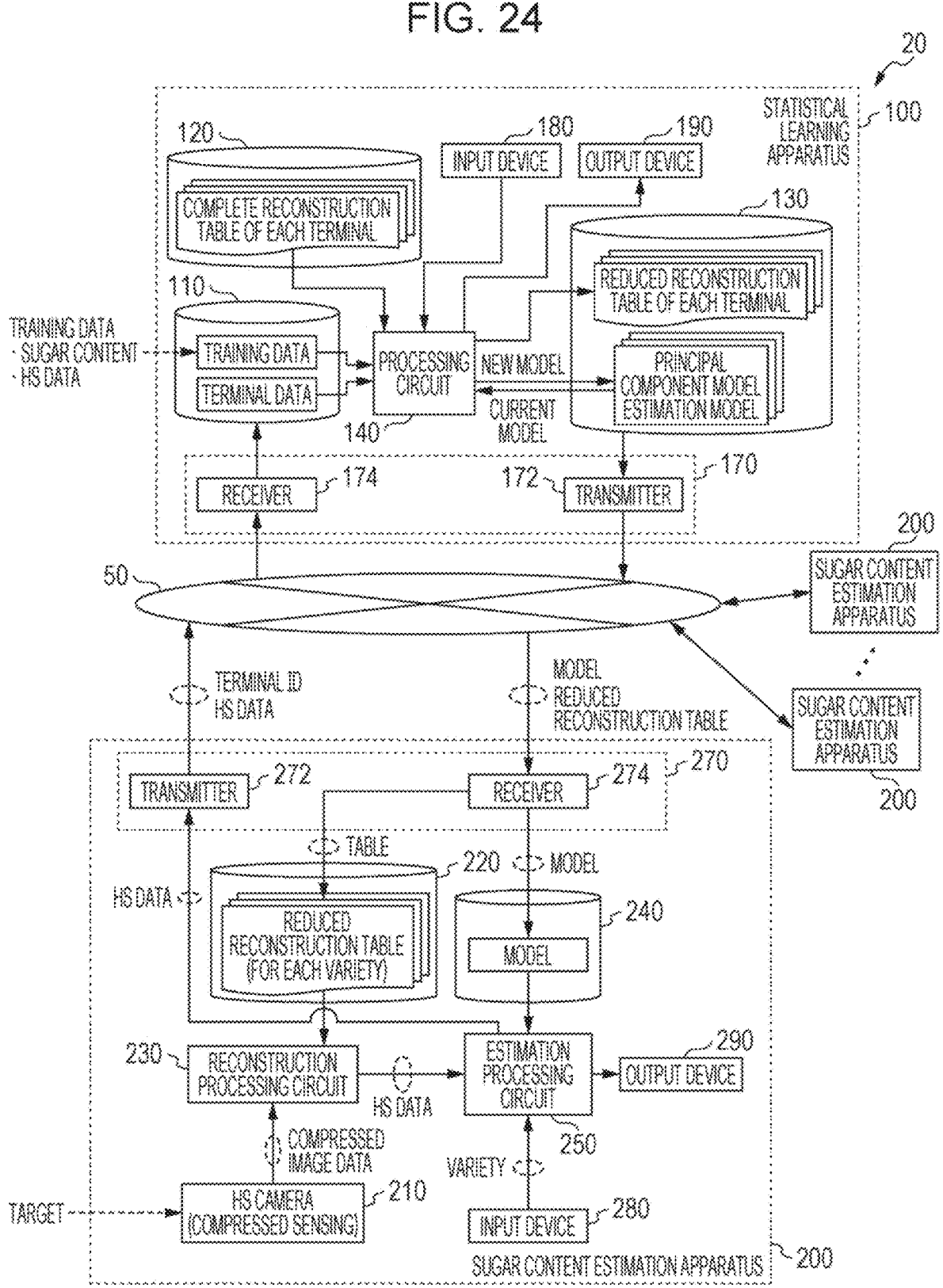
FIG. 24 is a block diagram illustrating a configuration of a sugar content estimation system according to a second embodiment.

FIG. 24 is a block diagram illustrating a sugar content estimation system 20 according to the present embodiment. A hardware configuration of the sugar content estimation system 20 is almost identical to the hardware configuration of the sugar content estimation system 10 according to the first embodiment illustrated in FIG. 3. The present embodiment is different from the first embodiment in that a user of the sugar content estimation apparatus 200 can enter a variety of a target by using an input device 280 and a statistical model (i.e., a principal component model and an estimation model) and a reduced reconstruction table are generated for each variety. Note that a classification such as a kind of crop, a place of cultivation, a cultivation method, a used fertilizer, or a cultivation period may be used instead of the variety or in addition to the variety.

FIG. 25A illustrates an example of model training data stored in a first storage device 110 of the statistical learning apparatus 100. FIG. 25B illustrates an example of data based on spectral data transmitted from each terminal stored in the first storage device 110. In the present embodiment, a processing circuit 140 of the statistical learning apparatus 100 causes model training data and data based on spectral data received from each sugar content estimation apparatus 200 to be recorded, for each of one or more classifications such as a variety, in the first storage device 110. In the example illustrated in FIG. 25A, sugar contents of samples and spectral data are recorded for each classification in association with each other. As illustrated in FIG. 25B, spectral data received from the sugar content estimation apparatus 200 is also recorded for each variety. Although band widths are not uniform in the spectral data received from the sugar content estimation apparatus 200, the processing circuit 140 that has received the spectral data records the spectral data after converting the spectral data in accordance with a band division configuration similar to the model training data.

A third storage device 130 according to the present embodiment stores therein a reduced reconstruction table for each sugar content estimation apparatus 200 and for each classification and stores therein a principal component model and an estimation model for each classification.

Figure 26A:
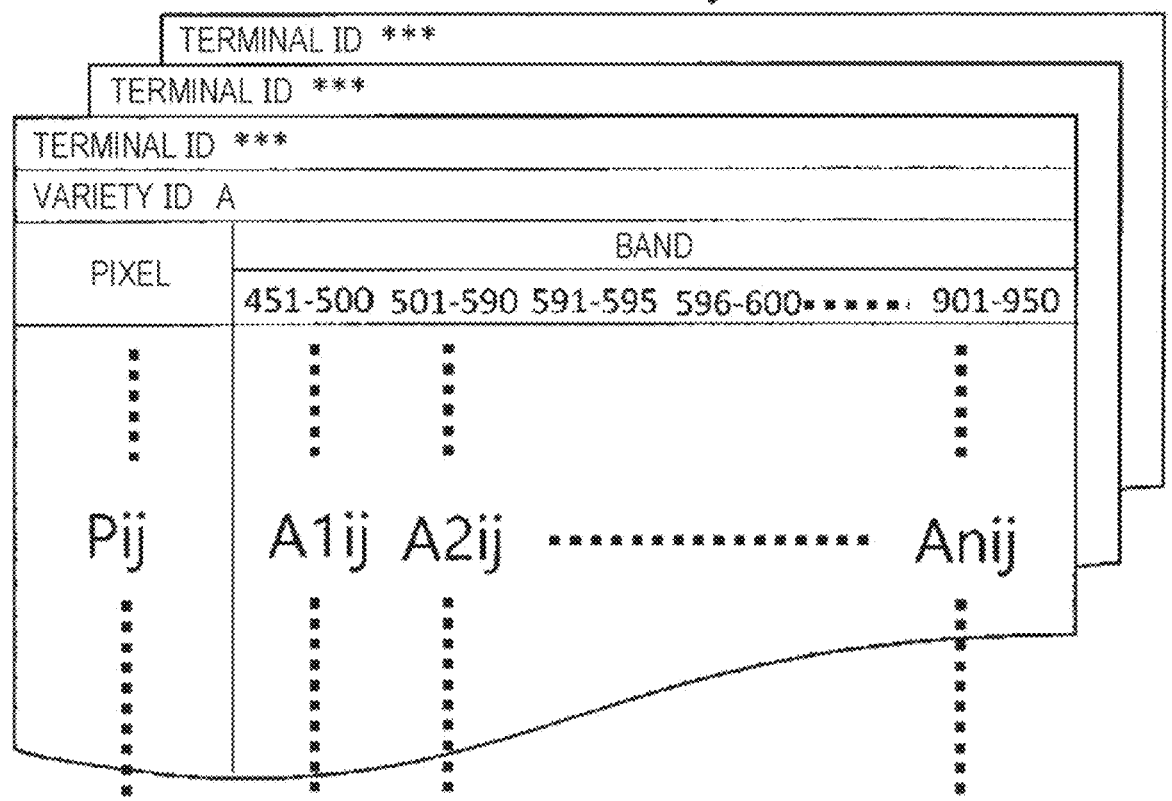
FIG. 26A illustrates an example of a reduced reconstruction table stored for each terminal and classification in a third storage device.

FIG. 26A illustrates an example of a reduced reconstruction table recorded for each terminal and for each classification in the third storage device 130 according to the present embodiment. Data of the reduced reconstruction table in this example includes a terminal ID for identifying the sugar content estimation apparatus 200 and an ID for specifying a classification such as a variety. In the present embodiment, the statistical model is generated for each classification, and the reduced reconstruction table is also generated for each classification accordingly. Accordingly, an ID for specifying a classification is recorded in the reduced reconstruction table in addition to the terminal ID. Band widths in the reduced reconstruction table are not uniform unlike a complete reconstruction table stored in a second storage device 120. The reduced reconstruction table generates information on bands with band widths corresponding to the statistical model. The reduced reconstruction table is updated every time the statistical model is updated.

Figure 26B:
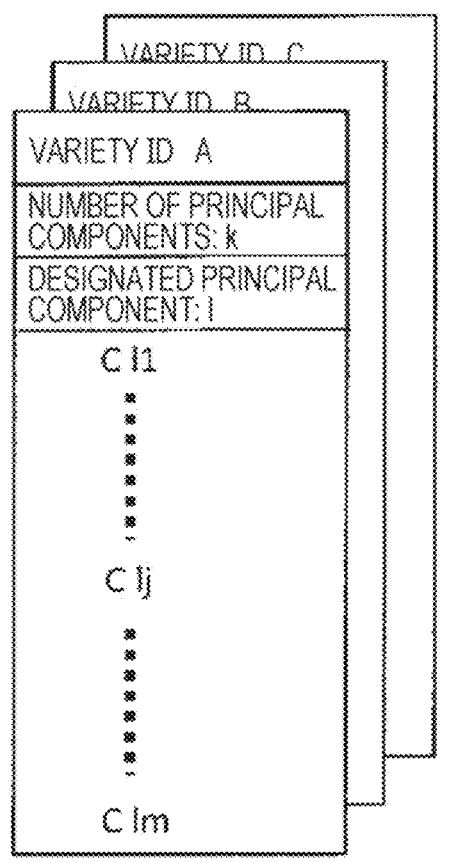
FIG. 26B illustrates an example of data of a principal component model stored in the third storage device.

FIG. 26B illustrates an example of data of a principal component model recorded in the third storage device 130. In the present embodiment, the principal component model is generated and recorded for each classification such as a variety. Accordingly, data indicative of the principal component model includes an ID for specifying a classification such as a variety ID. A number of a principal component and a loading vector are recorded for each classification.

FIG. 26C illustrates an example of data of an estimation model stored in the third storage device 130. In this example, parameters of a primary expression expressing a relationship between a principal component score and a sugar content is recorded for each classification.

FIG. 26D illustrates another example of data of an estimation model stored in the third storage device 130. In this example, the estimation model is recorded in a format of a table illustrating a correspondence between a range of a principal component score and a sugar content. This table includes an ID for specifying a classification such as a variety and is recorded for each classification.

The processing circuit 140 according to the present embodiment generates the statistical model and the reduced reconstruction table for each classification and causes a transmitter 172 to transmit data of the statistical model and the reduced reconstruction table.

Figure 27A:
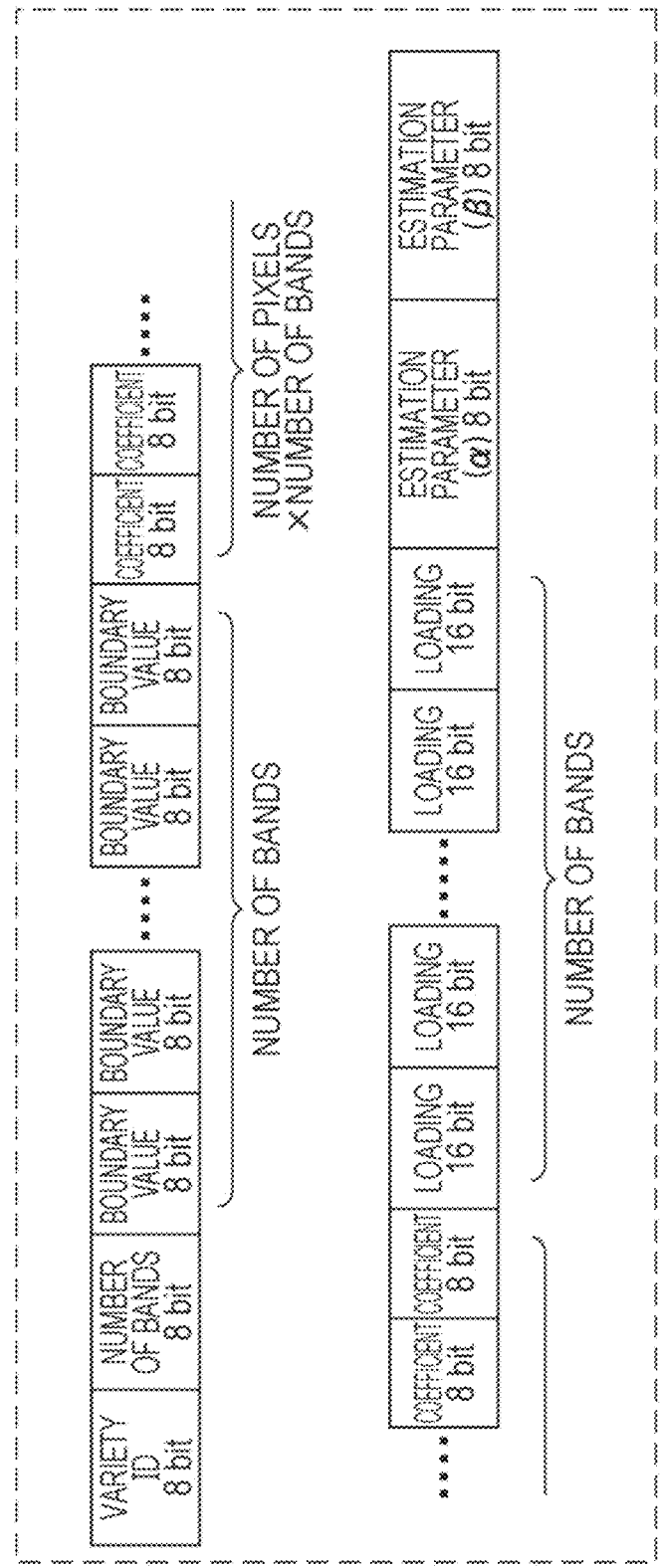
FIG. 27A illustrates an example of a format of data transmitted by the statistical learning apparatus.
Figure 27B:
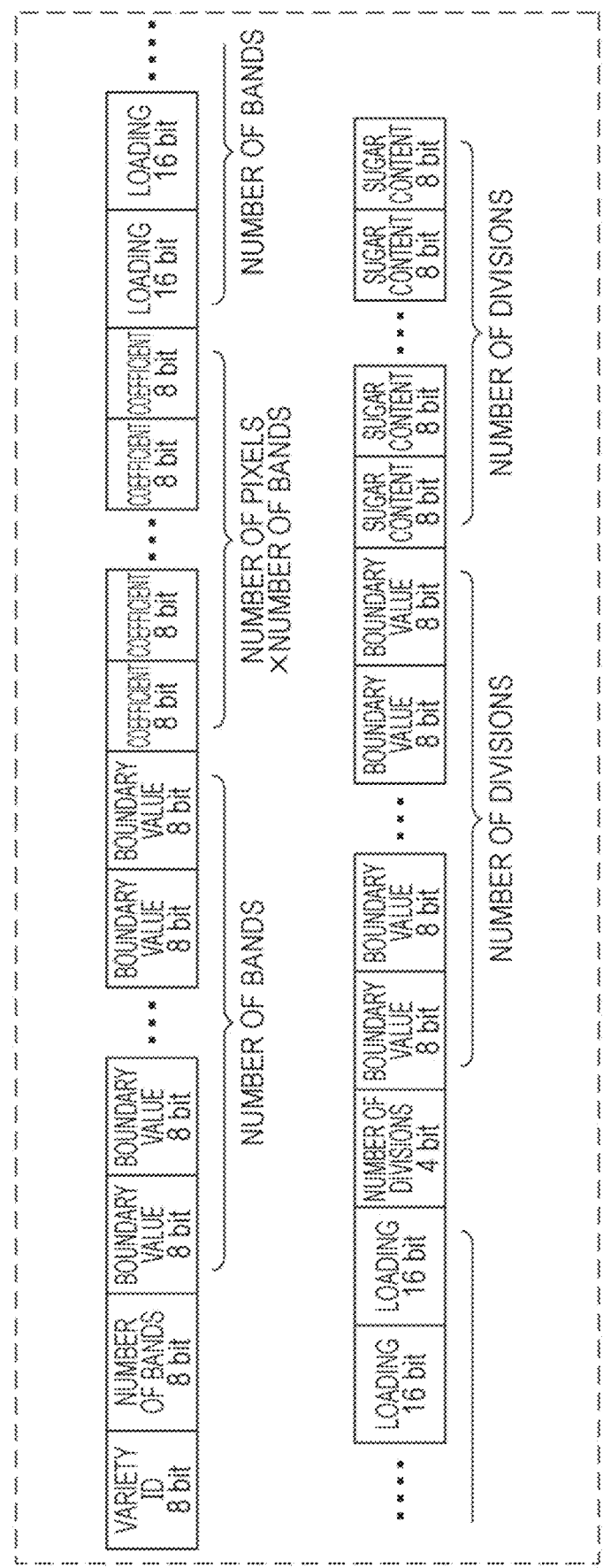
FIG. 27B illustrates another example of a format of the data transmitted by the statistical learning apparatus.

FIGS. 27A and 27B illustrate an example of a format of the data transmitted by the transmitter 172. FIG. 27A illustrates an example of the transmitted data in a case where the sugar content estimation apparatus 200 estimates a sugar content from a principal component score on the basis of a regression model. In this example, a variety ID is added in addition to the data illustrated in FIG. 11A. FIG. 27B illustrates an example of the transmitted data in a case where the sugar content estimation apparatus 200 estimates a sugar content from a principal component score by referring to a correspondence table. In this example, a variety ID is added in addition to the data illustrated in FIG. 11B. In a case where a classification different from a variety is used, an ID for specifying the classification is added to the transmitted data.

The sugar content estimation apparatus 200 according to the present embodiment is configured to be capable of receiving information indicative of a classification such as a variety of a target. A user can enter information indicative of a classification such as a variety of a target by using the input device 280. An estimation processing circuit 250 generates output data including data indicative of the entered variety or the like and compressed image data generated by a hyperspectral camera 210 and causes a transmitter 272 to transmit the output data.

Figure 28:
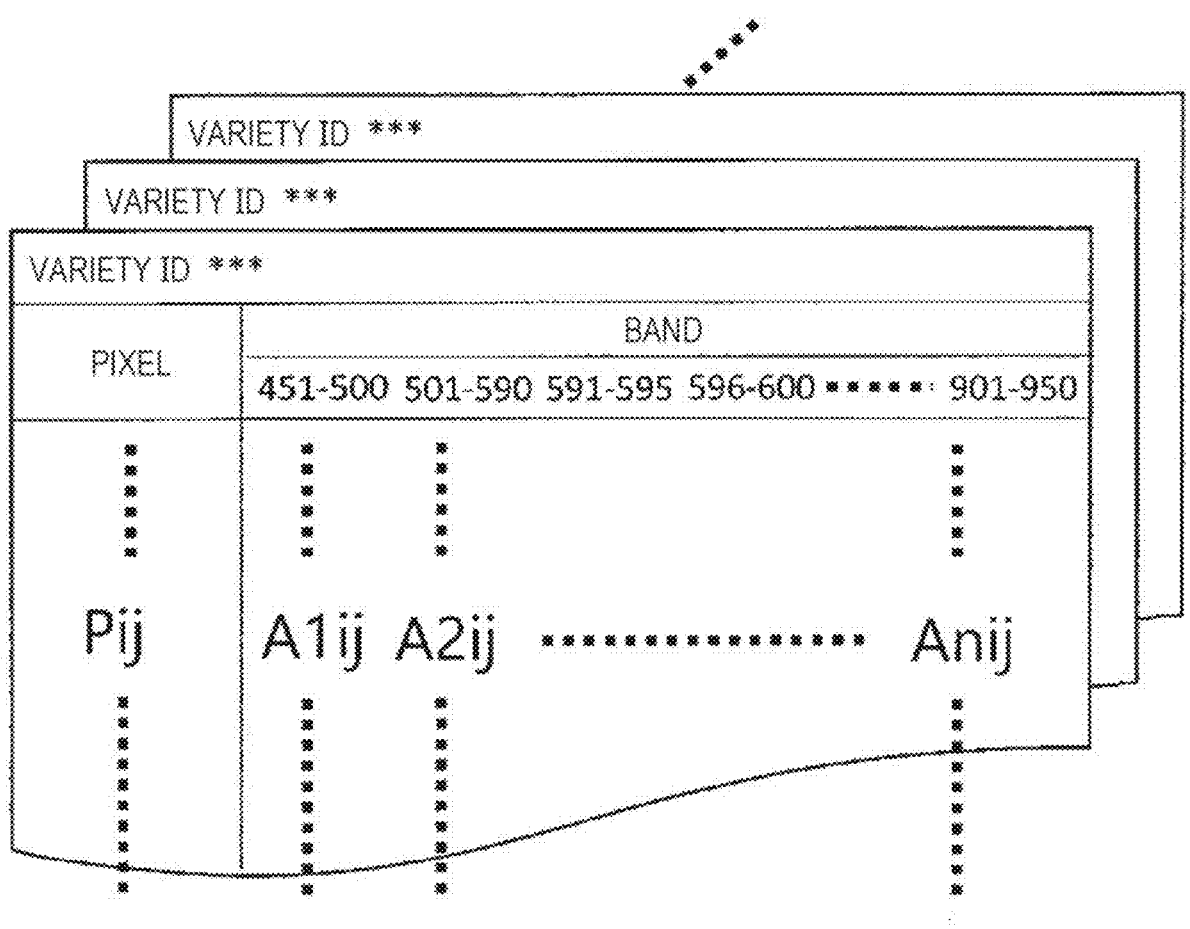
FIG. 28 illustrates an example of a reduced reconstruction table recorded for each variety in a fourth storage device according to the second embodiment.

FIG. 28 illustrates an example of a reduced reconstruction table recorded for each variety in a fourth storage device 220 according to the present embodiment. Data of the reduced reconstruction table recorded in the fourth storage device 220 also includes an ID for specifying a variety.

A fifth storage device 240 stored therein a principal component model and an estimation model generated for each variety transmitted from the statistical learning apparatus 100. Contents of the principal component model and the estimation model recorded in the fifth storage device 240 are similar to the contents of the principal component model and the estimation model recorded in the third storage device 130 of the statistical learning apparatus 100.

The estimation processing circuit 250 selects a statistical model and an estimation model stored in the fifth storage device 240 in accordance with designation of a variety. Then, the estimation processing circuit 250 estimates a sugar content of a target in a hyperspectral image generated by a reconstruction processing circuit 230 on the basis of the selected models.

The transmitter 272 transmits spectral data generated by the reconstruction processing circuit 230 to the statistical learning apparatus 100 together with variety information.

Figure 29:
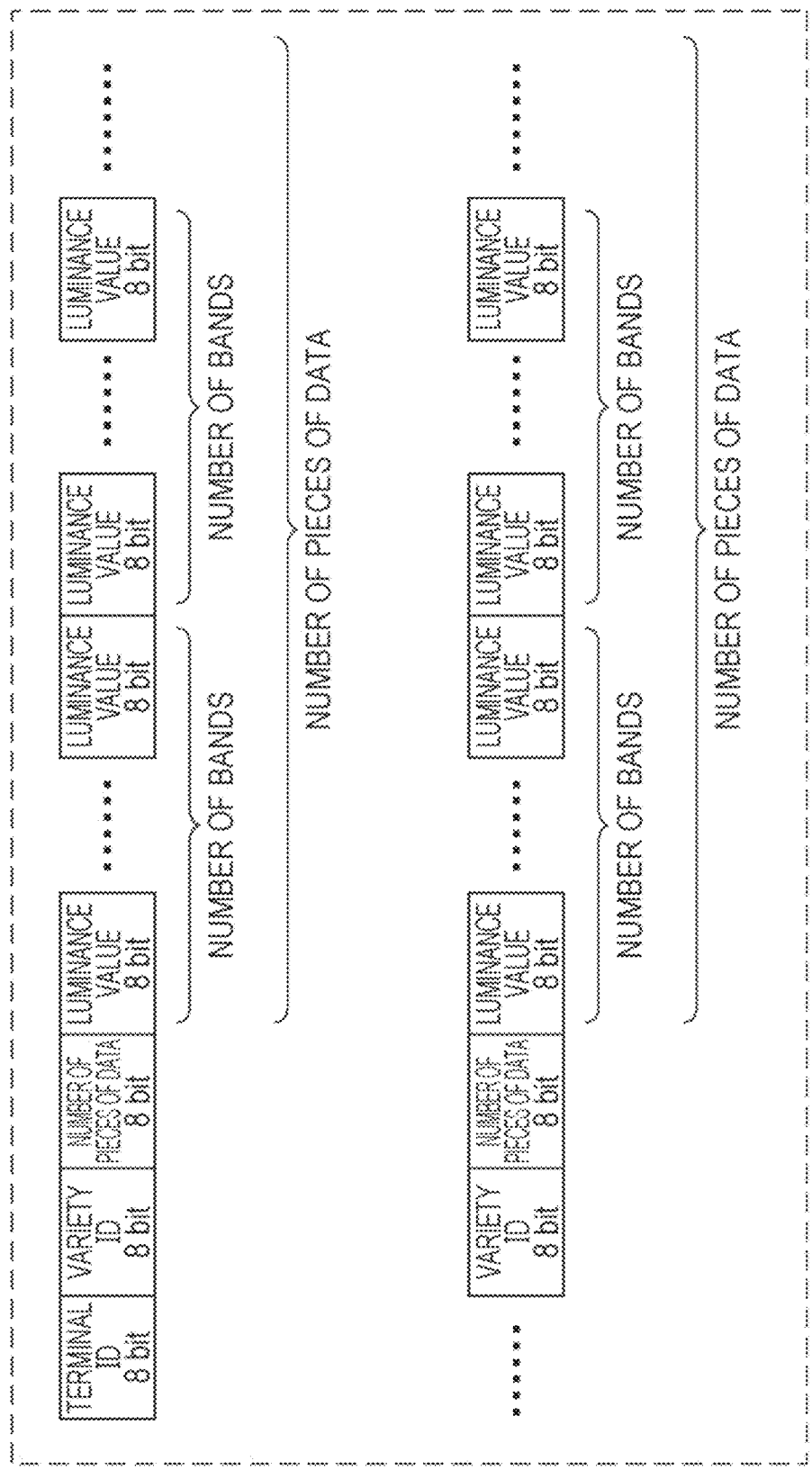
FIG. 29 illustrates an example of data transmitted to the statistical learning apparatus.

FIG. 29 illustrates an example of the data transmitted to the statistical learning apparatus 100 by the transmitter 272. The transmitted data illustrated in FIG. 29 includes a terminal ID for identifying the sugar content estimation apparatus 200, a variety ID for identifying a variety, the number of pieces of data acquired for a same target, and data of a luminance value for each band of spectral data generated by a reduced reconstruction table. Since a statistical model varies from one variety to another, the number of bands also varies from one variety to another. However, by designating a variety ID, information on the number of bands is shared by the sugar content estimation apparatus 200 and the statistical learning apparatus 100. Accordingly, the transmitted data need not necessarily include information on the number of bands.

2-2. Operation

The statistical learning apparatus 100 generates a principal component model and an estimation model for each variety and generates, for each sugar content estimation apparatus 200, a reduced reconstruction table corresponding to a principal component model for each variety. The statistical learning apparatus 100 acquires variety information and latest spectral data from the sugar content estimation apparatus 200 and updates a principal component model and an estimation model for estimation for a corresponding variety on the basis of new model training data as need. The statistical learning apparatus 100 also updates reduced reconstruction tables corresponding to the respective sugar content estimation apparatuses 200 in accordance with update of the principal component model. The statistical learning apparatus 100 sequentially transmits data of the updated principal component model and estimation model for the corresponding variety and the reduced reconstruction table to the sugar content estimation apparatus 200. The sugar content estimation apparatus 200 receives data of the latest principal component model and estimation model from the statistical learning apparatus 100 and always performs estimation on the basis of the latest statistical model.

Figure 30:
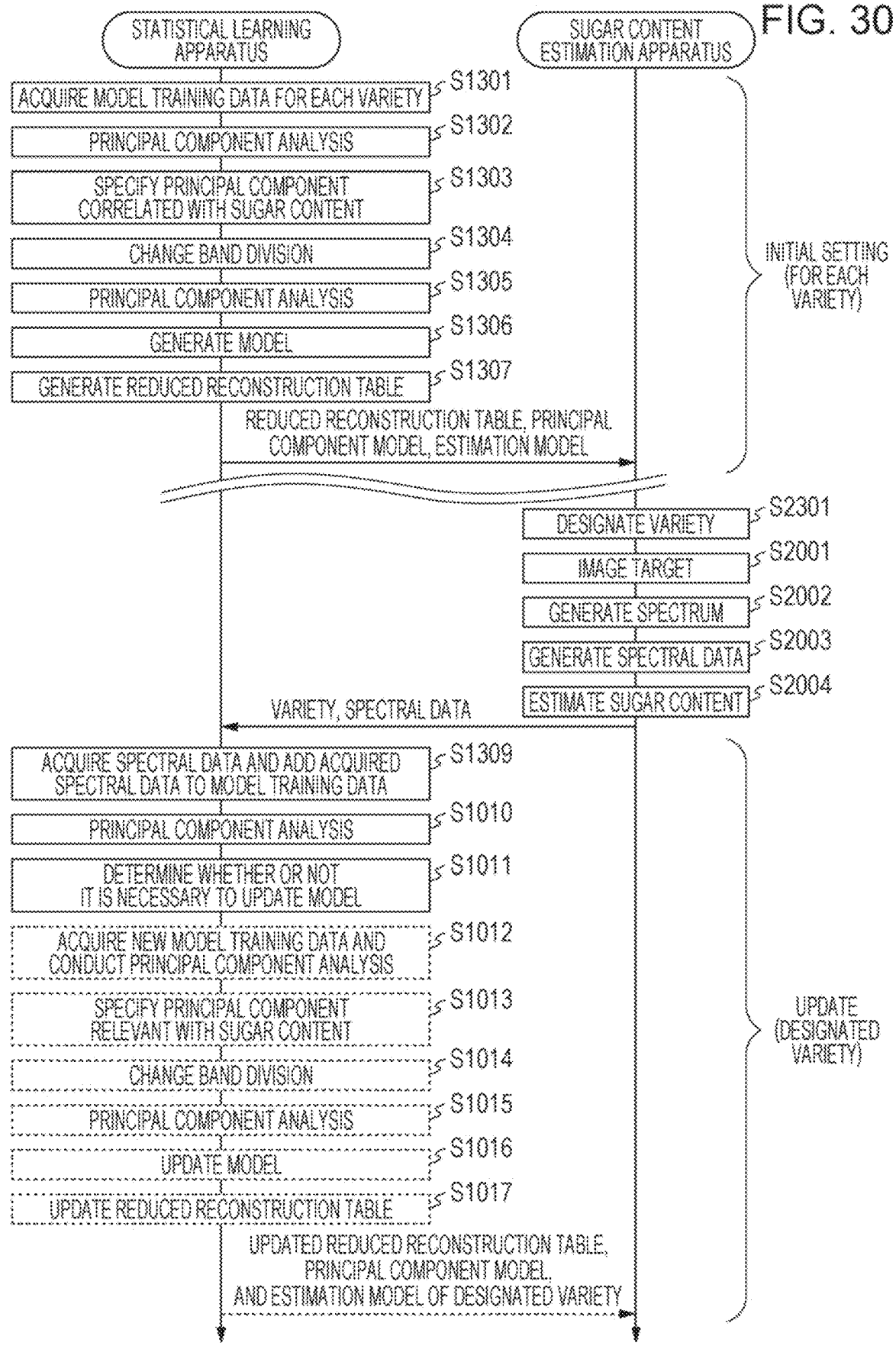
FIG. 30 illustrates an outline of communication between the statistical learning apparatus and the sugar content estimation apparatus and operations performed by the statistical learning apparatus and the sugar content estimation apparatus according to the second embodiment.

FIG. 30 illustrates an outline of communication between the statistical learning apparatus 100 and the sugar content estimation apparatus 200 and operations performed by the statistical learning apparatus 100 and the sugar content estimation apparatus 200 according to the second embodiment. In the present embodiment, initial setting is executed for each variety. That is, steps S1001 to S1007 in FIG. 14 are replaced with steps S1301 to S1307, in which similar operations are performed for each variety. The statistical learning apparatus 100 generates a principal component model, an estimation model, and a reduced reconstruction table for each variety and transmits the principal component model, the estimation model, and the reduced reconstruction table to the sugar content estimation apparatus 200. The sugar content estimation apparatus 200 records the principal component models, the estimation models, and the reduced reconstruction tables corresponding to respective varieties and completes the initial setting.

When the initial setting for each variety is completed, the sugar content estimation apparatus 200 becomes able to estimate a sugar content of a target by imaging. The sugar content estimation apparatus 200 receives user's designation of a variety by the input device 280 (step S2301). When a variety is designated, the sugar content estimation apparatus 200 executes imaging of a target (step S2001), generation of hyperspectral images (step S2002), generation of spectral data (step S2003), and estimation of a sugar content (step S2004) by a similar method to the example illustrated in FIG. 14. The generation of hyperspectral images in step S2002 is performed by using a reduced reconstruction table corresponding to the designated variety. The estimation of a sugar content in step S2003 is performed by using a principal component model and an estimation model corresponding to the designated variety. The transmitter 272 of the sugar content estimation apparatus 200 transmits data indicative of the designated variety to the statistical learning apparatus 100 in addition to the spectral data generated in step S2003.

Upon receipt of the spectral data and the variety data from the sugar content estimation apparatus 200, the statistical learning apparatus 100 adds the received spectral data to model training data of the designated variety (step S1309). Then, processing similar to the processing in steps S1010 to S1017 illustrated in FIG. 14 is performed by using the training data of the variety. In this way, it can be determined whether or not it is necessary to update the model corresponding to the designated variety, and the model and the reduced reconstruction table can be updated as needed. The updated model and reduced reconstruction table corresponding to the designated variety are transmitted to and is recorded in the sugar content estimation apparatus 200.

In the configuration of the present embodiment, a variety whose sugar content can be estimated may be registered for each sugar content estimation apparatus 200. In this case, the statistical learning apparatus 100 generates a principal component model and an estimation model corresponding to the registered variety and a reduced reconstruction table corresponding to the principal component model and corresponding to the sugar content estimation apparatus 200 and transmits the principal component model, the estimation model, and the reduced reconstruction table to the sugar content estimation apparatus 200. As for a variety that is not registered in the sugar content estimation apparatus 200, a reduced reconstruction table corresponding to the sugar content estimation apparatus 200 is not generated. According to such a configuration, as for a variety that is not registered, each sugar content estimation apparatus 200 cannot correctly estimate a sugar content since not only a principal component model and an estimation model, but also a reconstruction table are not recorded. The sugar content estimation apparatus 200 acquires a model for each registered variety and a reconstruction table corresponding to the model and can thereby estimate a sugar content of a registered variety with high accuracy.

Figure 31:
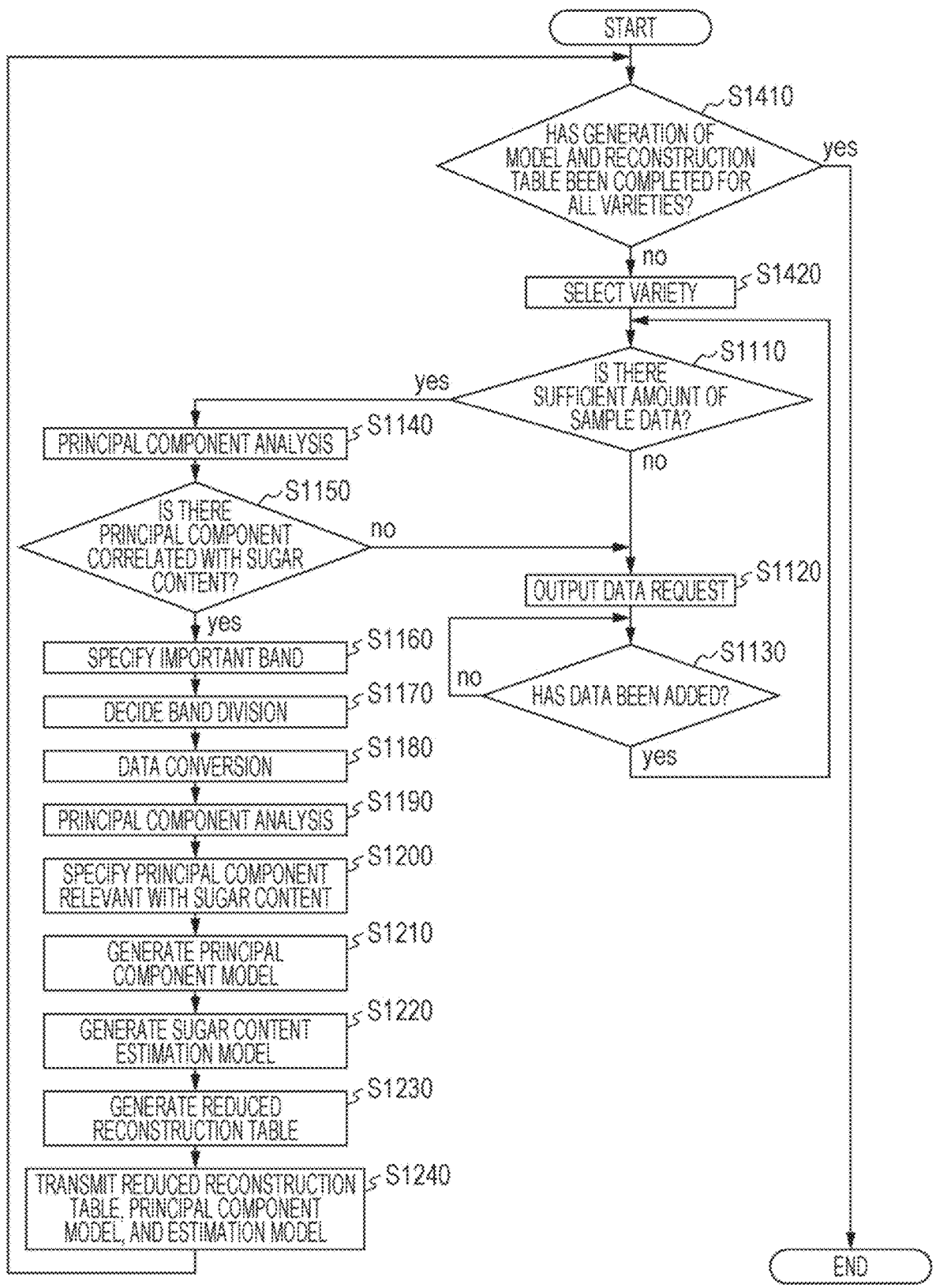
FIG. 31 is a flowchart illustrating a specific example of operations at a time of initial setting of the statistical learning apparatus according to the second embodiment.

FIG. 31 is a flowchart illustrating a specific example of the operations at a time of initial setting of the statistical learning apparatus 100 according to the second embodiment. The flowchart illustrated in FIG. 31 is different from the flowchart illustrated in FIG. 16 in that steps S1410 and S1420 are added before step S1110. In the example of FIG. 31, at the time of initial setting, the statistical learning apparatus 100 generates initial statistical model and reduced reconstruction table for each variety and transmit the initial statistical model and reduced reconstruction table to the sugar content estimation apparatus 200. In step S1410, the processing circuit 140 determines whether or not a principal component model, an estimation model, and a reduced reconstruction table have been generated for all varieties for which model training data has been created and stored in the first storage device 110. In a case where a model and a reconstruction table have been generated for all of the varieties, the operation is finished. In a case where there is a variety for which a model and a reconstruction table have not been generated, step S1420 is performed. In step S1420, the processing circuit 140 selects one variety for which a model and a reconstruction table have not been generated from among varieties for which model training data is stored in the first storage device 110. Subsequently, as for the selected variety, operations in steps S1110 to S1240 are performed as in the example illustrated in FIG. 16. In this way, a statistical model and a reduced reconstruction table whose band configuration has been optimized is generated for each selected variety, and are transmitted to the sugar content estimation apparatus 200. In step S1240, the transmitter 172 transmits, for example, data in the format illustrated in FIG. 27A or 27B to the sugar content estimation apparatus 200. The operations in steps S1410 to S1240 are performed for all of the varieties.

Figure 32:
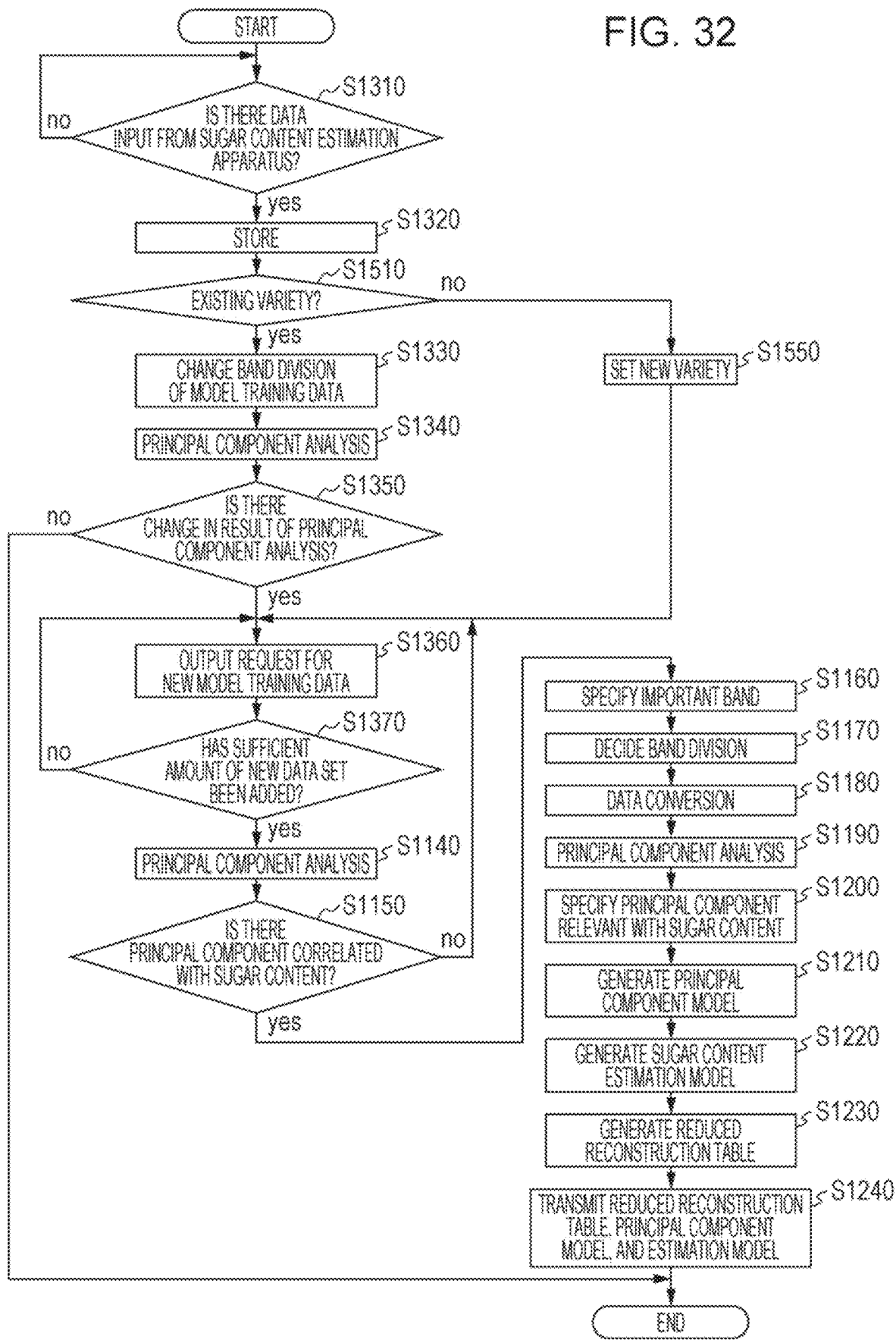
FIG. 32 is a flowchart illustrating an example of an operation of updating a model and a reconstruction table performed by the statistical learning apparatus according to the second embodiment.

FIG. 32 is a flowchart illustrating an example of operation of updating a model and a reconstruction table by the statistical learning apparatus 100 according to the second embodiment. The operation illustrated in FIG. 32 is similar to the operation illustrated in FIG. 18 except for that steps S1510 and S1550 are added after step S1320 in the operation illustrated in FIG. 18. In the present embodiment, the processing circuit 140 records spectral data received from the sugar content estimation apparatus 200 in the first storage device 110 in accordance with a variety ID. The received data includes spectral data generated by a reduced reconstruction table corresponding to the variety. The spectral data has a same band division configuration as a reduced reconstruction table and a statistical model of the variety stored in the third storage device 130.

In step S1510, the processing circuit 140 compares a variety ID recorded in the first storage device 110 and a variety ID received from the sugar content estimation apparatus 200 and determines whether or not the received data corresponds to an existing variety. In a case where the received variety ID matches the ID of the existing variety, step S1330 is performed. In a case where the received variety ID is different from the ID of the existing variety, step S1550 is performed.

In step S1550, the processing circuit 140 sets a new variety ID for a new variety detected in step S1510 and records the ID and the received spectral data in the first storage device 110 in association with each other. After step S1550, step S1360 is performed. Alternatively, the processing circuit 140 may cause an output device 190 to output a request for new variety setting and acquire information on the new variety set by an operator by an input device 180. The input device 180 may be, for example, one for text input using a keyboard or may be, for example, one for voice input using a microphone.

The operations in step S1330 and subsequent steps are similar to the operations in corresponding steps illustrated in FIG. 18. By the series of operations in steps S1310 to S1240, a statistical model, an estimation model, and a reduced reconstruction table corresponding to the statistical model can be updated speedily in response to a change of spectral data of each variety on the basis of spectral data and variety data transmitted from the sugar content estimation apparatus 200. A principal component model and an estimation model of a new variety and a reduced reconstruction table corresponding to the principal component model can be speedily generated on the basis of spectral data and new variety information transmitted from the sugar content estimation apparatus 200 and can be transmitted to the sugar content estimation apparatus 200.

Next, a specific example of the operation of the sugar content estimation apparatus 200 according to the present embodiment is described.

Figure 33:
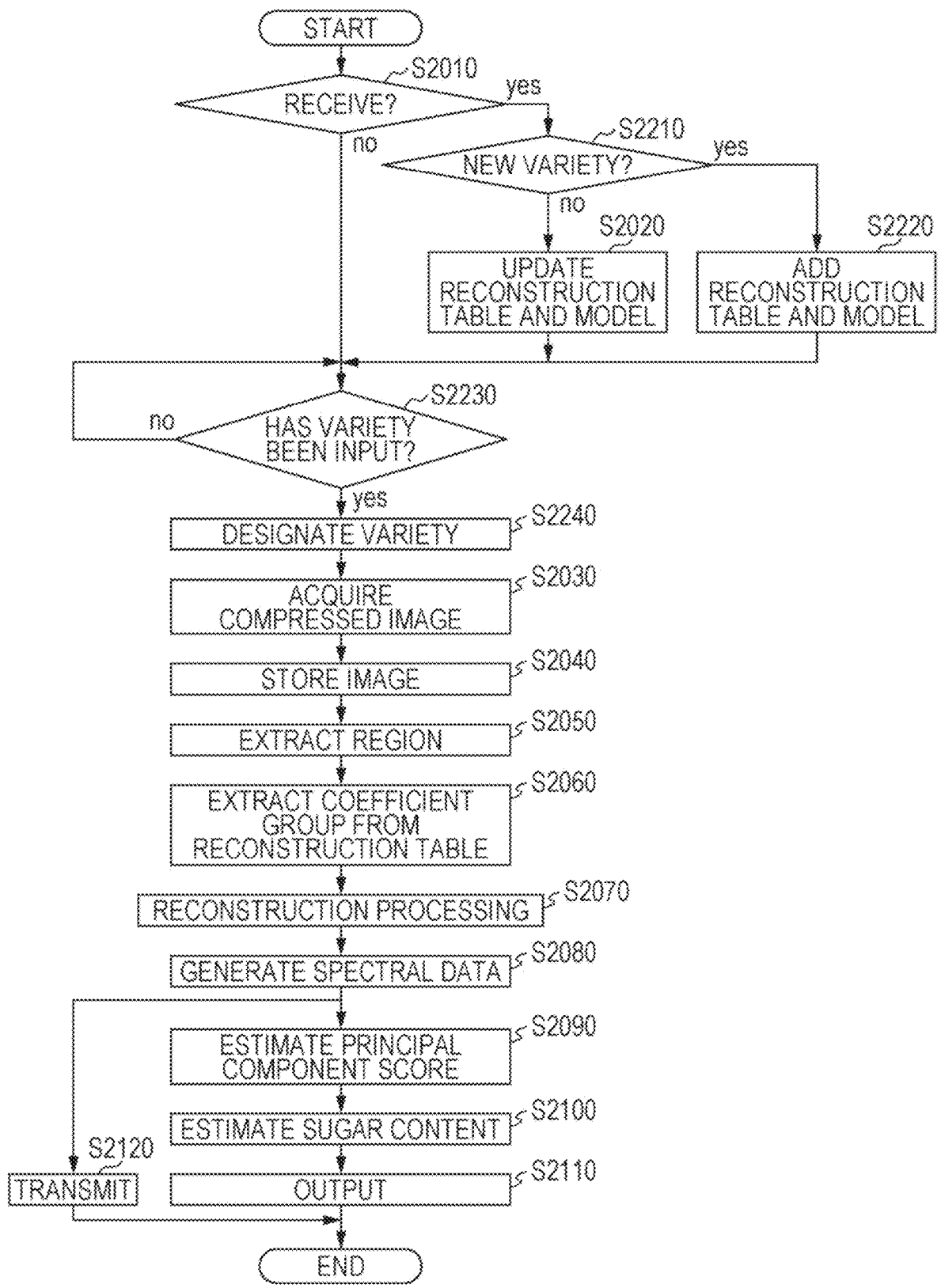
FIG. 33 is a flowchart illustrating an example of an operation of the sugar content estimation apparatus according to the second embodiment.

FIG. 33 is a flowchart illustrating an example of the operation of the sugar content estimation apparatus 200 according to the present embodiment. In the present embodiment, steps S2210, S2220, S2230, and S2240 are added to the operation illustrated in FIG. 19. When a receiver 274 receives data including information on a variety, a reduced reconstruction table, and a statistical model from the statistical learning apparatus 100 in step S2010, step S2210 is performed. In step S2210, it is determined whether or not the acquired data is data of a new variety. This determining process is performed on the basis of whether or not a variety ID included in the received data is included in data already stored in the storage device 220 or 230. In a case where the received data is data of a new variety, step S2220 is performed. In a case where the received data is data of an existing variety, step S2020 is performed.

In step S2220, the receiver 274 transmits the acquired data of the reduced reconstruction table and the variety ID to the fourth storage device 220. The fourth storage device 220 stores therein the acquired reduced reconstruction table as a table corresponding to the new variety. Furthermore, the receiver 274 transmits the acquired data of the principal component model, the estimation model, and the variety ID to the fifth storage device 240. The fifth storage device 240 stores therein the acquired principal component model and estimation model as models corresponding to the new variety. After step S2220, step S2230 is performed.

The processing in step S2020 is similar to the example of FIG. 19. In step S2020, the receiver 274 transmits the acquired data of the reduced reconstruction table and the variety ID to the fourth storage device 220 and updates a reduced reconstruction table corresponding to the variety ID already recorded in the fourth storage device 220 to the newly received reduced reconstruction table. Furthermore, the receiver 274 transmits the acquired data of the principal component model, the estimation model, and the variety ID to the fifth storage device 240 and updates a principal component model and an estimation model corresponding to the variety ID already recorded in the fifth storage device 240 to the newly received principal component model and estimation model. After step S2020, step S2030 is performed.

In step S2230, the processing circuit 250 determines whether or not an operator has input a variety by using the input device 280. In a case where a variety has been input, step S2240 is performed. In a case where no variety has not been input, step S2230 is repeated.

In step S2240, the processing circuit 250 specifies the variety input by the operator and records the variety in a memory. The variety can be, for example, designated by a name of the variety or a variety ID. Alternatively, the variety may be designated by selecting one variety from options prepared in advance. The processing circuit 250 sets a variety by an existing variety ID in a case where an existing variety is designated. In a case where a new or unknown variety is designated, a variety may be set as unknown or other.

The operations in steps S2030 to step S2120 are similar to corresponding operations in the first embodiment illustrated in FIG. 19.

2-3. Effects and Others

As described above, in the present embodiment, the statistical learning apparatus 100 conducts principal component analysis by using model training data created for each classification such as a variety, generates, for each classification, a principal component model, a sugar content estimation model, and a reduced reconstruction table on the basis of a result of the principal component analysis, and transmits the principal component model, the sugar content estimation model, and the reduced reconstruction table to the sugar content estimation apparatus 200. Therefore, the sugar content estimation apparatus 200 can accurately estimate a sugar content of a target by using the reduced reconstruction table and models generated for each classification in addition to the effects of the first embodiment.

Third Embodiment

Next, a third embodiment is described.

In the first and second embodiments, the sugar content estimation apparatus 200 performs generation of hyperspectral data of a target and estimation of a sugar content, and the statistical learning apparatus 100 generates a reduced reconstruction table necessary for generation of hyperspectral data and a statistical model necessary for estimation of a sugar content and transmits the reduced reconstruction table and the statistical model to the sugar content estimation apparatus 200. On the other hand, a system of the present embodiment includes one or more terminals that generate compressed image data of a target and a server that estimates a property value such as a sugar content of the target on the basis of compressed image data transmitted from a terminal. The server includes the functions of the statistical learning apparatus 100 and the functions of the reconstruction processing circuit 230 and the estimation processing circuit 250 of the sugar content estimation apparatus 200. The terminal does not hold a reconstruction table and a statistical model, cuts out a pixel region of a target from a compressed image acquired by a hyperspectral camera, and transmits a compressed image thus cut out to the server. The server generates hyperspectral data on the basis of the received compressed image and a reduced reconstruction table generated by the server itself. The server further estimates a sugar content on the basis of the generated hyperspectral data and a statistical model generated by the server itself. The server transmits data of the estimated sugar content to the terminal. The terminal displays the received sugar content. With this configuration, the terminal need not include a storage device for storing a reconstruction table and a statistical model, and a calculation load is lessened since reconstruction processing and estimation processing are not performed. The following describes a configuration and an operation of the present embodiment, mainly differences from the first and second embodiments.

3-1. Configuration

Figure 34:
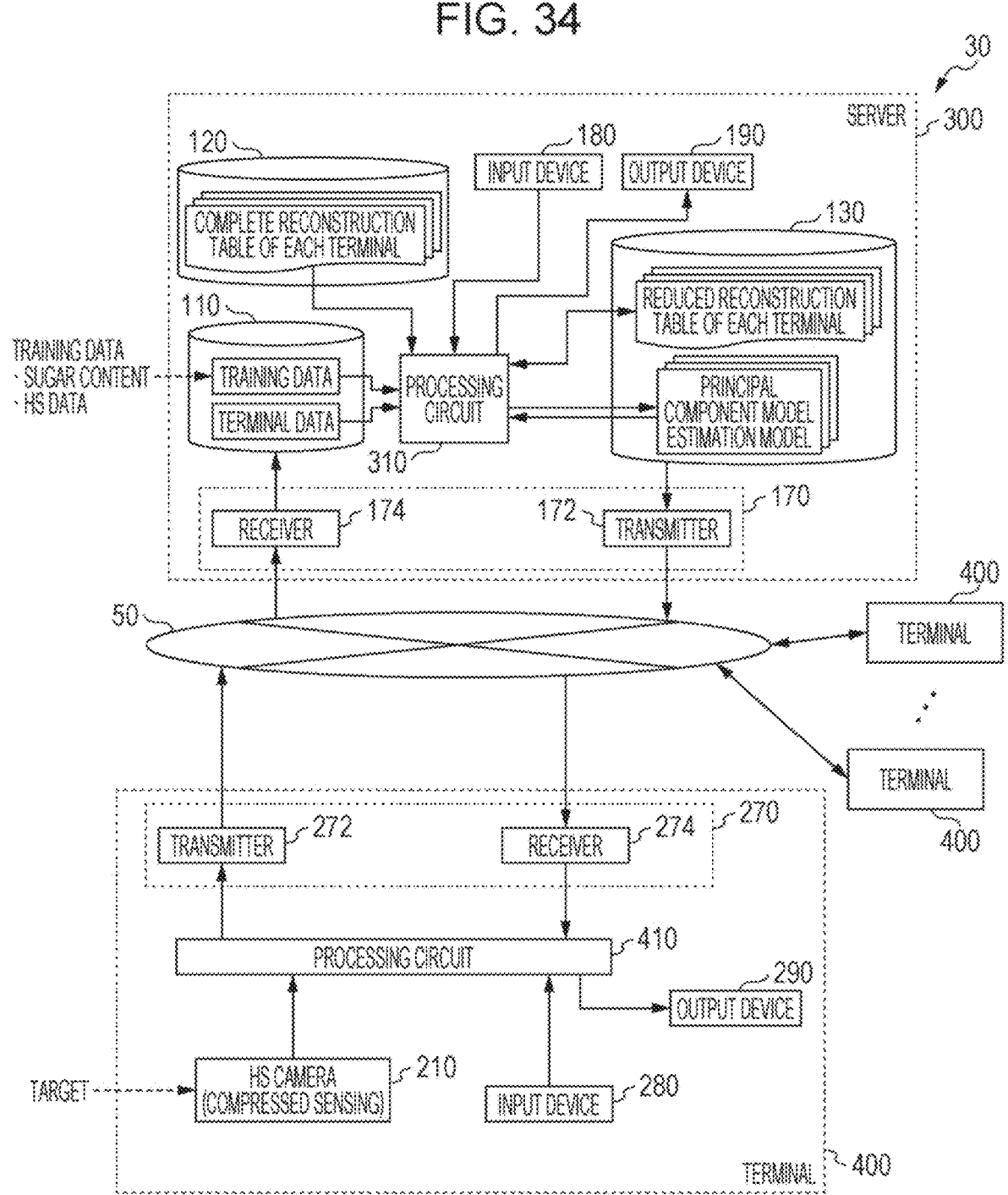
FIG. 34 is a block diagram illustrating a configuration of a sugar content estimation system according to a third embodiment.

FIG. 34 is a block diagram illustrating a configuration of a sugar content estimation system 30 according to the third embodiment. The sugar content estimation system 30 includes a server 300 and one or more terminals 400. The server 300 includes a hardware configuration similar to the statistical learning apparatus 100 according to the second embodiment. However, a processing circuit 310 of the server 300 includes the functions of the reconstruction processing circuit 230 and the estimation processing circuit 250 of the sugar content estimation apparatus 200 in addition to the function of the processing circuit 140 according to the second embodiment. The processing circuit 310 may be divided into a circuit that performs statistical learning, a circuit that performs hyperspectral information reconstruction processing, and a circuit that performs sugar content estimation processing. The terminal 400 includes a hyperspectral camera 210, a communication circuit 270, an input device 280, and an output device 290 as in the sugar content estimation apparatus 200 according to the second embodiment. The terminal 400 does not include constituent elements corresponding to the storage devices 220 and 240, the reconstruction processing circuit 230, and the estimation processing circuit 250 of the sugar content estimation apparatus 200 and includes a processing circuit 410 instead. The processing circuit 410 performs image processing for extracting one or more regions indicative of a target from compressed image data generated by the hyperspectral camera 210.

The processing circuit 410 extracts a region including a target from a compressed image acquired by the hyperspectral camera 210 and cuts out a region, that is, a pixel group suitable for generation of spectral data of the target from the extracted region. The processing circuit 410 synthesizes or generates an image for display by performing processing such as superimposing a value of a sugar content for each region received by a receiver 274 onto the compressed image.

The transmitter 272 transmits variety information input by an operator by using the input device 280, one or more compressed images cut out by the processing circuit 410, and information indicative of the region to the server 300. Data transmitted by the transmitter 272 includes a terminal ID for specifying the terminal 400, a variety ID for specifying a variety of the target, an image ID for specifying an image taken by the hyperspectral camera 210, a region ID for specifying a region for extraction of spectral data of the target, information indicative of a range of the region, and information on a compressed image corresponding to the region.

Figure 35:
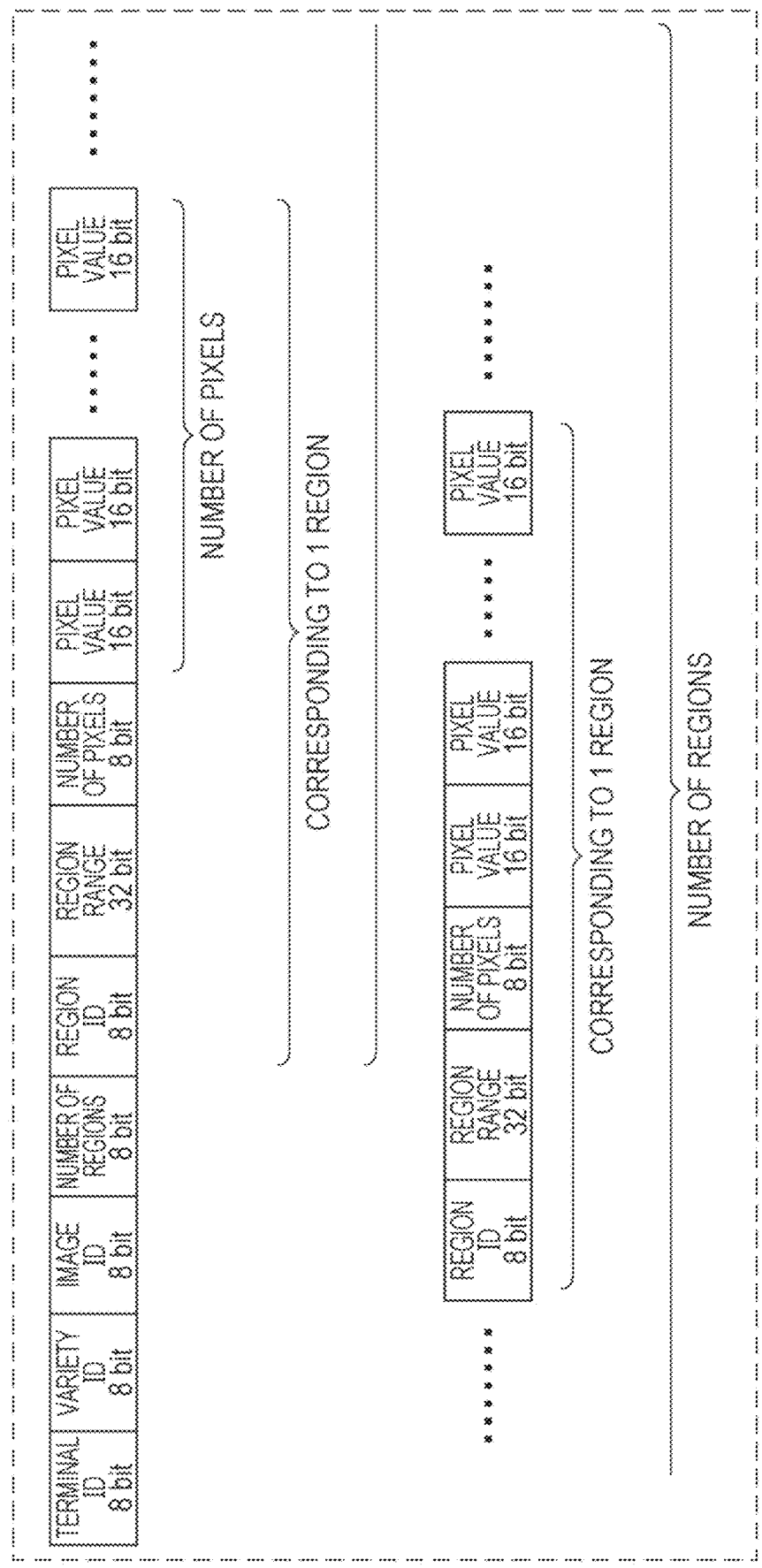
FIG. 35 illustrates an example of data transmitted by a sugar content estimation apparatus.

FIG. 35 illustrates an example of the data transmitted by the transmitter 272. In the example of FIG. 35, the transmitter 272 transmits information indicative of the number of regions included in an image subsequent to a terminal ID, a variety ID, and an image ID. Subsequently, a region ID and a range of a region are transmitted for each region. For example, in a case where a rectangular region is cut out, a range of the region can be designated by four 8-bit values (32 bits in total) of upper left coordinates, upper right coordinates, lower left coordinates, and lower right coordinates. Subsequently, the number of pixels within the region is transmitted, and as many pixel values as the number of pixels are transmitted. As many pieces of data grouped for each region from the region ID to the pixel values as the number of regions transmitted earlier are successively transmitted.

FIGS. 36A and 36B illustrate an example of data transmitted from the transmitter 172 to the receiver 274. In the example of FIG. 36A, a terminal ID, an image ID, a region ID, and information on a sugar content are included in the transmitted data. The region ID and the sugar content correspond to each other on a one-to-one basis and are sequentially transmitted. In the example of FIG. 36B, subsequently to the terminal ID and the image ID, the number of cut-out regions included in an image indicated by the image ID is transmitted. Subsequently, as many sugar contents as the number of regions are transmitted. In a case where there is regularity in arrangement in the image, a region can be specified on the basis of an order of data without a region ID. In a case where data of images is transmitted, information on the number of cut-out regions is transmitted for each image. A rule of an order of arrangement of regions is, for example, an order starting from a reference pixel position that is an upper left pixel of a region and going from upper left to lower right.

3-2. Operation

The server 300 generates a principal component model and an estimation model for each variety and generates, for each terminal 400, a reduced reconstruction table corresponding to the principal component model generated for each variety. Furthermore, the server 300 acquires variety information and data of a compressed image from which a region has been extracted from the terminal 400, generates hyperspectral images, generates hyperspectral data for each region, and estimates a sugar content. The server 300 transmits data indicative of a sugar content estimated for each region to the terminal 400. Furthermore, the server 300 updates, for each variety, a principal component model and an estimation model for estimation on the basis of new model training data as needed. The server 300 also updates a reduced reconstruction table corresponding to each terminal 400 in accordance with the update of the principal component model. In this way, the server 300 always estimates a sugar content on the basis of latest model and reconstruction table.

Figure 37:
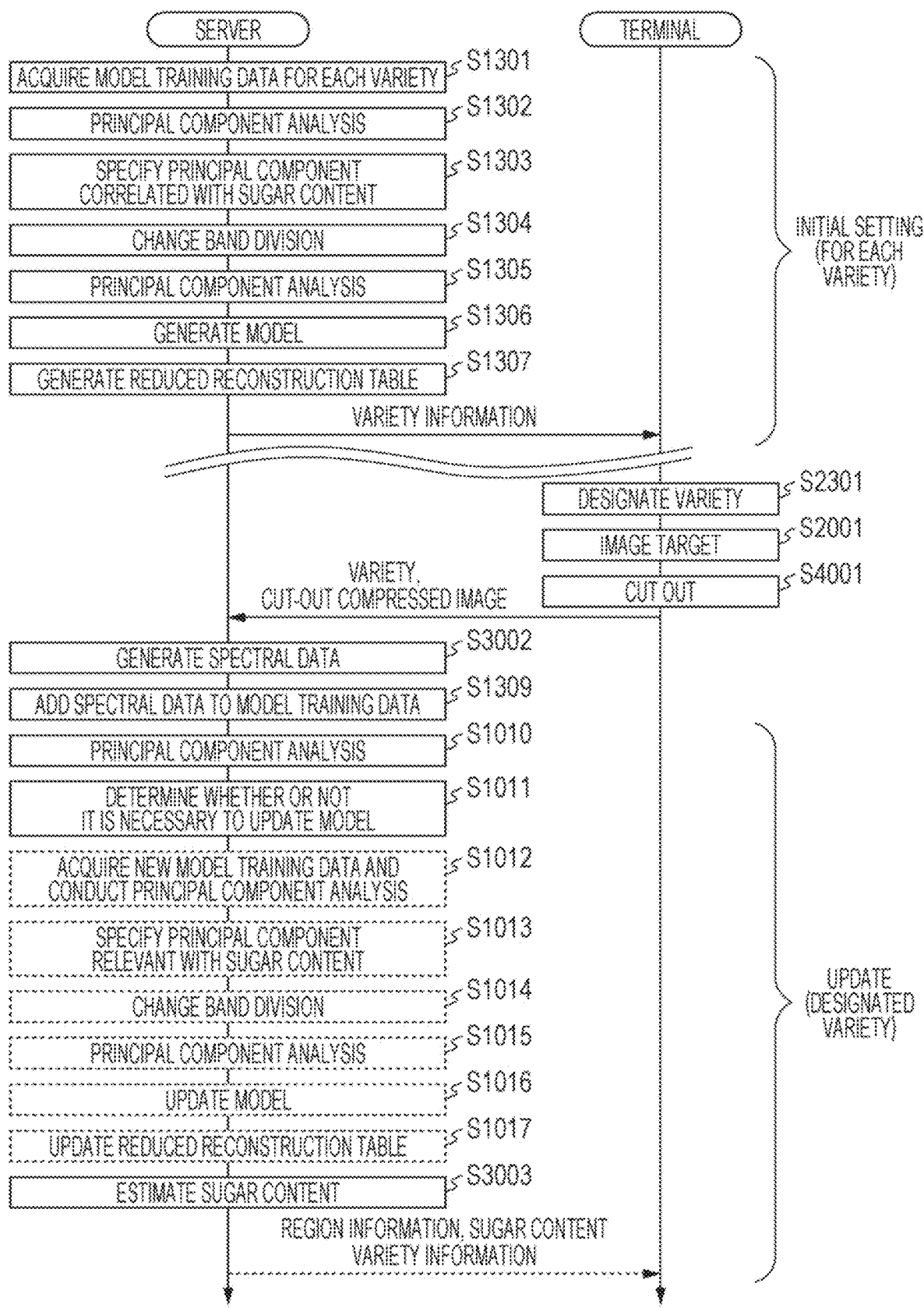
FIG. 37 illustrates an outline of communication between a server and a terminal and operations performed by the server and the terminal according to the third embodiment.

FIG. 37 illustrates an outline of communication between the server 300 and the terminal 400 and operations performed by the server 300 and the terminal 400 according to the third embodiment. In the example illustrated in FIG. 37, operations in steps S1301 to S1307 are identical to the operations in corresponding steps illustrated in FIG. 30. When the server 300 generates a model and a reduced reconstruction table, the server 300 transmits information on a variety corresponding to the model and the reduced reconstruction table to the terminal 400. Upon receipt of the variety information, the terminal 400 records the variety information in a storage device. This operation is referred to as initial setting.

The terminal 400 that has completed the initial setting can acquire sugar content data of a target by imaging. The terminal 400 receives user's designation of a variety by using the input device 280 (step S2301). When a variety is designated, the hyperspectral camera 210 of the terminal 400 images a target and acquires a compressed image (step S2001). The processing circuit 410 extracts the target from the compressed image acquired in step S2001 and cuts out a region for generating spectral data (step S4001). The terminal 400 transmits data indicative of the compressed image thus cut out and the variety to the server 300 (step S4002).

The server 300 receives the compressed image thus cut out from the terminal 400. The processing circuit 310 generates hyperspectral images on the basis of the received compressed image and a reduced reconstruction table corresponding to the designated variety and the terminal 400. The processing circuit 310 generates hyperspectral data from the obtained hyperspectral images (step S3002). Operations in subsequent steps S1309 to S1017 are identical to the operations in corresponding steps illustrated in FIG. 30. The processing circuit 310 updates the model and the reduced reconstruction table as needed and estimates a sugar content from the spectral data generated in S3002 on the basis of the latest model (step S3003). The transmitter 172 transmits data of an estimated sugar content for each region to the terminal 400. In a case where variety information is updated, the transmitter 172 also transmits latest variety information to the terminal 400.

In the present embodiment, the terminal 400 can always acquire an accurate sugar content estimated on the basis of a latest model. The server 300 can reduce a calculation load by limiting a region to be generated and more easily cope with concentration of data from the terminal 400. It is also possible to keep a load on a communication path small by limiting a transmitted region of a compressed image.

Next, a specific example of the operation of the server 300 according to the present embodiment is described.

Operations at a time of initial setting of the server 300 according to the present embodiment are basically identical to the operations illustrated in FIG. 31. However, the transmitter 172 transmits information on a variety corresponding to generated model and reduced reconstruction table to the terminal 400 after step S1230 instead of the operation in step S1240.

Figure 38:
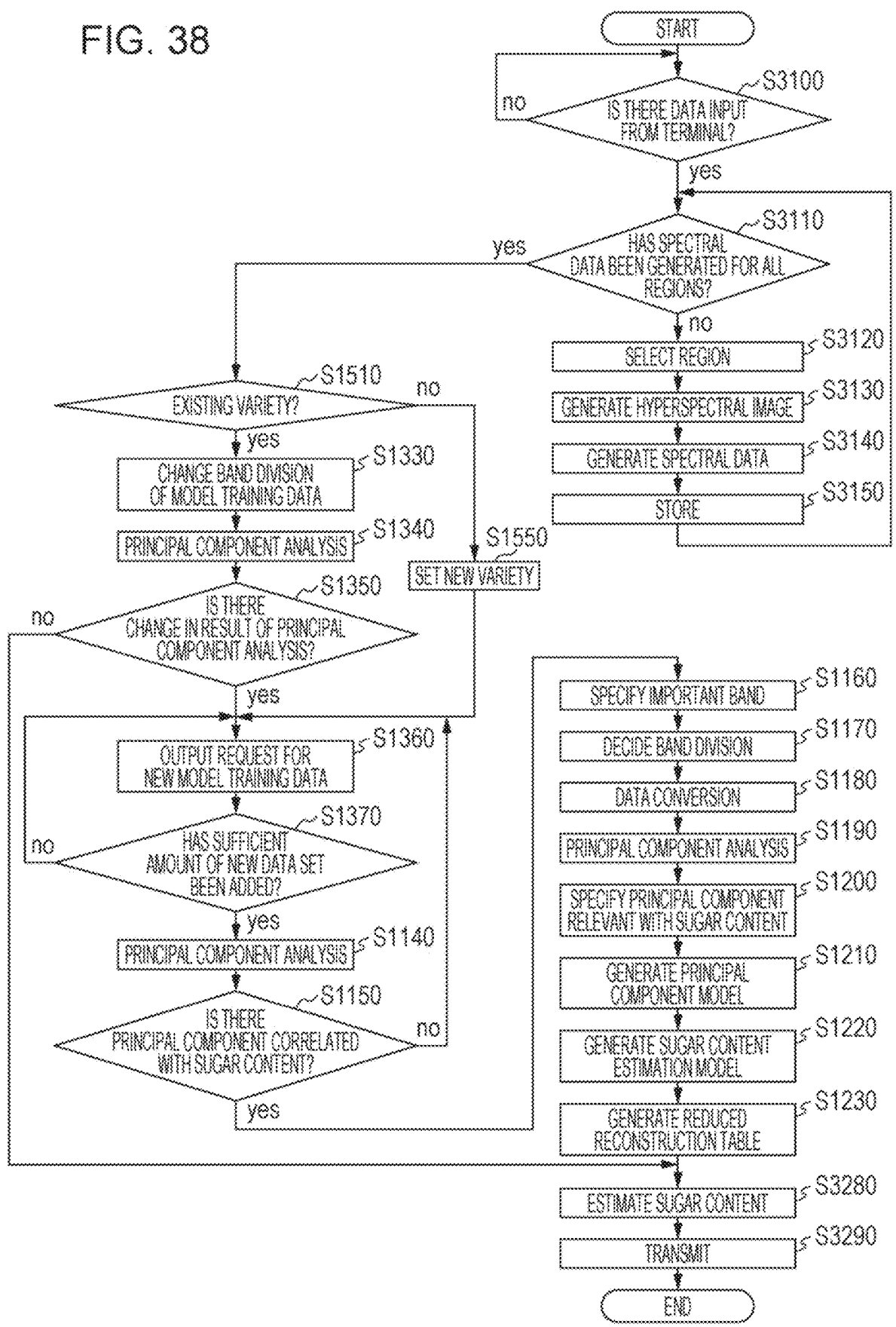
FIG. 38 is a flowchart illustrating an example of operations of the server in a state where a sugar content can be estimated.

FIG. 38 is a flowchart illustrating an example of the operation of the server 300 in a state in which the terminal 400 acquires variety information, a reduced reconstruction table, a principal component model, and an estimation model are stored in a storage device of the server 300, and a sugar content can be estimated. Operations in steps S1510 to S1230 illustrated in FIG. 38 are identical to the corresponding operations illustrated in FIG. 32. The following describes differences from the operations illustrated in FIG. 32.

Step S3100

The processing circuit 310 determines whether or not data of a cut-out compressed image has been received from the terminal 400. In a case where the data has been received, step S3110 is performed. In a case where the data has not been received, step S3100 is performed again after elapse of a certain period.

Step S3110

The processing circuit 310 acquires data of one or more regions cut out from a compressed image transmitted from the terminal 400. The processing circuit 310 determines whether or not spectral data has been generated for all of the cut-out regions of the compressed image thus acquired. In a case where generation of spectral data has not been finished for all of the regions, step S1510 is performed. In a case where there is a region for which spectral data has not been generated yet, step S3120 is performed.

Step S3120

The processing circuit 310 selects one of regions for which spectral data generation processing has not been performed yet.

Step S3130

The processing circuit 310 selects a reduced reconstruction table stored in the third storage device 130 on the basis of information for specifying the terminal 400 and information indicative of a designated variety that are included in the transmitted data. Then, the processing circuit 310 extracts a necessary part from the selected reduced reconstruction table on the basis of information indicative of a range of the cut-out region included in the transmitted data and thus generates the cut-out region of the compressed image. A method of reconstruction is similar to the first and second embodiments.

Step S3140

The processing circuit 310 generates spectral data of the cut-out region by averaging spectral data of all pixels of hyperspectral images generated in step S3130. Note that spectral data of the region may be decided by another processing method such as calculating a median instead of calculating an average of spectral data of all pixels.

Step S3150

The processing circuit 310 records the spectral data generated in step S3140 in the first storage device 110 in association with the variety information.

After the end of the operation in step S3150, step S3110 is performed again. The operations in steps S3100 to S3150 are repeated until spectral data is generated for all of the cut-out regions.

When spectral data is generated for all of the cut-out regions, the processing circuit 310 performs operations in steps S1510 to S1230. These operations are identical to the operations illustrated in FIG. 32.

Step S3280

The processing circuit 140 estimates a sugar content for each region from the spectral data generated in step S3140 in accordance with a principal component model and an estimation model corresponding to the designated variety.

Step S3290

The transmitter 172 transmits the sugar content estimated in step S3280 to the terminal 400 together with a region ID. Note that in a case where a new variety is set in step S1550, variety information indicative of the new variety may be included in the transmitted data.

By operations in steps S3100 to S3290, the server 300 can estimate a sugar content of a target from a cut-out compressed image transmitted from the terminal 400 and transmit the estimated sugar content to the terminal 400. Furthermore, a statistical model and an estimation model decided for each variety and a reduced reconstruction table corresponding to the statistical model can be updated on the basis of variety information received from the terminal 400 and the cut-out compressed image.

Next, a specific example of the operation of the terminal 400 according to the present embodiment is described.

Figure 39:
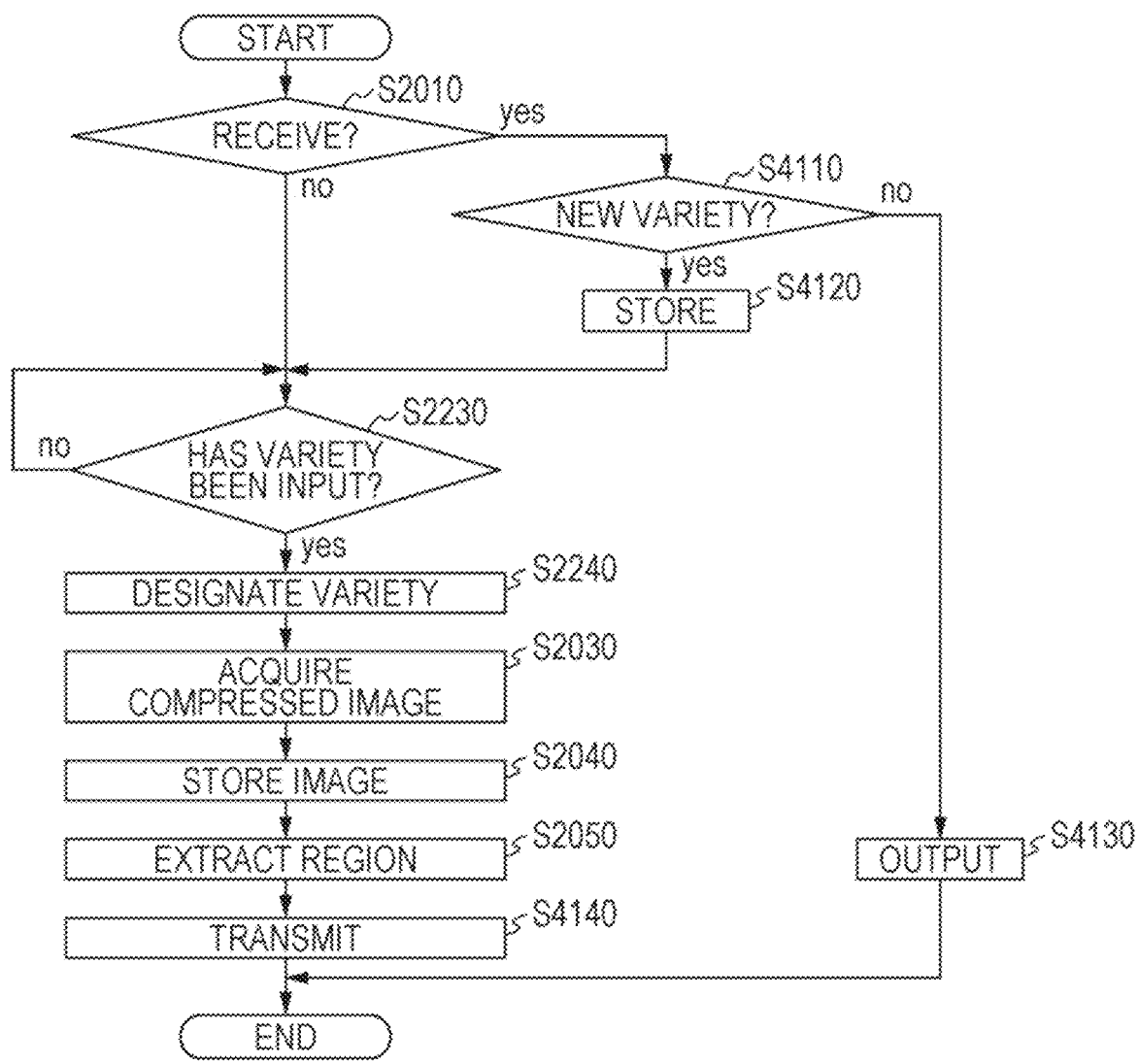
FIG. 39 is a flowchart illustrating an example of operations of the terminal according to the third embodiment.

FIG. 39 is a flowchart illustrating an example of the operation of the terminal 400 according to the third embodiment. The following describes an operation in each step.

Step S2010

The processing circuit 410 determines whether or not data transmitted from the server 300 has been received. In a case where the data has been received, step S4110 is performed. In a case where the data has not been received, step S2230 is performed.

Operations in steps S2230 to step S2050 are identical to the operations in corresponding steps illustrated in FIG. 33.

Step S4140

The transmitter 272 transmits data indicative of a terminal ID for specifying the terminal 400, variety information input in step S2230, a region cut out in step S2050, and a cut-out compressed image. For example, data in the format illustrated in FIG. 36A or 36B is transmitted.

Step S4110

In a case where the data is received from the server 300 in step S2010, the processing circuit 410 determines whether or not the received data is data concerning a new variety. In a case where the received data is data concerning a new variety, step S4120 is performed. In a case where the received data is not data concerning a new variety, step S4130 is performed.

Step S4120

The processing circuit 410 records the variety information acquired in step S2010 in the storage device. After step S4120, step S2230 is performed.

Step S4130

The output device 190 outputs sugar content information received in step S2010. The output can be, for example, an image obtained by superimposing a text indicative of a sugar content at a predetermined position on the compressed image acquired in step S2030. The output information is not limited to an image and may be, for example, information such as a text or voice.

3-3. Effects and Others

According to the present embodiment, the terminal 400 transmits data of a region indicative of a target extracted from a compressed image acquired by imaging the target by the hyperspectral camera 210 to the server. The server 300 generates hyperspectral images for each region in accordance with a reduced reconstruction model set for each variety, estimates a sugar content for each region on the basis of a principal component model and an estimation model, and transmits a result of the estimation to the terminal 400. Since the terminal 400 cuts out only a region indicative of a target from a compressed image and image data transmitted to the server is reduced, reconstruction processing calculation can be simplified, and a sugar content can be estimated while keeping a calculation amount small.

Furthermore, a reconstruction table for generating spectrum information is not recorded in the terminal 400, and a reconstruction table is recorded only in the server 300. With this configuration, an apparatus other than the server 300 cannot estimate a sugar content from an image acquired by a hyperspectral camera. Accordingly, only the registered terminal 400 can acquire a result of estimation of a sugar content. Since a reconstruction table is not recorded in the terminal 400, it is difficult to falsify spectrum information by altering an image for the purpose of dishonestly changing a sugar content. It is therefore possible to realize a system that makes it difficult to falsify a sugar content.

Fourth Embodiment

Next, a fourth embodiment is described.

In the third embodiment, the terminal 400 extracts a region of a target from a compressed image acquired by the hyperspectral camera 210 and transmits a compressed image of the extracted region to the server 300. The server 300 generates hyperspectral data from the received compressed image of the region and estimates a sugar content from the generated spectral data. On the other hand, in the present embodiment, a terminal 400 transmits a compressed image acquired by a hyperspectral camera 210 to a server 300 without processing the compressed image. The server 300 generates hyperspectral images from the received compressed image and extracts a region of a target from the generated hyperspectral images. Then, the server 300 generates spectral data for each extracted region and estimates a sugar content of the target in accordance with a model. The server 300 transmits data of the estimated sugar content to the terminal 400 together with position information indicative of a position on the image. This allows the terminal 400 to acquire an estimated sugar content of the target without performing high-load processing. The following mainly describes differences from the third embodiment.

A configuration of a sugar content estimation system 40 according to the present embodiment is identical to the configuration of the third embodiment illustrated in FIG. 34. However, the configuration of the present embodiment is different from the configuration of the third embodiment in that compressed image data generated by the hyperspectral camera 210 is transmitted to the server 300 without being processed by a processing circuit 410 and a processing circuit 310 of the server 300 extracts a region of a target. Accordingly, data transmitted and received to and from communication circuits 170 and 270 is also different from the third embodiment.

A transmitter 272 transmits variety information, a compressed image, and a terminal ID. A receiver 274 receives information indicative of a position of each extracted region on an image and information on a sugar content. In a case where a new variety is set in the server 300, the receiver 274 also receives variety information. The position of each region on an image can be, for example, expressed as a position of a pixel expressed by a coordinate system whose origin is located at an upper left position, whose horizontal direction is x, and whose vertical direction is y.

Figure 40:
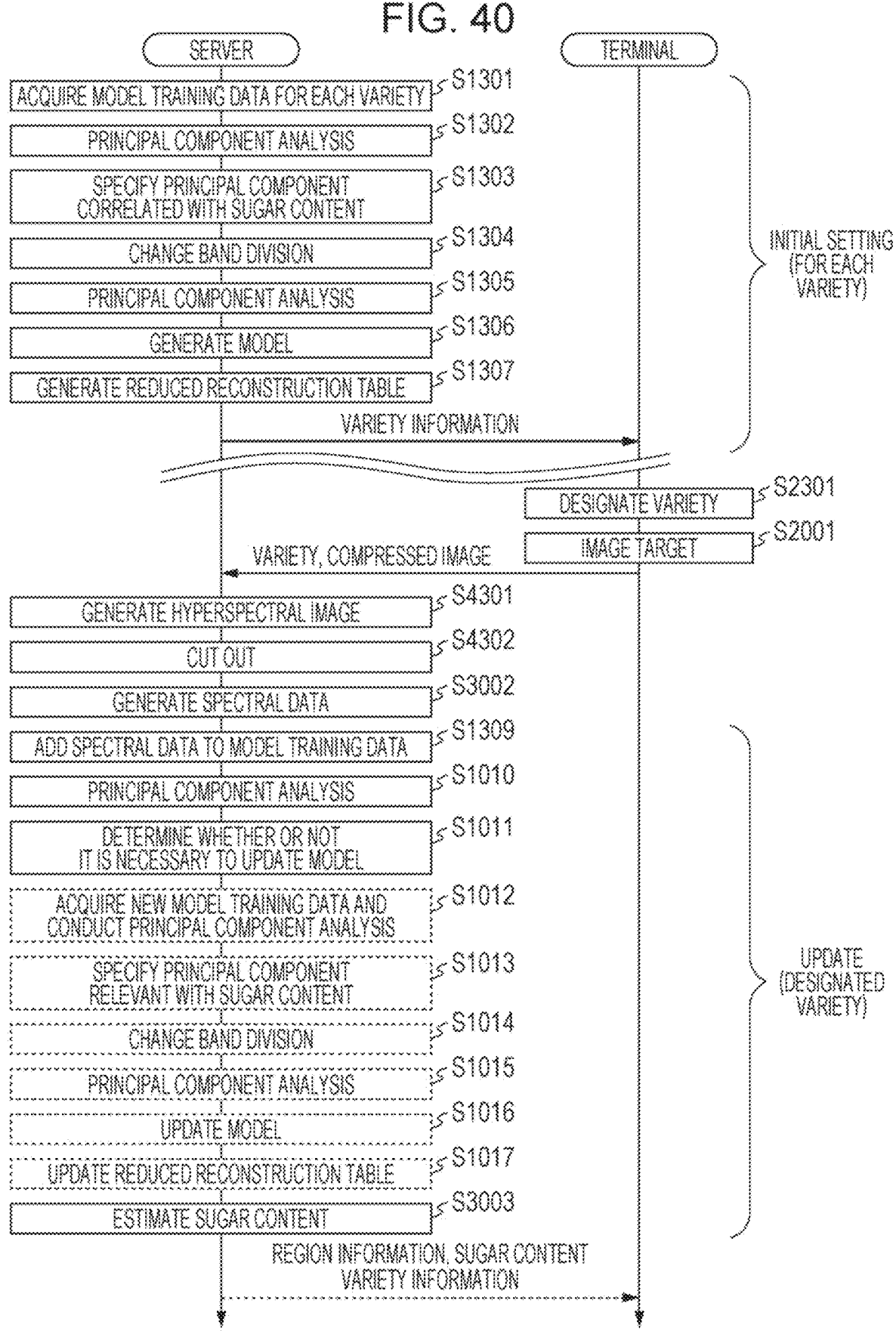
FIG. 40 illustrates an outline of communication between a server and a terminal and operations performed by the server and the terminal according to a fourth embodiment.

FIG. 40 illustrates an outline of communication between the server 300 and the terminal 400 and operations performed by the server 300 and the terminal 400 according to the fourth embodiment. In the operation illustrated in FIG. 40, step S4001 performed by the terminal 400 in FIG. 37 is omitted, and instead steps S4301 and S4302 performed by the server 300 are added before step S3002. Except for these points, the operation illustrated in FIG. 40 is similar to the operation illustrated in FIG. 37. The terminal 400 transmits a compressed image acquired by imaging and data indicative of a designated variety to the server 300. In step S4301, the processing circuit 310 of the server 300 generates hyperspectral images from a compressed image corresponding to all pixels received from the terminal 400 by using the designated variety and a reduced reconstruction table corresponding to the terminal 400. In subsequent step S4302, the processing circuit 310 extracts a region corresponding to a target from the obtained hyperspectral images. The region corresponding to the target can be, for example, extracted by a method of extracting an edge from an image of highest contrast among the generated images of respective bands and performing matching between the obtained edge and a shape of the target. For example, 25 pixels of five rows and five columns can be cut out from the extracted region of the target while excluding a pixel having an upper limit pixel value in any band. In step S3002, the processing circuit 310 generates spectral data by deciding a representative value from data of the pixel region cut out in step S4302. Processing in step S3002 and subsequent steps are identical to the processing in corresponding steps illustrated in FIG. 37.

According to the present embodiment, the terminal 400 transmits a compressed image acquired by imaging to the server 300 without performing processing. Therefore, the terminal 400 can always acquire an accurate sugar content estimated by a latest model without performing high-load calculation.

Note that although a reduced reconstruction table is generated for each terminal 400 in accordance with a statistical model for each variety and is used for estimation of a sugar content in the present embodiment, converting band widths depending on a variety is not necessarily needed. That is, reconstruction may be performed by using detailed spectral data for all bands. In this case, generation and recording of a reduced reconstruction table can be omitted. An operation of re-creating a principal component model and an estimation model by using spectral data whose bands have been converted can also be omitted.

Fifth Embodiment

Next, a fifth embodiment is described.

Figure 41:
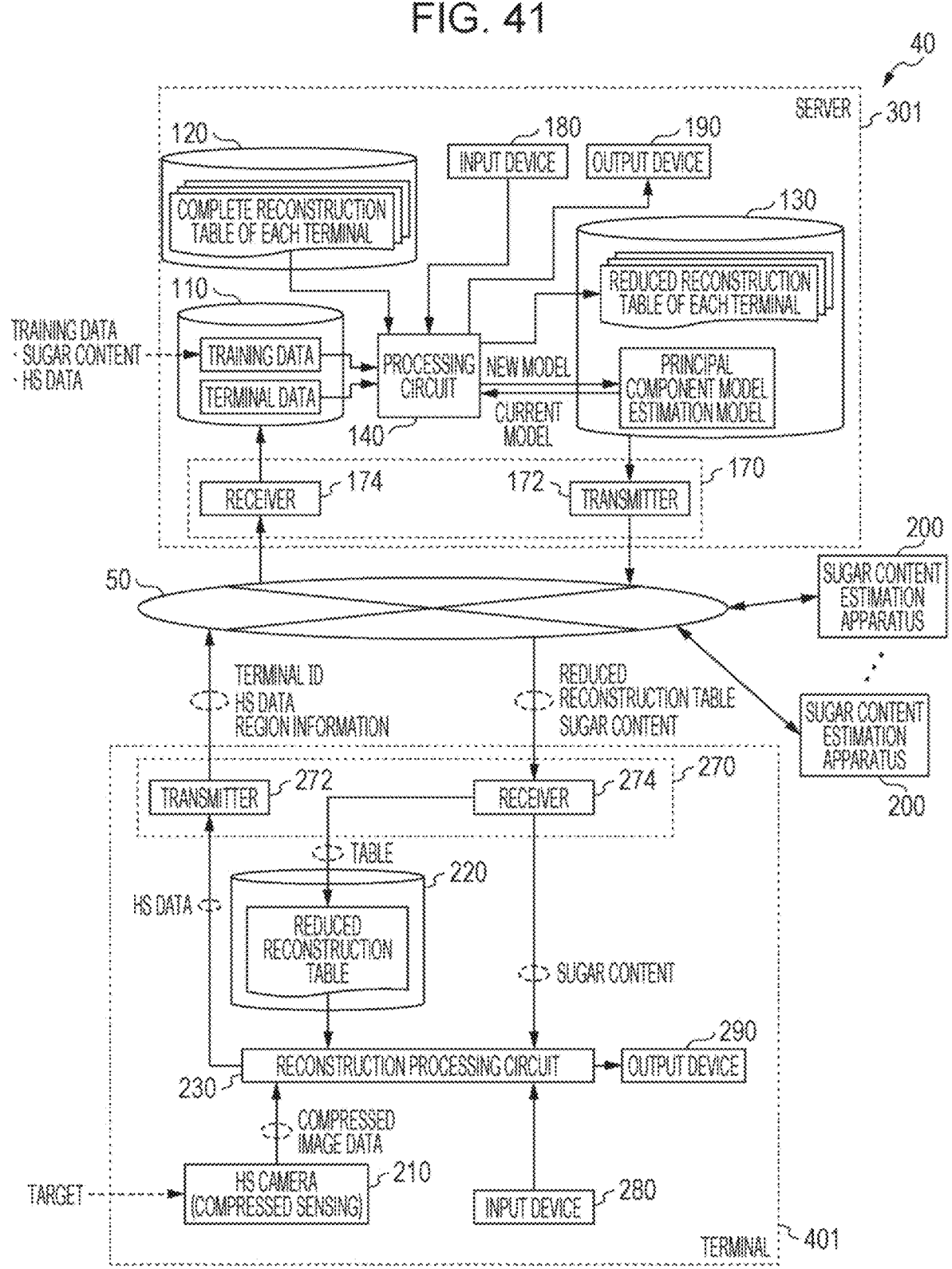
FIG. 41 is a block diagram illustrating a configuration of a sugar content estimation system according to a fifth embodiment.

FIG. 41 is a block diagram illustrating a configuration of a sugar content estimation system 40 according to the fifth embodiment. The configuration of the sugar content estimation system 40 according to the present embodiment is similar to the configuration of each embodiment described above. However, the present embodiment is different from the above embodiments in that a terminal 401 performs processing of generating hyperspectral images from a compressed image and generating hyperspectral data and a server 301 performs processing of estimating a sugar content from the hyperspectral data on the basis of a statistical model.

The server 301 according to the present embodiment transmits a reduced reconstruction table to the terminal 401 but does not transmit a statistical model to the terminal 401. The terminal 401 transmits hyperspectral data generated by using the reduced reconstruction table received from the server 301 to the server 301. The server 301 estimates a sugar content by applying a statistical model to the hyperspectral data received from the terminal 401 and transmits a result of the estimation to the terminal 401. In this way, the terminal 401 can acquire and display a result of estimation of a sugar content of a target without performing estimation processing by itself.

Figure 42:
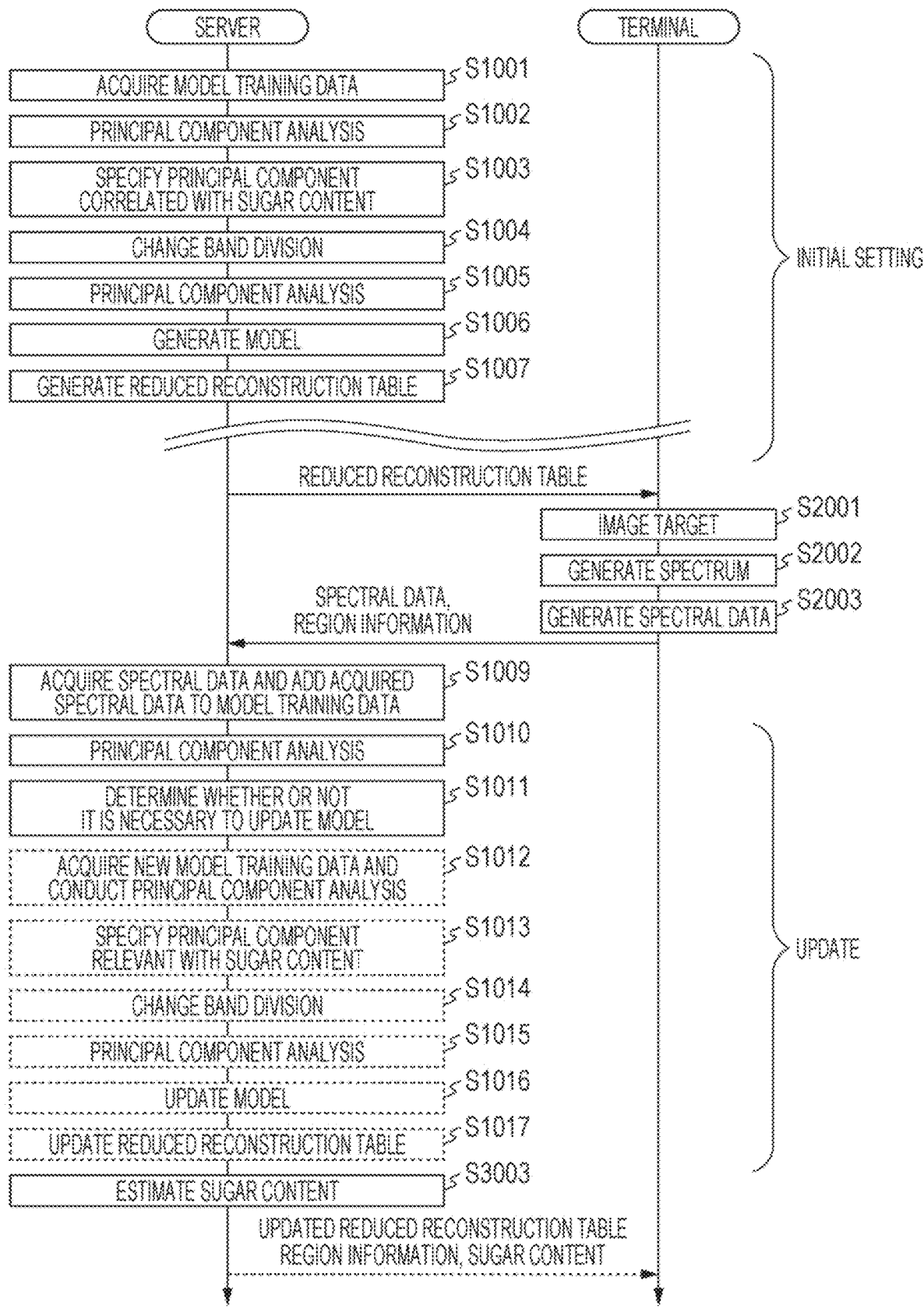
FIG. 42 illustrates an outline of communication between a server and a terminal and operations performed by the server and the terminal according to the fifth embodiment.

FIG. 42 illustrates an outline of communication between the server 301 and the terminal 401 and operations performed by the server 301 and the terminal 401 according to the present embodiment. Operations of initial setting in steps S1001 to S1007 performed by the server 301 are similar to corresponding operations in the first embodiment. However, in the present embodiment, after step S1007, a transmitter 172 of the server 301 transmits only a reduced reconstruction table to the terminal 401. The terminal 401 stores the received reduced reconstruction table in a storage device 220. A reconstruction processing circuit 230 of the terminal 401 generates hyperspectral images from a compressed image generated by a hyperspectral camera 210 by using the reduced reconstruction table transmitted from the server 301 and generates hyperspectral data of a region of a target in the hyperspectral images. This operation is similar to the operations in steps S2001 to S2003 in the first embodiment. The terminal 401 according to the present embodiment transmits a terminal ID, region information, and spectral data to the server 301 without performing the operation of estimating a sugar content in step S2004 in the first embodiment.

The server 301 that has received the spectral data performs updating operations in steps S1009 to S1017 as in the first embodiment. The server 301 according to the present embodiment estimates a sugar content for each region by applying a statistical model to the received spectral data. This operation is similar to step S3003 in the server 300 of the fourth embodiment. The server 301 transmits the sugar content for each region and the updated reduced reconstruction table to the terminal 401.

The server 301 according to the present embodiment performs operations similar to the operations illustrated in FIGS. 16 and 18. However, in step S1240 illustrated in FIGS. 16 and 18, only a reduced reconstruction table is transmitted to the terminal 401. After step S1320 illustrated in FIG. 18, a sugar content is estimated, and data indicative of a result of the estimation is transmitted to the terminal 401. Except for these points, operations of the server 301 are similar to the operations of the statistical learning apparatus 100 in the first embodiment.

Figure 43:
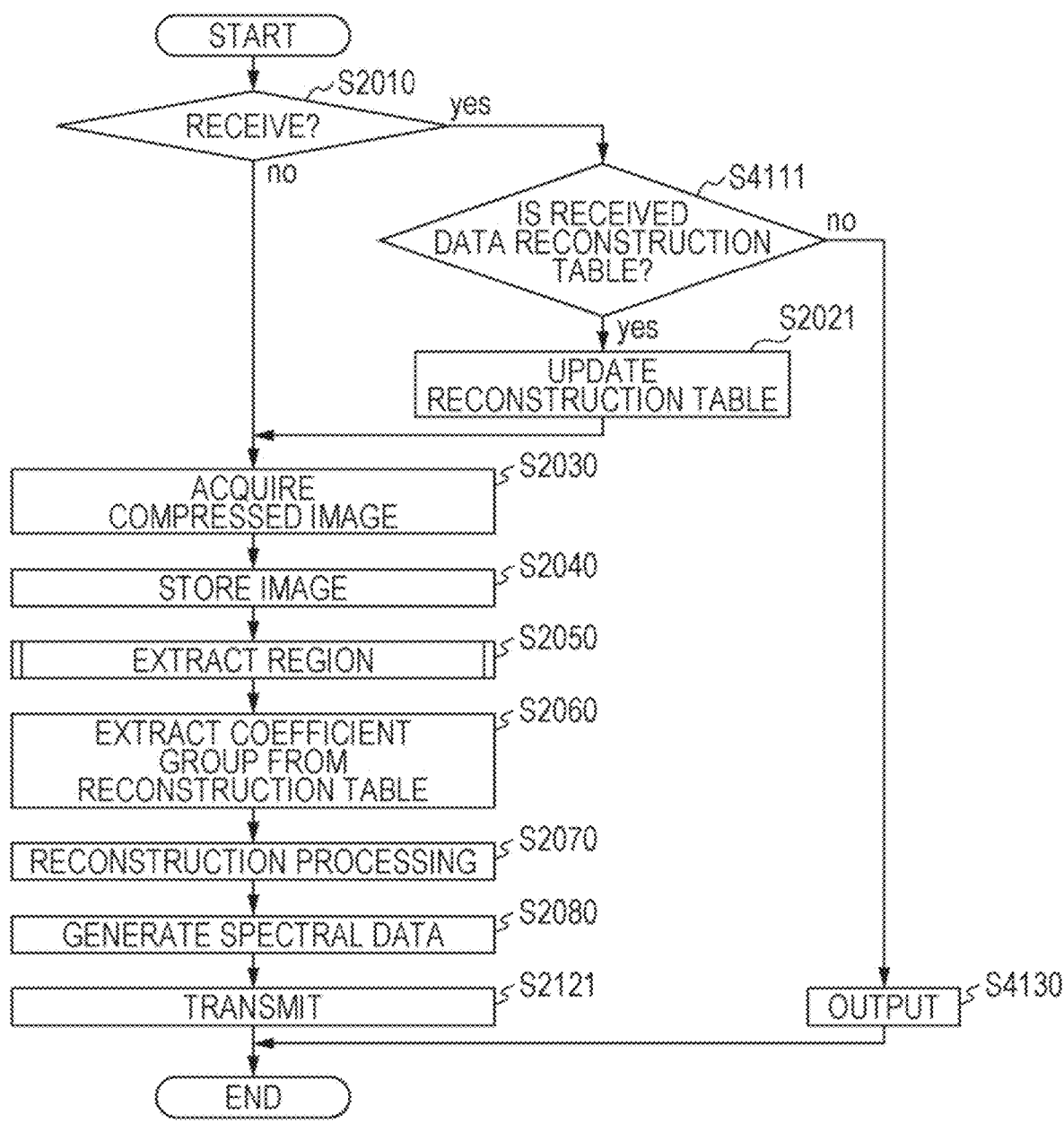
FIG. 43 is a flowchart illustrating an example of operations of the terminal according to the fifth embodiment.

On the other hand, the terminal 401 performs operations illustrated in FIG. 43. Operations in step S2010 and steps S2030 to S2080 illustrated in FIG. 43 are similar to operations in corresponding steps in FIG. 19 (the first embodiment). An operation in step S4130 is similar to step S4130 of FIG. 39 (the fourth embodiment). In the present embodiment, in step S2010, it is determined whether or not data received by the receiver 274 is a reduced reconstruction table. In a case where the received data is not a reduced reconstruction table, that is, in a case where the received data is data indicative of a result of estimation of a sugar content, step S4130 is performed, in which the result of estimation of the sugar content is output. In a case where the received data is a reduced reconstruction table, step S2021 is performed, in which a reduced reconstruction table recorded in the storage device 220 is updated to the received reduced reconstruction table. Then, as in the first embodiment, the reconstruction processing circuit 230 generates hyperspectral data by performing operations in steps S2030 to S2080. In subsequent step S2121, the transmitter 272 transmits the hyperspectral data generated by the reconstruction processing circuit 230 to the server 301 together with a terminal ID in association with information for identifying a region in an image for which the hyperspectral data has been generated.

As described above, in the present embodiment, the processing circuit 140 of the server 301 acquires hyperspectral data generated from compressed image data on the basis of a reduced reconstruction table by the terminal 401. Then, the processing circuit 140 estimates a property value such as a sugar content of a target from the hyperspectral data on the basis of a statistical model and transmits data indicative of the property value to the terminal 401. By such an operation, processing of the terminal 401 is lessened as compared with the first and second embodiments.

The above embodiments are merely examples, and the present disclosure is not limited to the above embodiments. For example, the configurations of the above embodiments may be combined as appropriate to constitute another embodiment. The configuration of each of the above embodiments may be applied to estimation of a property value other than a sugar content of a target.

Other embodiments of the present disclosure are illustrated below.

Aspect in which Communication is Performed without Network

Although a statistical learning apparatus or a server and an estimation apparatus or a terminal communicate with each other over a network in the first to fifth embodiments, the present disclosure is not limited to such an aspect. The statistical learning apparatus or the server and the estimation apparatus or the terminal may be connected to each other without a network. For example, the statistical learning apparatus or the server and the estimation apparatus or the terminal may be communicably connected to each other by an inner wire in a single system. The statistical learning apparatus or the server and the estimation apparatus or the terminal may be configured to perform wireless communication such as Wi-Fi (Registered Trademark) or Bluetooth (Registered Trademark).

Creation of Reduced Reconstruction Table Before Shipment of Camera

In the first to fifth embodiments, an estimation apparatus or a terminal including a hyperspectral camera is shipped, and a reduced reconstruction table is created and updated after a user starts use. Such an aspect is not restrictive, and for example, it is also possible to employ an aspect in which a reduced reconstruction table is created before shipment and the reduced reconstruction table is not updated after the shipment. In this case, the reduced reconstruction table is recorded in a storage device of the estimation apparatus or the terminal in a process for producing the estimation apparatus or the terminal including the hyperspectral camera and is continuously used without being edited after start of user's use.

Aspect in which Model is Trained by Method Other than Principal Component Analysis In the first to fifth embodiments, principal component analysis is used for training of a model used to estimate a property value from hyperspectral data on the basis of compressed image data generated by an imaging apparatus. On the basis of a statistical model obtained by learning based on principal component analysis, a principal component score is calculated from hyperspectral data and a property value (e.g., a sugar content) of a target is estimated from the principal component score. Information from which a property value can be estimated may be extracted by another learning method instead of the method based on the principal component analysis. For example, another statistical method such as independent component analysis or another machine learning method such as a neural network may be used. In an example, weights of wavelength bands relevant with a property value may be generated as parameters for estimating a property value by using a deep neural network (DNN). A property value estimation model based on the generated parameters may be, for example, generated by application of a cubic curve. The learning method may be a machine learning method other than DNN. The degree of the model for estimating a property value may be a degree other than the third degree or a method based on application of another model may be used.

Creation of Model for Extracting Spectrum Relevant with Property Value

In the first to fifth embodiments, a band of high important and a band of low importance are specified by using principal component analysis as for spectral data output from an estimation apparatus or a terminal. This is statistical information compression processing on spectrum information. A method of information compression on spectrum information may be a statistical method other than principal component analysis such as factor analysis or independent component analysis or may be a machine learning method such as neural network. In the first to fifth embodiments, information in which a band of high importance is given a weight is generated by using a principal component score in addition to information compression on a spectrum axis by principal component analysis, and thereby a property value such as a sugar content is estimated. In the first to fifth embodiments, information concerning a property value (e.g., a sugar content) of a target in a specific region of an image is generated by performing processing on a spectrum of the specific region. That is, a processing result does not include image information, and position information as an image and compressed spectrum information cannot be displayed in association with each other without re-synthesis with an original image. In view of this, a method of compressing spectrum information of hyperspectral images by using machine learning and creating a model for generating a smaller number of luminance images than the original hyperspectral images may be used instead of the method of the first to fifth embodiments. An embodiment of a system for realizing such a method is described below.

Sixth Embodiment

Figure 44:
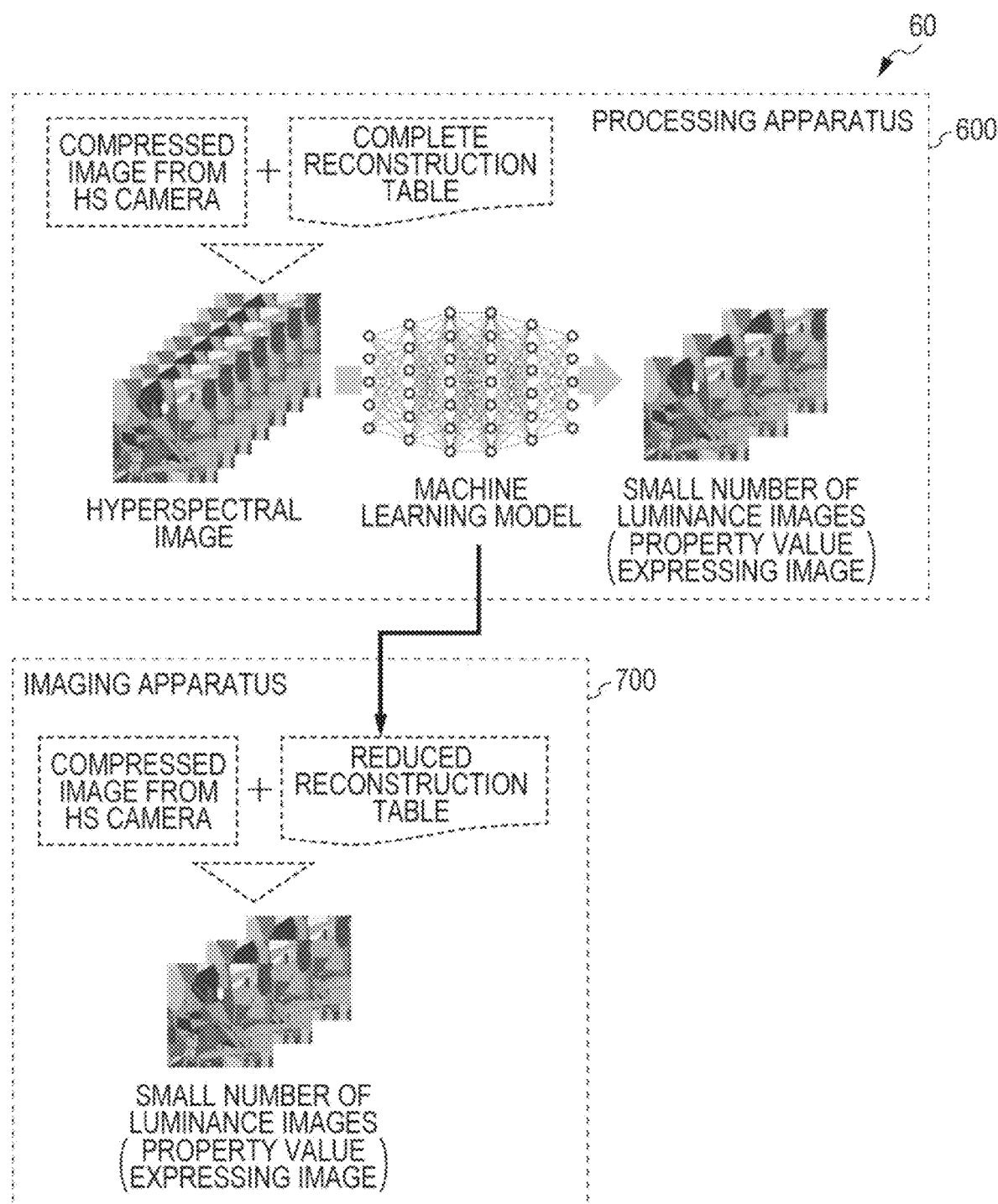
FIG. 44 illustrates an outline of a system according to a sixth embodiment.

FIG. 44 illustrates an outline of a system 60 that creates a model for generating a small number of luminance images that express a property value from hyperspectral images by using machine learning and a reduced reconstruction table corresponding to the model. In the following description, the small number of luminance images that express a property value are sometimes referred to as "property value expressing images". The system 60 includes a processing apparatus 600 and an imaging apparatus 700. The processing apparatus 600 creates a reduced reconstruction table for generating a small number of luminance images that express a property value from a compressed image output from a hyperspectral camera by machine learning using the compressed image and hyperspectral images generated on the basis of a complete reconstruction table prepared in advance. The created reduced reconstruction table is stored in a storage device of the imaging apparatus 700. A processing circuit of the imaging apparatus 700 generates and outputs a small number of luminance images that express a property value on the basis of the compressed image and the reduced reconstruction table. The property value may be a value that expresses a property such as a sugar content of a target or may be a value that expresses a slight difference in color or spread of color of the target. The processing apparatus 600 generates a reduced reconstruction table that matches the property value and transmits the reduced reconstruction table to the imaging apparatus 700, and thereby the imaging apparatus 700 functions as a camera that generates a small number of luminance images that express the property value from a compressed image by using the reduced reconstruction table. Use of such a camera makes it possible to grasp a distribution of a characteristic in the target as an image, for example, in a case where the characteristic is eccentrically or locally located within the target.

Figure 45:
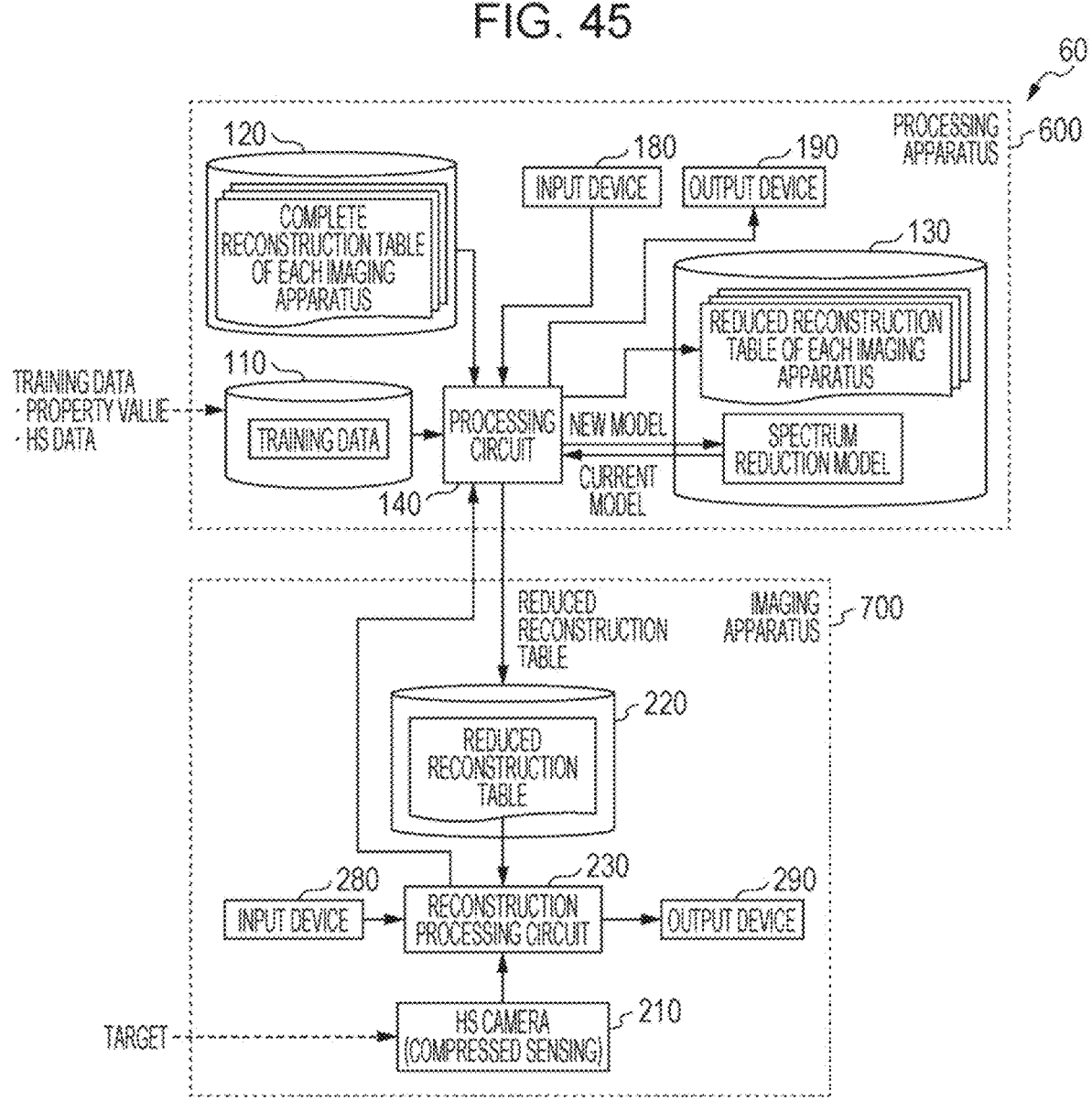
FIG. 45 is a block diagram illustrating an example of a configuration of the system according to the sixth embodiment.

FIG. 45 is a block diagram illustrating an example of a configuration of the system 60 according to the present embodiment. The system 60 includes the processing apparatus 600 and the one or more imaging apparatuses 700. The processing apparatus 600 makes settings necessary for the imaging apparatus 700 to output images expressing a target property value. The processing apparatus 600 can be, for example, a computer such as a server managed by a business operator who manages the system 60 and sells or distributes the imaging apparatuses 700 to a user. The processing apparatus 600 can make settings of the imaging apparatuses 700 by being sequentially connected to the imaging apparatuses 700, for example, in a process for producing the imaging apparatuses 700. The processing apparatus 600 and the imaging apparatuses 700 may be directly connected or may be connected over a network. A mode of connection between the processing apparatus 600 and the imaging apparatuses 700 may be wired or may be wireless.

The processing apparatus 600 includes a first storage device 110, a second storage device 120, a third storage device 130, a processing circuit 140, an input device 180, and an output device 190. Each of the imaging apparatuses 700 includes a hyperspectral camera 210, a fourth storage device 220, a reconstruction processing circuit 230, an input device 280, and an output device 290. The input device 180 and the output device 190 may be elements outside the processing apparatus 600. Similarly, the input device 280 and the output device 290 may be elements outside the imaging apparatus 700.

The configuration of the processing apparatus 600 illustrated in FIG. 45 is similar to a configuration obtained by removing the communication circuit 170 from the configuration of the statistical learning apparatus 100 according to the first embodiment illustrated in FIG. 5. The first storage device 110, the second storage device 120, and the third storage device 130 are each a device in which data is stored by any storage medium. The first storage device 110 stores therein training data for generating a model used to generate a small number of luminance mages that express a distribution of a property value (e.g., a sugar content of a target) from hyperspectral data. The second storage device 120 stores therein a complete reconstruction table according to a characteristic of the hyperspectral camera 210 of each imaging apparatus 700. The third storage device 130 stores therein a reduced reconstruction table according to a characteristic of the hyperspectral camera 210 of each imaging apparatus 700 and a model for compressing or reducing spectrum information from hyperspectral data. Hereinafter, this model is sometimes referred to as a "spectrum reduction model".

The training data stored in the first storage device 110 is similar to the training data in the first embodiment illustrated in FIG. 6A. That is, the first storage device 110 stores therein, as training data, spectral data and a property value such as a sugar content in association with each other. The hyperspectral data in the present embodiment is image data having information on a luminance value of each of unit bands for each pixel, and the training data is stored for each pixel.

Figures 46, 47:
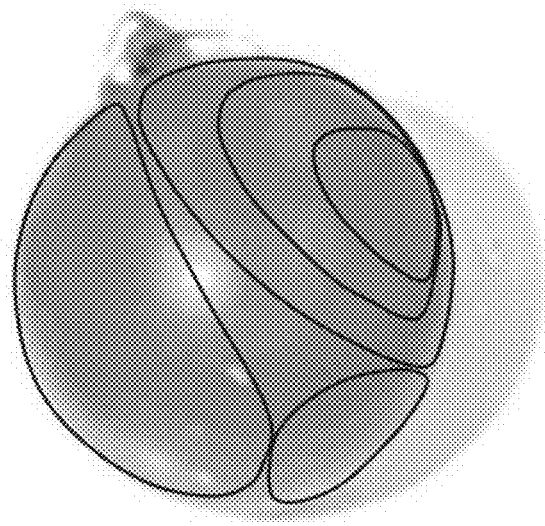
FIG. 46 illustrates an example of a distribution of a property value in a target.
FIG. 47 illustrates an example of data of a spectrum reduction model.

FIG. 46 illustrates an example of a distribution of a property value of a target. A spatial distribution of a property value (e.g., sugar content) can be expressed and recorded in a form such as level lines. Instead of a distribution of a property value, a distribution of a kind of substance (e.g., a kind such as glucose or fructose) that influences a property value may be recorded. Information on such a distribution can be recorded in the first storage device 110 in association with spectral data of each pixel.

The complete reconstruction table recorded for each imaging apparatus 700 stored in the second storage device 120 is similar to the complete reconstruction table in the first embodiment illustrated in FIG. 7.

FIG. 47 illustrates an example of data of the spectrum reduction model stored in the third storage device 130. In the present embodiment, the third storage device 130 stores therein a model that is trained by machine learning and is for generating a small number of luminance images in which spectrum information has been compressed or reduced. The machine learning may be learning using a statistical method such as the one used in the first to fifth embodiment or may be learning using a non-statistical method. In the example of FIG. 47, the model is recorded for each generated luminance image. Each of the models corresponding to respective luminance images includes information on weights corresponding to bands of original hyperspectral data. A small number of luminance images that express a property value can be, for example, generated by processing of multiplying, for each pixel, luminance of each band by a corresponding weight illustrated in FIG. 47 and using, as luminance of the pixel, a value obtained by adding values of all bands thus obtained. A band having a higher correlation with a property value has a larger weight.

The reduced reconstruction table recorded for each imaging apparatus 700 in the third storage device 130 is similar to the reduced reconstruction table according to the first embodiment illustrated in FIG. 8. The reduced reconstruction table is generated on the basis of the spectrum reduction model illustrated in FIG. 47. For example, the reduced reconstruction table can be generated by processing of grouping bands by integrating bands whose weights are smaller than a threshold value in the spectrum reduction model into a single band and deciding a coefficient for each group.

The processing circuit 140 generates a model and a reduced reconstruction table corresponding to the model. The processing circuit 140 generates a model by learning training data recorded in the first storage device 110, for example, by using a deep neural network (DNN). For example, the processing circuit 140 performs learning so that a pixel having a higher property value has higher luminance. The processing circuit 140 uses spectral data of each pixel as input data to the DNN and uses a corresponding property value as labeled training data. The model may be, for example, a model that generates a luminance image for each of property values or a model that generates different luminance images for property value ranges. The training data need not necessarily include the labeled training data, that is, information on a property value. In this case, the processing apparatus 600 may perform learning only from a distribution of spectral data. For example, the processing apparatus 600 may extract some characteristics of a spectrum distribution from spectral data in data sets and classify the spectral data into a small number of groups on the basis of the extracted characteristics. The processing apparatus 600 may generate, as a model, conversion information for generating an image in which a characteristic of a spectrum of each group is emphasized from spectrum information of an original image.

Figure 48:
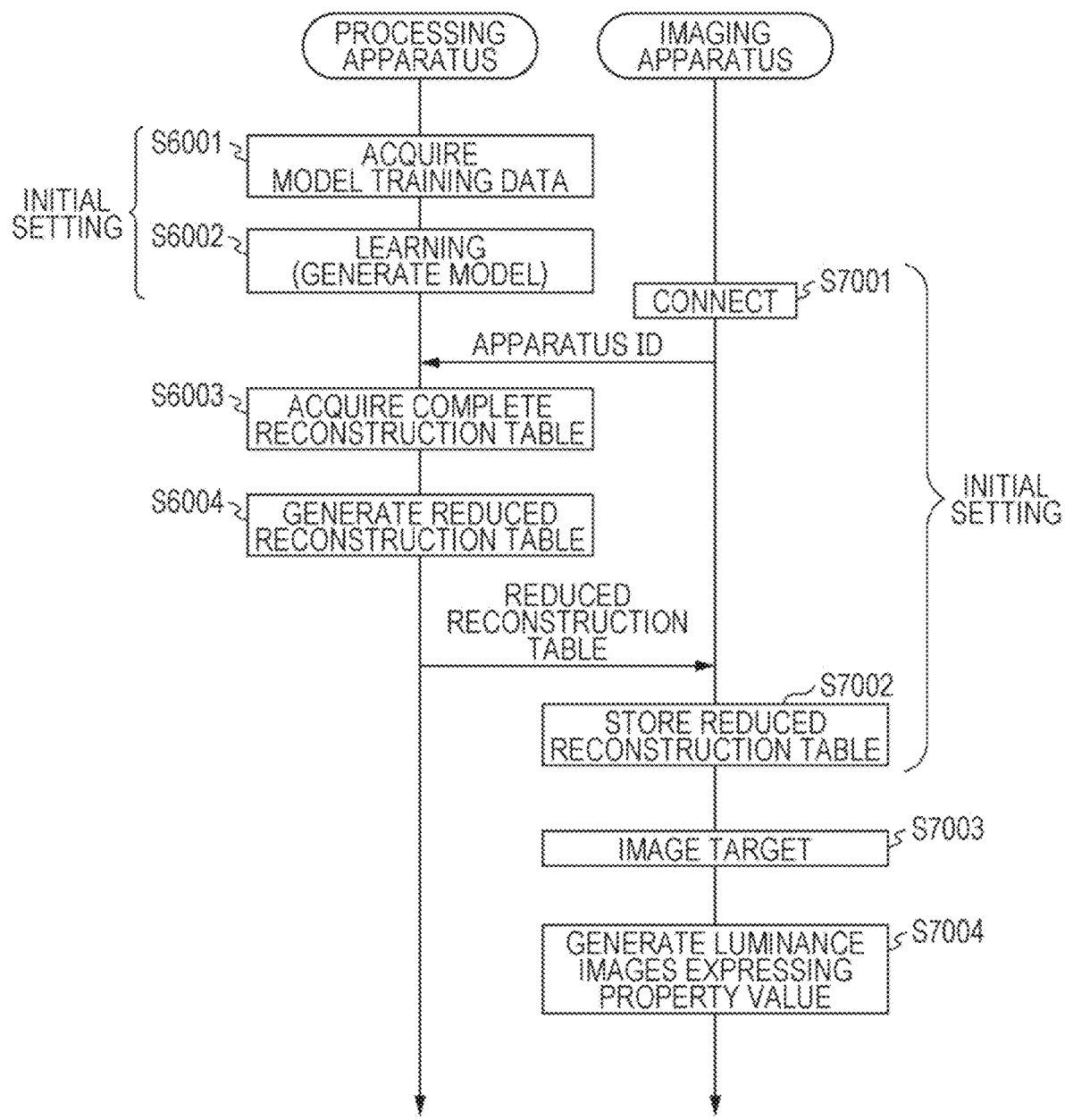
FIG. 48 illustrates an outline of communication between a processing apparatus and an imaging apparatus and processing performed by the processing apparatus and the imaging apparatus according to the sixth embodiment.

FIG. 48 illustrates an outline of communication between the processing apparatus 600 and the imaging apparatus 700 and processing performed by the processing apparatus 600 and the imaging apparatus 700. FIG. 48 illustrates learning model generation processing performed as initial setting by the processing apparatus 600, initial setting of the imaging apparatus 700 performed thereafter, that is, reduced reconstruction table generation processing and writing of the reduced reconstruction table into the imaging apparatus 700, and subsequent imaging operation of the imaging apparatus 700.

The initial setting of the processing apparatus 600 includes operations in steps S6001 and S6002 illustrated in FIG. 48. The processing circuit 140 first acquires training data from the first storage device 110 (step S6001). Next, the processing circuit 140 performs learning by a DNN on the basis of the acquired training data to generate a learning model that generates a small number of luminance images that express a property value and causes the generated learning model to be stored in the third storage device 130 (step S6002). This completes the initial setting of the processing apparatus 600.

The initial setting of the imaging apparatus 700 includes operations in steps S7001, S6003, S6004, and S7002 illustrated in FIG. 48. First, the imaging apparatus 700 is connected to the processing apparatus 600 and transmits an apparatus ID thereof to the processing apparatus 600 (step S7001). The processing apparatus 600 acquires the apparatus ID transmitted from the imaging apparatus 700. The processing apparatus 600 acquires a complete reconstruction table corresponding to the connected imaging apparatus 700 from the second storage device 120 on the basis of the acquired apparatus ID (step S6003). The processing circuit 140 generates a reduced reconstruction table corresponding to the imaging apparatus 700 on the basis of the learning model created before and the complete reconstruction table and transmits the reduced reconstruction table to the imaging apparatus 700 (step S6004). The imaging apparatus 700 causes the reduced reconstruction table acquired from the processing apparatus 600 to be stored in the fourth storage device 220 (step S7002). The initial setting of the imaging apparatus 700 is completed by the series of operations in steps S7001, S6003, S6004, and S7002. By this initial setting, the imaging apparatus 700 functions not as a hyperspectral camera that uniformly outputs detailed spectral data, but as a camera that outputs a small number of luminance images that express a property value, that is, property value expressing images.

After the initial setting, the imaging apparatus 700 cuts connection with the processing apparatus 600. Then, the imaging apparatus 700 performs imaging by compressed sensing by using the hyperspectral camera 210 and thereby generates a compressed image (step S7003). The reconstruction processing circuit 230 generates a small number of luminance images that express a property value from the compressed image by using the reduced reconstruction table stored in the initial setting and outputs the small number of luminance images that express a property value (step S7004).

Figure 49:
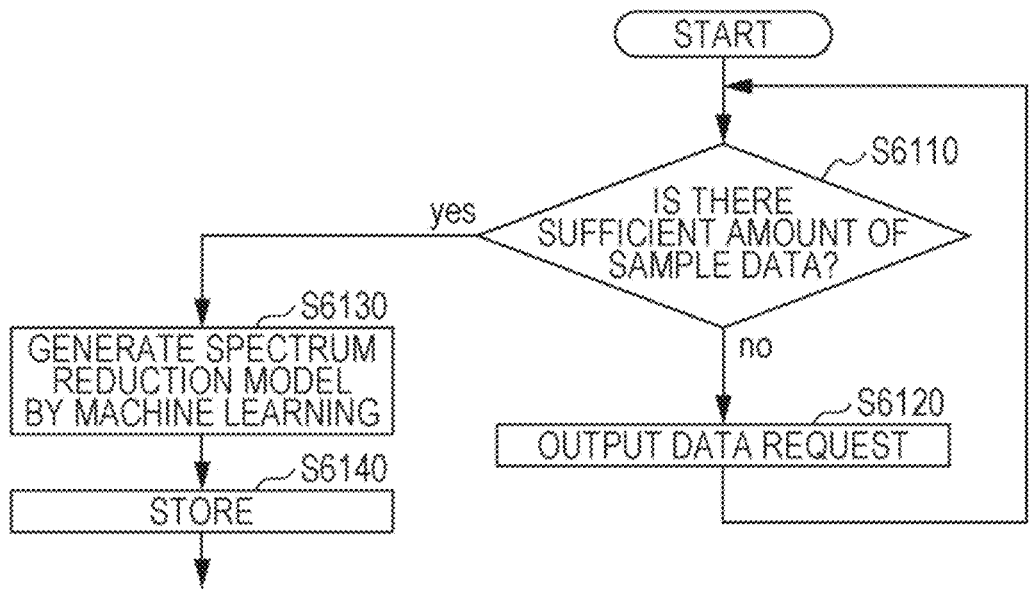
FIG. 49 is a flowchart illustrating a specific example of operations in steps S6001 and S6002 illustrated in FIG. 48.

FIG. 49 is a flowchart illustrating a specific example of the operations in steps S6001 and S6002 illustrated in FIG. 48. In an initial state, the processing apparatus 600 has not generated a learning model by machine learning, and a reduced reconstruction table has not been stored yet in the storage device 220 of the imaging apparatus 700. Accordingly, the imaging apparatus 700 cannot generate image data for each band even when imaging is performed by the hyperspectral camera 210 and cannot output a small number of luminance images that express a property value. In view of this, the processing apparatus 600 generates a model for compressing and reducing a spectrum axis in accordance with a property value of a target. The processing apparatus 600 generates a reduced reconstruction table for the hyperspectral camera 210 included in each imaging apparatus 700 on the basis of the model for compressing and reducing a spectrum axis and outputs the reduced reconstruction table to the imaging apparatus 700. The reduced reconstruction table is data obtained by changing the complete reconstruction table so that a small number of luminance images that express a property value are output. The operations illustrated in FIG. 49 are started by a start input unit such as the input device 180. The following describes an operation in each step.

Step S6110

The processing circuit 140 determines whether or not a sufficient amount of training data necessary for learning is stored in the first storage device 110. The sufficient amount necessary for learning is, for example, a preset number such as the number of pieces of data that is ten times as large as the number of spectrum bands. In a case where a sufficient amount of sample data is stored, step S6130 is performed. In a case where a sufficient amount of sample data is not stored, step S6120 is performed.

Step S6120

In a case where a sufficient amount of sample data is not stored, the processing circuit 140 causes the output device 190 to output a request to add training sample data. In a case where the output device 190 includes, for example, a display, output contents can be a character string or a warning image. In a case where the output device 190 includes a speaker, the output contents can be voice or warning sound. After step S6120, step S6110 is performed again.

Step S6130

The processing circuit 140 performs machine learning by using, as input, spectral data and a property value of each pixel of the training data stored in the first storage device 110. A learning method is, for example, a statistical method, a method using a neural network, or a method using a Support Vector Machine (SVM). The processing circuit 140 generates a spectrum reduction model for converting spectrum information of all bands that can be imaged by the hyperspectral camera 210 into a small number of pieces of spectrum information by machine learning.

Step S6140

The processing circuit 140 causes the spectrum reduction model generated in step 6130 to be stored in the third storage device 130.

Although an example in which the first storage device 110 stores therein one kind of training data and the third storage device 130 stores therein a single spectrum reduction model is illustrated in FIG. 45, this is merely an example. For example, the first storage device 110 may store therein kinds of training data, and the third storage device 130 may store therein spectrum reduction models corresponding to the kinds of training data. In a case where the first storage device 110 stores therein kinds of training data, the operations in steps S6110 to step S6140 can be repeated as many times as the number of kinds of training data since a spectrum reduction model is generated for all of the kinds of training data. Alternatively, the operations in steps S6110 to step S6140 may be performed every time a new kind of training data is added.

Figure 50:
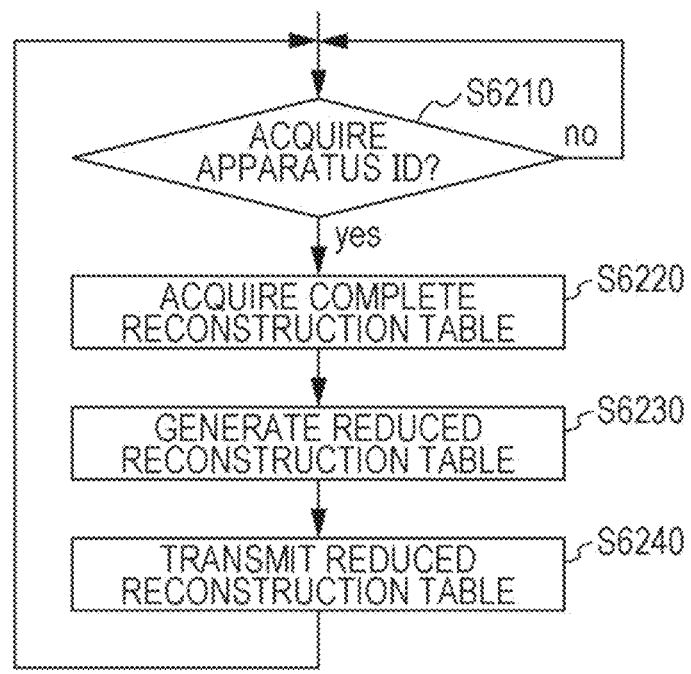
FIG. 50 is a flowchart illustrating a specific example of operations in steps S6003 and S6004 illustrated in FIG. 48.

FIG. 50 is a flowchart illustrating a specific example of the operations in steps S6003 and S6004 illustrated in FIG. 48. The processing apparatus 600 extracts a complete reconstruction table unique to the imaging apparatus 700 on the basis of an imaging apparatus ID acquired from the imaging apparatus 700, generates a reduced reconstruction table unique to the imaging apparatus 700, and transmits the reduced reconstruction table to the imaging apparatus 700. The reduced reconstruction table is configured to generate several images from a compressed image in accordance with a function of expressing a property value given to the imaging apparatus 700. The operations illustrated in FIG. 50 are started by a start input unit such as the input device 180. The following describes an operation in each step.

Step S6210

First, the processing circuit 140 determines whether or not an apparatus ID has been acquired from the imaging apparatus 700. In a case where an apparatus ID has been acquired from the imaging apparatus 700 in step S6210, step S6220 is performed. In a case where an apparatus ID has not been acquired from the imaging apparatus 700 in step S6210, step S6210 is repeated.

Step S6220

The processing circuit 140 acquires a complete reconstruction table corresponding to the apparatus ID acquired in step S6210 from among complete reconstruction tables for respective imaging apparatuses 700 stored in the second storage device 120 on the basis of the apparatus ID of the imaging apparatus 700 acquired in step S6210.

Step S6230

The processing circuit 140 generates a reduced reconstruction table from the complete reconstruction table extracted in step S6220 on the basis of the spectrum reduction model stored in the third storage device 130. A method for generating a reduced reconstruction table is similar to the method in step S1235 of FIG. 17.

Step S6240

The processing circuit 140 transmits the reduced reconstruction table generated in step S6230 to the imaging apparatus 700.

Steps S6210 to S6240 are repeated every time the imaging apparatus 700 connected to the processing apparatus 600 changes. In this way, the processing apparatus 600 can generate a reduced reconstruction table unique to each imaging apparatus 700, and the imaging apparatus 700 becomes able to output a small number of luminance images for expressing a property value.

In the example of FIG. 50, one kind of property value is to be expressed, and a single spectrum reduction model is generated accordingly. Such an example is not restrictive, and kinds of property values may be expressed, and a spectrum reduction model may be generated for each of the property values and recorded in the third storage device 130. In this case, the processing apparatus 600 acquires information on a property value to be expressed by an image generated by an individual imaging apparatus 700 together with an apparatus ID. The information on a property value may be stored in advance in any storage device together with the apparatus ID. Alternatively, the processing apparatus 600 may acquire the information on a property value from the imaging apparatus 700 together with the device ID or may receive the information on a property value from the input device 180.

Next, operations of the imaging apparatus 700 are described.

Figure 51:
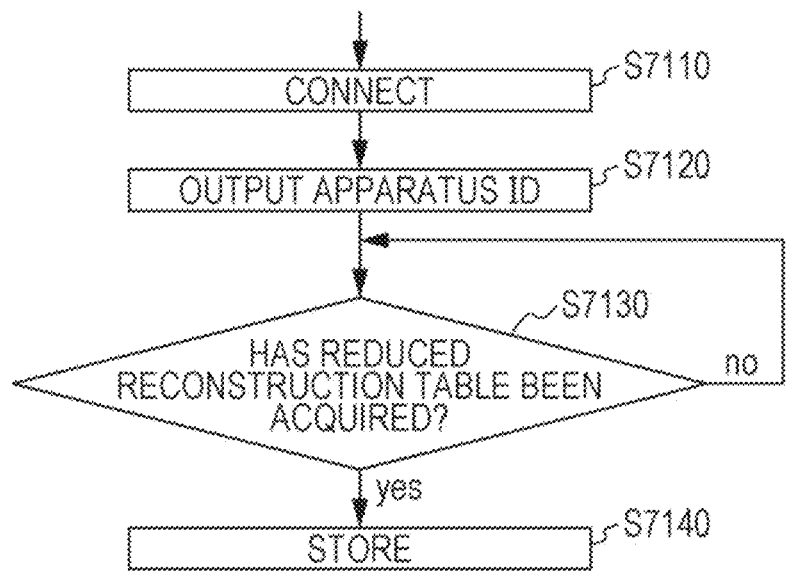
FIG. 51 is a flowchart illustrating a specific example of operations in steps S7001 and S7002 illustrated in FIG. 48.

FIG. 51 is a flowchart illustrating a specific example of the operations in steps S7001 and S7002 illustrated in FIG. 48. In an initial state, a reconstruction table is not stored in the fourth storage device 220 included in the imaging apparatus 700, and image data cannot be generated and displayed even in a case where imaging is performed by the hyperspectral camera 210. As initial setting, the imaging apparatus 700 acquires a reduced reconstruction table according to a property value expressing function of the imaging apparatus 700 from the processing apparatus 600 and causes the reduced reconstruction table to be stored in the storage device 220. In this way, the imaging apparatus 700 becomes able to generate and output a small number of luminance images that express a property value. The following describes an operation in each step.

Step S7110

The imaging apparatus 700 is connected to the processing apparatus 600 by a user's operation or an operator's operation, and thereby it becomes possible to transmit and receive a signal.

Step S7120

The reconstruction processing circuit 230 outputs an apparatus ID of the imaging apparatus 700 to the processing apparatus 600. Then, the operations illustrated in FIG. 50 are performed by the processing apparatus 600.

Step S7130

The reconstruction processing circuit 230 determines whether or not a reduced reconstruction table has been acquired from the processing apparatus 600. In a case where a reduced reconstruction table has been acquired in step S7130, step S7140 is performed. In a case where a reduced reconstruction table has not been acquired in step S7130, step S7130 is repeated.

Step S7140

The imaging apparatus 700 causes the reduced reconstruction table acquired in step S7130 to be stored in the storage device 220.

The initial setting of the imaging apparatus 700 is completed by the operations in steps S7110 to S7140.

Figure 52:
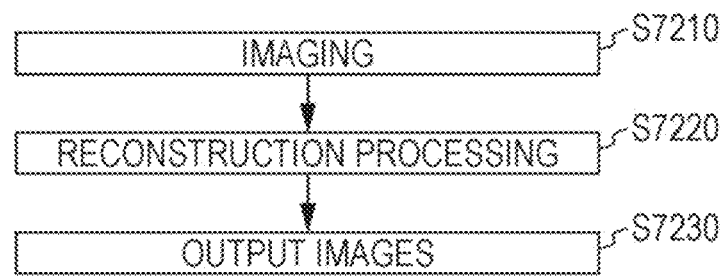
FIG. 52 is a flowchart illustrating a specific example of operations in steps S7003 and S7004 illustrated in FIG. 48.

FIG. 52 is a flowchart illustrating a specific example of the operations in steps S7003 and S7004 illustrated in FIG. 48. The following describes an operation in each step.

Step S7210

The hyperspectral camera 210 images a target. The hyperspectral camera 210 acquires an image by compressed sensing. As a result of the imaging, pieces of spectral information are compressed in a form of a single luminance image and output.

Step S7220

The reconstruction processing circuit 230 generates a small number of pieces of spectral image data expressing a property value from the compressed image data generated in step S7210 by using the reduced reconstruction table stored in the fourth storage device 220. The reconstruction in the present embodiment is not complete reconstruction of information on all spectrum bands that can be imaged by the hyperspectral camera 210. The reconstruction processing circuit 230 performs reduced reconstruction of generating only a small number of pieces of spectrum information for expressing a property value and generating a luminance image for each piece of spectrum information. By this reduced reconstruction, a small number of luminance images that express a property value are generated.

Step S7230

The output device 290 outputs the small number of luminance images generated in step S7220 as images that express a property value. The output can be in a form such as displaying on a display, printing, or output of image data.

By the operations in steps S7210 to S7230, a small number of luminance images that express a property value in which a distribution or a boundary of a specific substance or state is visualized can be output by imaging using the hyperspectral camera 210.

In the example of FIGS. 51 and 52, the initial setting and imaging operation of the imaging apparatus 700 are performed assuming that the imaging apparatus 700 is an imaging apparatus that generates images expressing one kind of property value. Such a configuration is not restrictive, and the imaging apparatus 700 may be configured to generate kinds of luminance image groups that express kinds of property values. For this purpose, in the initial setting operation illustrated in FIG. 51, the imaging apparatus 700 acquires reduced reconstruction tables corresponding to the kinds of property values to be expressed and causes the reduced reconstruction tables to be stored in the storage device 220. To acquire reduced reconstruction tables corresponding to the kinds of property values, the imaging apparatus 700 may be, for example, configured to also transmit information on the kinds of property values when outputting the apparatus ID in step S7120. Alternatively, information indicative of kinds of property values corresponding to an apparatus ID may be stored in any of the storage devices included in the processing apparatus 600. Information designating a property value may be input from the input device 180 of the processing apparatus 600 or the input device 280 of the imaging apparatus 700, and the imaging apparatus 700 may acquire a reduced reconstruction table from the processing apparatus 600 in accordance with the input information on the property value. In a case where reduced reconstruction tables are stored in the storage device 220, the reconstruction processing circuit 230 can be configured to acquire information on a property value to be expressed in order to select a reduced reconstruction table in step S7220 in FIG. 52. The information on the property value can be, for example, input from the input device 280. The reconstruction processing circuit 230 can extract a reduced reconstruction table corresponding to the input property value from among the reduced reconstruction tables stored in the storage device 220 on the basis of the input information on the property value and use the reduced reconstruction table for reconstruction.

By the initial setting operation of the imaging apparatus 700 illustrated in FIG. 51 and the imaging operation of the imaging apparatus 700 illustrated in FIG. 52, the imaging apparatus 700 can generate and output a small number of luminance images that express a property value by imaging a target. In this way, for example, in a case where the target is an agricultural product, a small number of (e.g., approximately three to five) images in which a spectrum correlated with a sugar content is emphasized can be generated. By properly creating a model and a reduced reconstruction table, for example, a luminance image that varies depending on a kind of sugar (e.g., glucose or fructose) can also be generated. That is, a luminance image corresponding to each of substances for deciding a certain property (e.g., a sugar content) can be generated.

In the present embodiment, one or more reduced reconstruction tables are generated and stored in the storage device 220 at a time of initial setting of the imaging apparatus 700, that is, before shipment. Such a configuration is not restrictive, and for example, a reduced reconstruction table may be added and a property value that can be expressed by the imaging apparatus 700 may be added after the initial setting. In a case where a function of expressing a new property value is added to the imaging apparatus 700, the operations in steps S7001, S6003, S6004, and S7002 in FIG. 48 are performed again. Connection established between the processing apparatus 600 and the imaging apparatus 700 in this case may be direct connection between the processing apparatus 600 and the imaging apparatus 700 or may be connection over a network, as in the case of the initial setting.

Although the processing apparatus 600 according to the present embodiment generates a model for converting hyperspectral data into spectral data relevant with a property value by itself, the model may be generated in advance by another apparatus and recorded in the storage device 130. In this case, the processing apparatus 600 can read a model generated in advance on the basis of data sets of samples from the storage device 130 and generate a reduced reconstruction table for generating spectral data relevant with a property value from compressed image data on the basis of the model and a complete reconstruction table.

Other Remarks 1

The following processing apparatus may be employed. This processing apparatus includes a memory and a circuit.

The memory stores therein data sets (e.g., training data 110) and a first table (e.g., a complete reconstruction table 120 of each terminal). Each of the data sets includes first data indicative of a value of a predetermined property of a first sample and a luminance value in each of first wavelength ranges (see FIG. 6A). The first data is generated on the basis of second data.

The second data is generated by using first pixel values of first pixels included in a first image and the first table. A first camera images the first sample and outputs the first image.

The circuit decides second wavelength ranges on the basis of the data sets (see FIG. 15) and generates a second table on the basis of the first table and the second wavelength ranges (see FIG. 17).

The first camera images a second sample different from the first sample and outputs a second image. Third data is generated by using second pixel values of second pixels included in the second image and the second table. A luminance value of the second sample in each of the second wavelength ranges is decided on the basis of the third data. A value of the predetermined property of the second sample is decided on the basis of the luminance value of the second sample in each of the second wavelength ranges.

The first camera includes a filter array and an image sensor. the filter array is located between the first sample and the image sensor. The filter array is located between the second sample and the image sensor. The filter array includes regions, and the regions have different transmission properties for a wavelength of light.

$y1=Hx$ where $y1$ is a vector indicative of the first pixel values, $H$ is a matrix indicative of the first table, and $x$ is a vector indicative of the second data. $y2=H_r z$ where $y2$ is a vector indicative of the second pixel values, $H_r$ is a matrix indicative of the second table, and $z$ is a vector indicative of the third data. The number of first pixels and the number of second pixels are equal. {(the number of components of H)−(the number of components of Hr)}=the number of first pixels×{(the number of first wavelength ranges)−(the number of second wavelength ranges)}.

A second camera different from the first camera may image the first sample and output the first image. The second camera includes a second filter array and a second image sensor. The second filter array is located between the first sample and the second image sensor. The second filter array includes second regions, and the second regions have different transmission properties for a wavelength of light.

Other Remarks 2

Various modifications of the present embodiment which a person skilled in the art can think of and combinations of constituent elements in different embodiments may be also encompassed within one or more aspects of the present disclosure without departing from the spirit of the present disclosure.

The technique of the present disclosure can be widely used for applications of estimating a property such as a sugar content of an agricultural product. For example, the technique of the present disclosure is applicable to a mobile terminal such as a smartphone, an apparatus for picking fruits or sorting fruits, or a robot.

What is claimed is:

1. A processing apparatus that is connected to one or more apparatuses including a hyperspectral sensor that generates compressed image data which is hyperspectral information of a target compressed as two-dimensional image information, the processing apparatus comprising:
   a storage device that stores data sets of samples and a first reconstruction table for generating hyperspectral data from the compressed image data, the data set of each of the samples including hyperspectral data of the sample and data indicative of a property value of the sample; and
   a processing circuit that generates a model for converting the hyperspectral data into spectral data relevant with the property value on a basis of the data sets of the samples and generates a second reconstruction table for generating spectral data relevant with the property value from the compressed image data on a basis of the model and the first reconstruction table.

2. The processing apparatus according to claim 1, wherein
   the hyperspectral data includes luminance information for each of wavelength bands included in a target wavelength range;
   the first reconstruction table is data for generating the luminance information for each of the wavelength bands from the compressed image data; and
   the second reconstruction table is data for generating luminance information obtained by weighted-addition of the pieces of luminance information of the wavelength bands from the compressed image data.

3. The processing apparatus according to claim 1, wherein
   a data size of the second reconstruction table is smaller than a data size of the first reconstruction table.

4. The processing apparatus according to claim 1, wherein
   the processing circuit calculates weights corresponding to wavelength bands relevant with the property value by machine learning based on the hyperspectral data of the samples and generates the second reconstruction table from the first reconstruction table on a basis of the weights.

5. The processing apparatus according to claim 1, wherein
   the hyperspectral data includes luminance information for each of wavelength bands included in a target wavelength range;
   the first reconstruction table is data for generating the luminance information for each of the wavelength bands from the compressed image data; and
   the processing circuit decides weights corresponding to the wavelength bands by machine learning based on the hyperspectral data of the samples, decides some wavelength bands of a relatively low weight from among the wavelength bands on a basis of the weights, and generates the second reconstruction table by integrating pieces of information concerning the some wavelength bands in the first reconstruction table.

6. The processing apparatus according to claim 1, wherein
   the hyperspectral sensor includes a filter array including filters that have different transmission spectra; and
   the first reconstruction table is data reflecting a spatial distribution of the transmission spectra of the filter array.

7. The processing apparatus according to claim 1, wherein the processing circuit transmits the second reconstruction table to the apparatus.

8. The processing apparatus according to claim 1, wherein the processing circuit generates the model, the first reconstruction table, and the second reconstruction table for each predetermined classification.

9. The processing apparatus according to claim 1, wherein the processing circuit acquires partial compressed image data generated by extracting data of a region from the compressed image data by the apparatus, generates the spectral data corresponding to the region from the partial compressed image data by using the second reconstruction table, and transmits the spectral data to the apparatus.

10. The processing apparatus according to claim 1, wherein
the processing circuit acquires the compressed image data from the apparatus, generates spectral data relevant with the property value from the compressed image data by using the second reconstruction table, and transmits the spectral data to the apparatus.

11. The processing apparatus according to claim 1, wherein
in a case where it is determined that it is necessary to change the model and the second reconstruction table on a basis of spectral data generated from the compressed image data on a basis of the second reconstruction table and the hyperspectral data in the data sets of the samples, the processing circuit generates the model again on a basis of the data sets of new samples and updates the second reconstruction table in accordance with the model thus generated again.

12. A method generated by a computer, the method comprising:
acquiring a first reconstruction table for generating hyperspectral data from compressed image data which is hyperspectral information of a target compressed as two-dimensional image information;
acquiring a model generated on a basis of a data set of a sample including hyperspectral data of the sample and data indicative of a property value of the sample, the model being for converting the hyperspectral data into spectral data relevant with the property value; and
generating a second reconstruction table for generating spectral data relevant with the property value from the compressed image data on a basis of the model and the first reconstruction table.

13. The method according to claim 12, wherein
the hyperspectral data includes luminance information for each of wavelength bands included in a target wavelength range;
the first reconstruction table is data for generating the luminance information for each of the wavelength bands from the compressed image data; and
the second reconstruction table is data for generating luminance information obtained by weighted-addition of the pieces of luminance information of the wavelength bands from the compressed image data.

14. The method according to claim 12, wherein
a data size of the second reconstruction table is smaller than a data size of the first reconstruction table.

15. The method according to claim 12, wherein
the second reconstruction table is generated by synthesizing pieces of information of some of the wavelength bands included in the first reconstruction table.

16. A non-transitory computer-readable recording medium storing a program causing a computer to execute a process comprising:
acquiring a first reconstruction table for generating hyperspectral data from compressed image data which is hyperspectral information of a target compressed as two-dimensional image information;
acquiring a data set of a sample including hyperspectral data of the sample and data indicative of a property value of the sample;
generating the model for converting the hyperspectral data into spectral data relevant with the property value on a basis of the data set; and
generating a second reconstruction table for generating spectral data relevant with the property value from the compressed image data on a basis of the model and the first reconstruction table.

* * * * *